US012754422B2

(12) United States Patent
Snyder

(10) Patent No.: US 12,754,422 B2
(45) Date of Patent: Oct. 6, 2026

(54) METHODS, SYSTEMS, APPARATUSES, AND DEVICES FOR FACILITATING PROVISIONING OF A VIRTUAL EXPERIENCE

(71) Applicant: Red Six Aerospace Inc., Orlando, FL (US)

(72) Inventor: Glenn Thomas Snyder, Venice, CA (US)

(73) Assignee: RED SIX AEROSPACE INC, Orlando, FL (US)

( * ) Notice: Subject to any disclaimer, the term of this patent is extended or adjusted under 35 U.S.C. 154(b) by 0 days.

(21) Appl. No.: 18/231,607

(22) Filed: Aug. 8, 2023

(65) Prior Publication Data

US 2024/0053609 A1 Feb. 15, 2024

Related U.S. Application Data

(60) Provisional application No. 63/418,258, filed on Oct. 21, 2022, provisional application No. 63/397,612, filed on Aug. 12, 2022.

(51) Int. Cl.
*G02B 27/01* (2006.01)
*G01S 17/86* (2020.01)
(Continued)

(52) U.S. Cl.
CPC .......... *G02B 27/0172* (2013.01); *G01S 17/86* (2020.01); *G01S 17/89* (2013.01); (Continued)

(58) Field of Classification Search
CPC .............. G02B 27/0172; G02B 27/017; G02B 2027/0138; G02B 2027/014; G01S 17/86; (Continued)

(56) References Cited

U.S. PATENT DOCUMENTS 5,838,262 A 11/1998 Kershner
6,377,401 B1 4/2002 Bartlett
(Continued)

FOREIGN PATENT DOCUMENTS

DE 102019215691 A1 * 4/2021 ............ B60W 40/08
JP 2009036517 A * 2/2009
(Continued)

OTHER PUBLICATIONS

AWE, "ThinVR: A compact, 180 degree FOV, VR display" youtube video recorded at AWE Online 2020, retrieved from <<https://www.youtube.com/watch?v=t9JW_o0CoQ0>> on Jun. 26, 2023.
(Continued)

*Primary Examiner* — Adam J Snyder

(57) ABSTRACT

A system includes an event camera mounted in a cockpit of an aircraft, a pre-mapped data set representing the cockpit and a processor adapted to determine a location and a position of a head-mountable device comprising one or more visual markers based, at least in part, on data from the event camera and the pre-mapped data set, wherein the data from the event camera comprises at least one image comprising a portion of the cockpit represented by the pre-mapped data set and one or more of the visual markers.

18 Claims, 29 Drawing Sheets

(51) Int. Cl.

| | |
|---|---|
| ***G01S 17/89*** | (2020.01) |
| ***G06F 3/01*** | (2006.01) |
| ***G06V 20/40*** | (2022.01) |
| *G06V 10/80* | (2022.01) |
| *G06V 20/20* | (2022.01) |
| *G06V 20/59* | (2022.01) |

(52) U.S. Cl.
CPC .............. *G06F 3/012* (2013.01); *G06V 20/44* (2022.01); *G02B 2027/0138* (2013.01); *G02B 2027/014* (2013.01); *G02B 27/017* (2013.01); *G06V 10/803* (2022.01); *G06V 20/20* (2022.01); *G06V 20/59* (2022.01)

(58) Field of Classification Search
CPC ......... G01S 17/89; G06F 3/012; G06V 20/44; G06V 20/20; G06V 20/59; G06V 10/803
See application file for complete search history.

(56) References Cited

U.S. PATENT DOCUMENTS 6,826,458 B2 11/2004 Horvath
6,952,630 B2 10/2005 Hedrick
7,046,215 B1 5/2006 Bartlett
7,928,927 B1* 4/2011 Krenz .................. G02B 27/017 345/9
8,463,463 B1 6/2013 Feldmann
8,686,900 B2 4/2014 Whitehead
9,099,009 B2 8/2015 Sowadski
9,892,489 B1* 2/2018 Roggendorf .............. G06T 3/60
9,995,936 B1* 6/2018 Macannuco .......... G06F 3/0304
10,025,096 B2 7/2018 Yoon
10,204,453 B2 2/2019 Sharma
10,254,544 B1 4/2019 Melzer
10,382,746 B1 8/2019 Shapiro
10,528,126 B2 1/2020 Trythall
10,585,471 B2 3/2020 Reichow
10,713,960 B1 7/2020 Ziarnick
10,822,108 B2 11/2020 Chavez
10,827,165 B2 11/2020 Ratcliff
10,884,525 B1 1/2021 Vonsik
10,935,392 B2 3/2021 Trythall
10,948,740 B2 3/2021 Ratcliff
10,977,493 B2 4/2021 Speasl
10,996,473 B2 5/2021 Yang
11,215,834 B1 1/2022 Marshall
11,601,638 B2 3/2023 Ratcliff
2002/0015195 A1 2/2002 Sugano
2002/0024675 A1* 2/2002 Foxlin ................... G06F 3/0421 356/620
2002/0053983 A1 5/2002 Chamas
2003/0025714 A1 2/2003 Ebersole
2005/0231419 A1 10/2005 Mitchell
2006/0146048 A1 7/2006 Wright
2006/0178758 A1 8/2006 Koriat
2006/0181483 A1 8/2006 Ari
2006/0271249 A1 11/2006 Testrake
2007/0005199 A1 1/2007 He
2008/0319647 A1 12/2008 Dehn
2009/0112813 A1 4/2009 Jung
2009/0112817 A1 4/2009 Jung
2009/0113298 A1 4/2009 Jung
2010/0096491 A1 4/2010 Whitelaw
2010/0125412 A1 5/2010 Suddreth
2010/0182340 A1* 7/2010 Bachelder .............. G09G 3/003 345/633
2010/0283635 A1 11/2010 Brinkman
2010/0295754 A1 11/2010 Cernasov
2011/0006984 A1* 1/2011 Perbet ..................... F41G 3/225 345/158
2011/0106447 A1 5/2011 Wise
2011/0183301 A1 7/2011 Turner
2012/0156653 A1 6/2012 Wokurka
2012/0176497 A1 7/2012 Shadmi
2012/0287040 A1 11/2012 Moore
2012/0303252 A1 11/2012 Schwinn
2013/0002525 A1 1/2013 Foote
2013/0038510 A1 2/2013 Brin
2013/0050070 A1 2/2013 Lewis
2013/0162632 A1 6/2013 Varga
2013/0280678 A1 10/2013 Towers
2014/0080099 A1 3/2014 Sowadski
2014/0127655 A1 5/2014 Taylor
2014/0240313 A1 8/2014 Varga
2014/0306866 A1 10/2014 Miller
2015/0151838 A1 6/2015 Kerns
2015/0187224 A1 7/2015 Moncrief
2015/0234455 A1 8/2015 Lavalle
2015/0294505 A1* 10/2015 Atsmon .............. G06F 3/04815 345/633
2016/0019808 A1 1/2016 Chavez
2016/0027336 A1 1/2016 Towers
2016/0165409 A1 6/2016 Bulut
2016/0188857 A1 6/2016 Semba
2016/0195923 A1 7/2016 Nauseef
2016/0293133 A1 10/2016 Dutt
2017/0030735 A1 2/2017 Mohideen
2017/0064157 A1 3/2017 Lawrence
2017/0069214 A1 3/2017 Dupray
2017/0109562 A1 4/2017 Shroff
2017/0115730 A1* 4/2017 Knebel ................... G06F 3/012
2017/0139205 A1 5/2017 Lee
2017/0186240 A1 6/2017 Alaniz
2017/0262052 A1 9/2017 Richmond
2017/0308157 A1 10/2017 Tsuda
2018/0096532 A1 4/2018 Srivastav
2018/0130260 A1 5/2018 Schmirler
2018/0155052 A1 6/2018 Lacroix
2018/0190095 A1 7/2018 Leegate
2018/0253856 A1 9/2018 Price
2018/0272231 A1 9/2018 Katoh
2018/0293909 A1 10/2018 Lechner
2018/0366090 A1 12/2018 Shatzki
2019/0035258 A1 1/2019 Zhang
2019/0041979 A1* 2/2019 Kirchner ................ B64D 43/00
2019/0180717 A1* 6/2019 Haar ........................ G09G 5/37
2019/0212158 A1 7/2019 Gordon
2019/0215671 A1 7/2019 Takii
2019/0228590 A1 7/2019 Kaifosh
2019/0317718 A1 10/2019 George
2020/0151958 A1 5/2020 Livneh
2021/0049925 A1 2/2021 Robinson
2021/0201600 A1 7/2021 Ghanbari
2021/0241049 A1 8/2021 Hall
2021/0373092 A1 12/2021 Iwata
2022/0003994 A1 1/2022 Petljanski
2022/0024395 A1 1/2022 Balcombe
2022/0026987 A1 1/2022 Hu
2022/0217322 A1 7/2022 Alfaro
2023/0222689 A1 7/2023 Boggs

FOREIGN PATENT DOCUMENTS

JP 2009109319 A * 5/2009
WO 2022130028 6/2022

OTHER PUBLICATIONS

International Search Report and Written Opinion of the International Search Authority mailed Oct. 19, 2022, in International Application No. PCT/US22/27665, 17 pages.

International Search Report mailed Dec. 17, 2021, in International Application No. PCT/US2021/057357, 3 pages.

Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Dec. 1, 2016 (Year: 2016) 155 pages.

Qllin Krum, Ordinary Pilots Are Closer to Getting Fighter Jet-Like Augmented Reality Displays, Aug. 31, 2015, Jalopnik {https://

(56) References Cited

OTHER PUBLICATIONS jalopnik com/general-aviation-pilots-closer-to-getting-fighter-jet-1-1722914390) 8 pages.
Written Opinion of the International Searching Authority mailed Dec. 17, 2021, in International Application No. PCT/US2021/057357, 9 pages.
International Search Report mailed Jan. 31, 2024 in International Applicaiton No. PCT/US23/29753, 4 pages.
Written Opinion of the International Searching Authority mailed Jan. 16, 2025 in International Applicaiton No. PCT/US2024/056003, 14 pages.
Written Opinion of the International Searching Authority mailed Jan. 31, 2024 in International Applicaiton No. PCT/US23/29753, 8 pages.

* cited by examiner

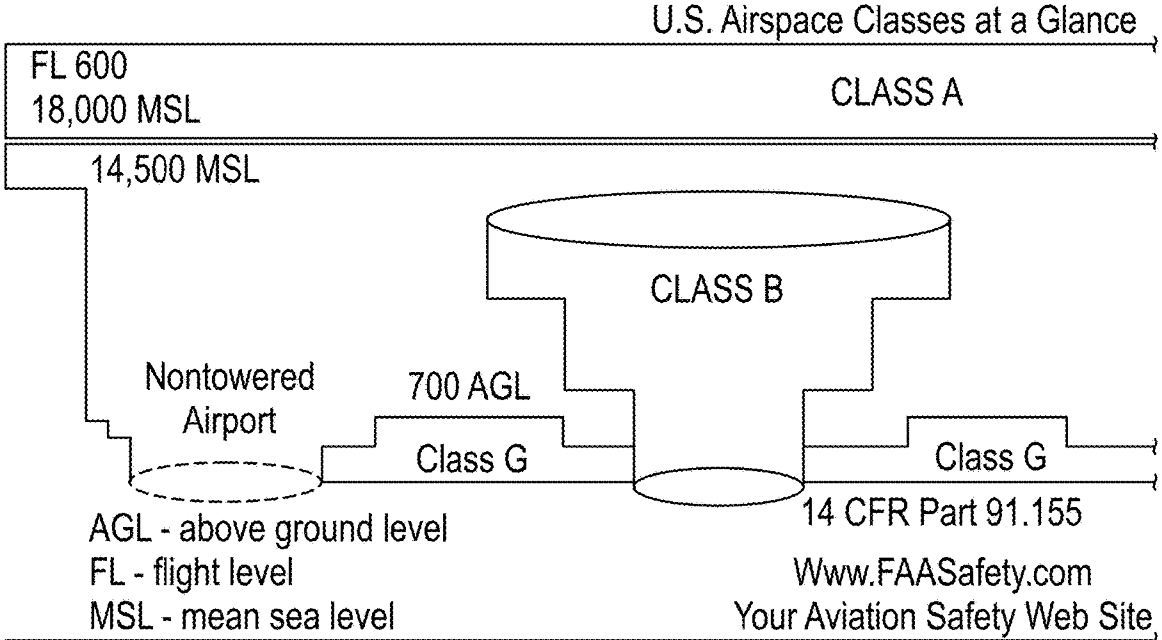

| Airspace Class | Entry Requirement | Pilot Certificate or Rating | Two-Way Communication | Altitude Decoding Transponder |
|---|---|---|---|---|
| A | ATC Clearance | Instrument | Yes | Yes |
| B | ATC Clearance | Private Certificate or student with endorsement | Yes | Yes within 30 nm of the class B primary airport[1] |
| C | VFR: Radio Contact IFR: Clearance | Student Certificate | Yes | Yes within C space and above lateral limits of C space[1] |
| D | VFR: Radio Contact IFR: Clearance | Student Certificate | Yes | No unless required by other airspace |
| E | VFR: None IFR: Clearance | Student Certificate | IFR only | No unless required by other airspace |
| G | None | Student Certificate | No | No unless required by other airspace |

[1] An altitude decoding transponder is required above 10,000 MSL.
[2] When flying 1,200 AGL or below: DAY: 1 mile visibility clear of clouds; NIGHT: 3 visibility, 500 below. 1,000 above, 2,000 horizontal

FIG. 15

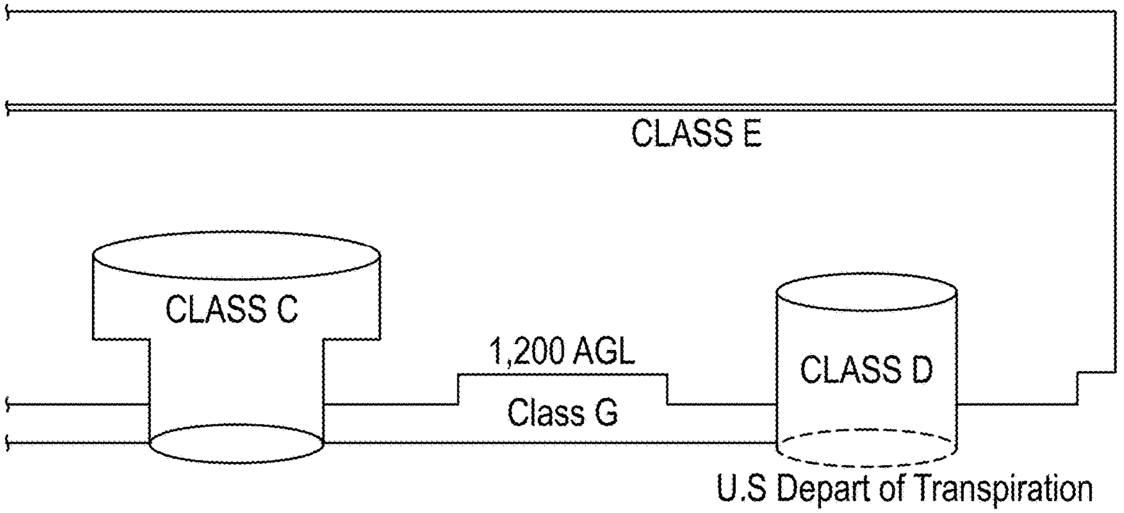

U.S Depart of Transpiration
Federal Aviation
Administration

| VFR Min. Visibility Below 10,000 MSL | VFR Min. Visibility Below 10,000 MSL and Above | VFR Cloud Clearance Below 10,000 MSL | VFR Cloud Clearance Below 10,000 MSL and above |
|---|---|---|---|
| N/A | N/A | N/A | N/A |
| 3 miles | 3 miles | Clear of Clouds | Clear of Clouds |
| 3 miles | 3 miles | 500 below<br>1,000 above<br>2,000 horizontal | 500 below<br>1,000 above<br>2,000 horizontal |
| 3 miles | 3 miles | 500 below<br>1,000 above<br>2,000 horizontal | 500 below<br>1,000 above<br>2,000 horizontal |
| 3 miles | 3 miles | 500 below<br>1,000 above<br>2,000 horizontal | 500 below<br>1,000 above<br>2,000 horizontal |
| Day: 1 miles<br>Night: 3 miles | 5 miles[2] | 500 below<br>1,000 above<br>2,000 horizontal [2] | 500 below<br>1,000 above<br>2,000 horizontal [2] |

FIG. 15
CONTINUED

METHODS, SYSTEMS, APPARATUSES, AND DEVICES FOR FACILITATING PROVISIONING OF A VIRTUAL EXPERIENCE

CROSS REFERENCE TO RELATED APPLICATIONS

The present patent application claims the benefit of U.S. Provisional Patent Application 63/397,612, filed Aug. 12, 2022, and U.S. Provisional Patent Application 63/418,258, filed Oct. 21, 2022, the entire disclosures of which are hereby incorporated herein by reference.

FIELD OF INVENTION

Generally, the present disclosure relates to the field of data processing. More specifically, the present disclosure relates to methods, systems, apparatuses, and devices for facilitating provisioning of a virtual experience.

BACKGROUND OF INVENTION

Display devices are used for various types of training, such as in simulators. Such display devices may display virtual reality and augmented reality content.

However, in some situations, movement of a display device with respect to a user using the display device may alter a perception of the content that may be displayed. For instance, due to a movement of the display device due to external forces, such as movement of display devices in flight helmets due to acceleration of aircraft, the user's perception of the displayed content may change, which is not desired.

Therefore, there is a need for improved methods, systems, apparatuses and devices for facilitating provisioning of a virtual experience that may overcome one or more of the above-mentioned problems and/or limitations.

SUMMARY OF INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

In accordance with exemplary and non-limiting embodiments, a system comprises an event camera mounted in a cockpit of an aircraft, a pre-mapped data set representing the cockpit and a processor adapted to determine a location and a position of a head-mountable device comprising one or more visual markers based, at least in part, on data from the event camera and the pre-mapped data set, wherein the data from the event camera comprises at least one image comprising a portion of the cockpit represented by the pre-mapped data set and one or more of the visual markers.

In accordance with exemplary and non-limiting embodiments, a method comprises transmitting mmWave data signals, receiving location data from a plurality of processor chips each affixed to a viewing apparatus the data indicative of an instantaneous position of each of the plurality of processor chips; and determining based, at least in part, on the location data of the plurality of processor chips a position and viewing angle of the viewing apparatus.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 15 shows a chart related to the United States airspace system's classification scheme.

DETAILED DESCRIPTION

Figure 1:
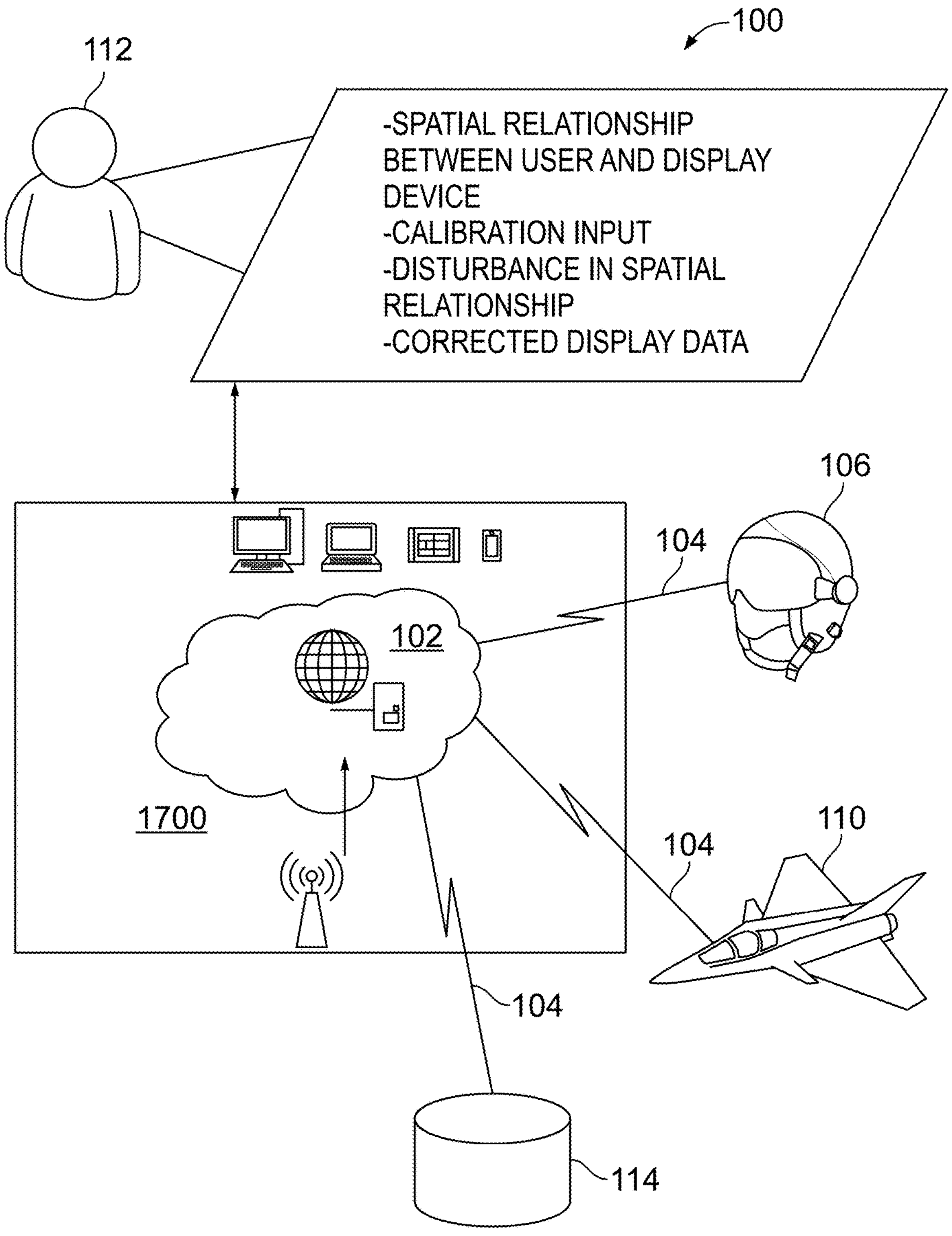
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

As used herein, extended reality (XR) refers to a family of technologies also known as augmented reality (AR), virtual reality (VR), and mixed reality (MR). AR is an interactive experience that combines the real world and computer-generated content. VR generally replaces a user's real-world environment with a simulated one. MR, sometimes referred to as a hybrid of augmented reality and virtual reality, describes the merging of a real-world environment and a computer-generated one. IN some instances in the description below, "VR" may be used interchangeably with "AR."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating provisioning of a virtual experience, embodiments of the present disclosure are not limited to use only in this context.

FIG. 1 is an illustration of an online platform 100 consistent with various embodiments of the present disclosure. By way of non-limiting example, the online platform 100 to facilitate provisioning of a virtual experience may be hosted on a centralized server 102, such as, for example, a cloud computing service. The centralized server 102 may communicate with other network entities, such as, for example, an augmented and virtual reality display device 106, a sensor system 110 of an aircraft, database 114 (such as 3D model database) over a communication network 104, such as, but not limited to, the Internet. Further, users of the online platform 100 may include relevant parties such as, but not limited to, trainees, trainers, pilots, administrators, and so on.

A user 112, such as the one or more relevant parties, may access online platform 100 through a web based software application or browser. The web based software application may be embodied as, for example, but not be limited to, a website, a web application, a desktop application, and a mobile application compatible with a computing device 1700.

Figure 2:
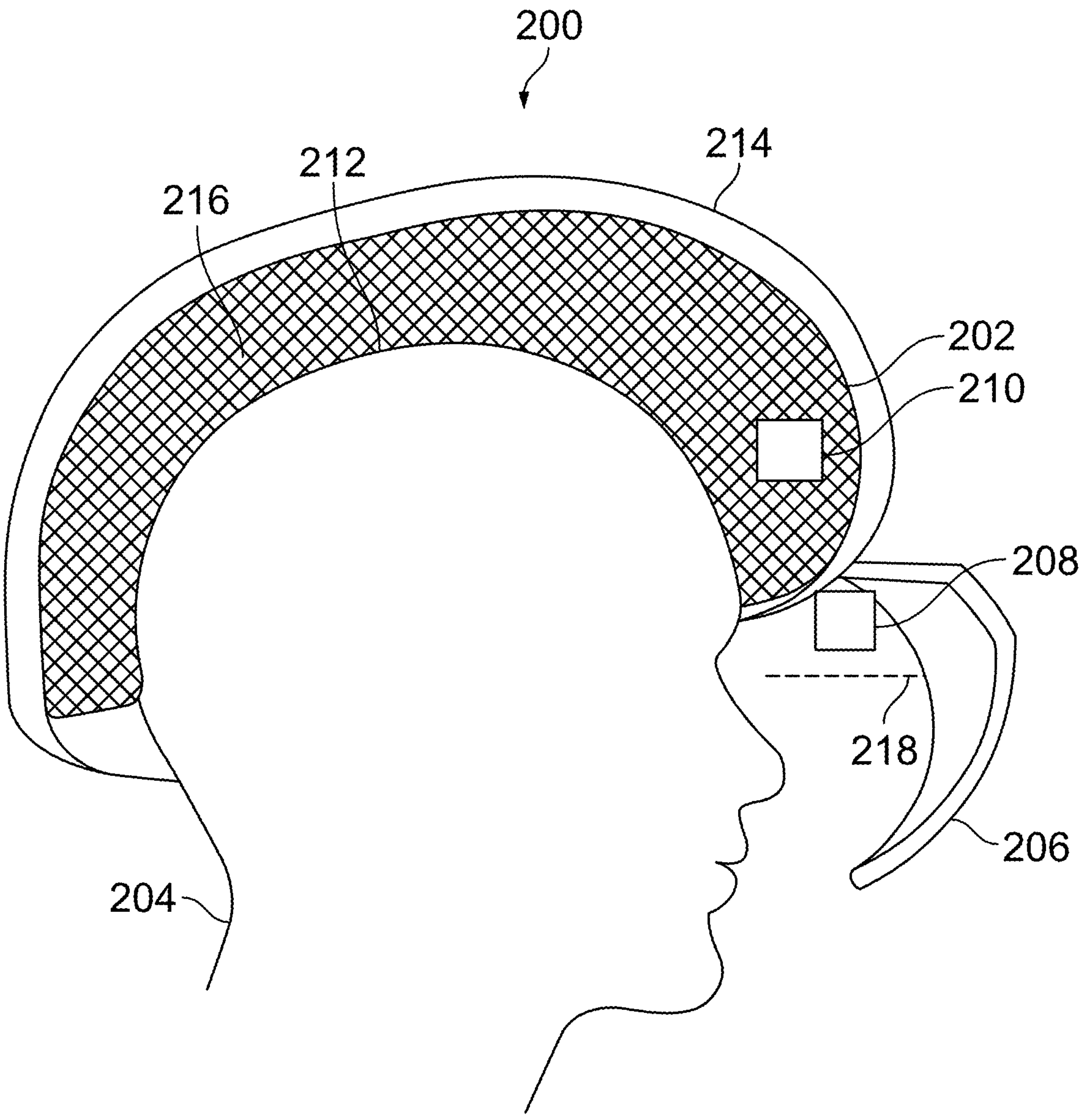
FIG. 2 shows a wearable display device for facilitating provisioning of a virtual experience, in accordance with some embodiments.

FIG. 2 shows a wearable display device 200 for facilitating provisioning of a virtual experience. In some embodiments, the wearable display device 200 may be utilized in conjunction with and/or to effectuate and/or facilitate operation of any element described elsewhere herein or illustrated in any figure herein. Further, the wearable display device 200 may include a support member 202 configured to be mounted on a user 204. Further, the support member 202 may include a structure allowing the support member 202 to be easily mountable on the user 204. For instance, the wearable display device 200 may include a head mounted device (HMD). Further, the wearable display device 200 may include a display device 206 attached to the support member 202. For instance, if the wearable display device 200 is an HMD, the HMD may include a display device in front of one eye of the user 204, (a monocular HMD), in front of both eyes of the user 204, (a binocular HMD), an optical display device (which may reflect projected images), and so on. Further, the display device 206 may be configured for displaying at least one display data. Further, the display data may include virtual reality data related to a simulation, such as a training simulation. For instance, the training simulation may correspond to vehicular racing, such as Formula 1®, and may be used by race car drivers to train for race events. Further, in an instance, the training simulation may correspond to flight training, and may be used by air force pilots for flight training in fighter aircraft. Further, in some embodiments, the display data may include augmented reality data. Accordingly, the display data may include one or more augmented reality components overlaid on top of live image. For instance, the augmented reality data may be related to flight training including a first aircraft training simultaneously with a plurality of aircrafts in different locations. Accordingly, the augmented reality data may include augmented reality components displaying the plurality of plurality of aircrafts in different locations to a display device associated with a pilot of the first aircraft. Further, the wearable display device 200 may include at least one disturbance sensor 208 configured for sensing a disturbance in a spatial relationship between the display device 206 and the user 204. Further, the spatial relationship between the display device 206 and the user 204 may include at least one of a distance and an orientation. For instance, the spatial relationship may include an exact distance, and an orientation, such as a precise angle between the display device 206 and the eyes of the user 204.

Further, the disturbance in the spatial relationship may include a change in at least one of the distance and the orientation between the display device 206 and the user 204. Further, the disturbance in the spatial relationship may lead to an alteration in how the user 204 may view the at least one display data. For instance, if the disturbance in the spatial relationship leads to a reduction in the distance between the display device 206 and the user 204, the user 204 may perceive one or more objects in the at least one display data to be closer. For instance, if the spatial relationship between the display device 206 and the user 204 specifies a distance of "x" centimeters, and the disturbance in the spatial relationship leads to a reduction in the distance between the display device 206 and the user 204 to "y" centimeters, the user 204 may perceive the at least one display data to be closer by "x-y" centimeters.

Further, the wearable display device 200 may include a processing device 210 communicatively coupled with the display device 206. Further, the processing device 210 may be configured for receiving the at least one display data. Further, the processing device 210 may be configured for analyzing the disturbance in the spatial relationship. Further, the processing device 210 may be configured for generating a correction data based on the analyzing. Further, the processing device 210 may be configured for generating a corrected display data based on the at least one display data and the correction data. Further, the correction data may include an instruction to shift a perspective view of the at least one display data to compensate for the disturbance in the spatial relationship between the display device 206 and the user 204. Accordingly, the correction data may be generated contrary to the disturbance in the spatial relationship.

For instance, the disturbance may include an angular disturbance, wherein the display device 206 may undergo an angular displacement as a result of the angular disturbance. Accordingly, the correction data may include an instruction of translation of the display data to compensate for the angular disturbance. Further, the display data may be translated along a horizontal axis of the display data, a vertical axis of the display data, a diagonal axis of the display data, and so on, to negate the angular displacement of the display data.

Further, in an instance, the disturbance may include a longitudinal disturbance, wherein the display device 206 may undergo a longitudinal displacement as a result of the longitudinal displacement. Accordingly, the correction data may include an instruction of translation of the display data to compensate for the longitudinal disturbance. Further, the display data may be projected along a distance perpendicular to a line of sight of the user 204 to negate the angular displacement of the display data. For instance, the display data may be projected along a distance perpendicular to the line of sight of the user 204 opposite to a direction of the longitudinal disturbance to compensate for the longitudinal disturbance.

Further, the support member 202 may include a head gear configured to be mounted on a head of the user 204. Further, the head gear may include a helmet configured to be worn over a crown of the head. Further, the head gear may include a shell configured to accommodate at least a part of a head of the user 204. Further, a shape of the shell may define a concavity to facilitate accommodation of at least the part of the head. Further, the shell may include an interior layer 212, an exterior layer 214 and a deformable layer 216 disposed in between the interior layer 212 and the exterior layer 214. Further, the deformable layer 216 may be configured to provide cushioning. Further, the display device 206 may be attached to at least one of the interior layer 212 and the exterior layer 214.

Further, the disturbance in the spatial relationship may be based on a deformation of the deformable layer 216 due to an acceleration of the head gear. Further, the spatial relationship may include at least one vector representing at least one position of at least one part of the display device 206 in relation to at least one eye of the user 204. Further, a vector of the at least one vector may be characterized by an orientation and a distance. For instance, the spatial relationship between the display device 206 and the user 204 may include at least one of a distance and an orientation. For instance, the spatial relationship may include an exact distance, and an orientation, such as a precise angle between the display device 206 and the eyes of the user 204. Further, the spatial relationship may describe an optimal arrangement of the display device 206 with respect to the user 204. Further, so that the optimal arrangement of the display device 206 with respect to the user 204 may allow the user to clearly view the display data without perceived distortion.

Further, in some embodiments, the at least one disturbance sensor 208 may include an accelerometer configured for sensing the acceleration. Further, in some embodiments, the at least one disturbance sensor 208 may include at least one proximity sensor configured for sensing at least one proximity between the at least one part of the display device 206 and the user 204. Further, in some embodiments, the at least one disturbance sensor 208 may include a deformation sensor configured for sensing a deformation of the deformable layer 216.

Further, in some embodiments, the display device 206 may include a see-through display device 206 configured to allow the user 204 to view a physical surrounding of the wearable device.

Further, in some embodiments, the at least one display data may include at least one object model associated with at least one object. Further, in some embodiments, the generating of the corrected display data may include applying at least one transformation to the at least one object model based on the correction data.

Further, the applying of the at least one transformation to the at least one object model based on the correction data may include translation of the display data to compensate for the angular disturbance. For instance, the correction data may include one or more instructions to translate the display data along a horizontal axis of the display data, a vertical axis of the display data, a diagonal axis of the display data, and so on, to negate the angular displacement of the display data. Accordingly, the applying of the at least one transformation to the at least one object model based on the correction data may include translation of the display data along the horizontal axis, the vertical axis, and the diagonal axis of the display data, to negate the angular displacement of the display data. Further, in an instance, if the correction data includes an instruction of translation of the display data to compensate for the longitudinal disturbance, the applying of the at least one transformation to the at least one object model based on the correction data may include translation may include projection of the display data along a distance perpendicular to a line of sight of the user 204 to negate the angular displacement of the display data. For instance, the applying of the at least one transform may include projection of the display data along a distance perpendicular to the line of sight of the user 204 opposite to a direction of the longitudinal disturbance to compensate for the longitudinal disturbance.

Further, in some embodiments, the at least one disturbance sensor 208 may include a camera configured to capture an image of each of a face of the user 204 and at least a part of the head gear. Further, the spatial relationship may include disposition of at least the part of the head gear in relation to the face of the user 204.

Further, in some embodiments, the at least one disturbance sensor 208 may include a camera disposed on the display device 206. Further, the camera may be configured to capture an image of at least a part of a face of the user 204. Further, the wearable display device 200 may include a calibration input device configured to receive a calibration input. Further, the camera may be configured to capture a reference image of at least the part of the face of the user 204 based on receiving the calibration input. Further, the calibration input may be received in an absence of the disturbance. For instance, the calibration input device may include a button configured to be pushed by the user 204 in absence of the disturbance whereupon the reference image of at least the part of the face of the user 204 may be captured. Further, the analyzing of the disturbance may include comparing the reference image with a current image of at least the part of the face of the user 204. Further, the current image may be captured by the camera in a presence of the disturbance. Further, determining the correction data may include determining at least one spatial parameter change based on the comparing. Further, the at least one spatial parameter change may correspond to at least one of a displacement of at least the part of the face relative to the camera and a rotation about at least one axis of at least the part of the face relative to the camera.

Further, in some embodiments, the generating of the corrected display data may include applying at least one image transform on the at least one display data based on the at least one spatial parameter change.

Further, in some embodiments, the wearable display device 200 may include at least one actuator coupled to the display device 206 and the support member 202. Further, the at least one actuator may be configured for modifying the spatial relationship based on a correction data.

Figure 3:
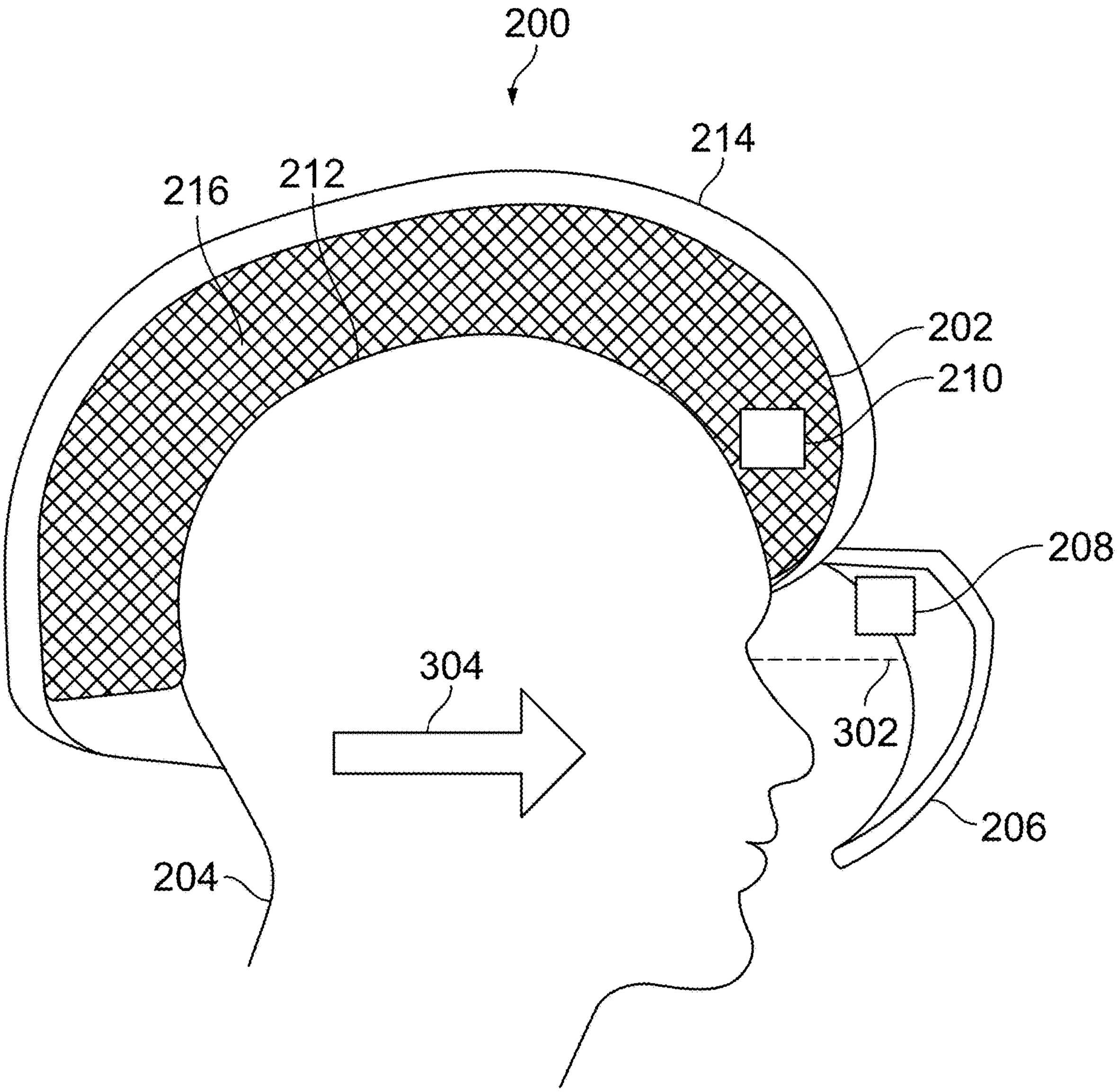
FIG. 3 shows a wearable display device for facilitating provisioning of a virtual experience with a compressed deformable layer, in accordance with some embodiments.

Further, the spatial relationship between the display device 206 and the user 204 may include at least one of a distance 218 and an orientation. Further, the disturbance in the spatial relationship between the display device 206 and the user 204 may include a change in at least one of the distance 218, the angle, the direction, and the orientation. Further, the distance 218 may include a perceived distance between the user 204 and the at least one display data. For instance, as shown in FIG. 3, the disturbance in the spatial relationship may originate due to a forward acceleration 304 of the user 204 and the wearable display device 200. Accordingly, the deformation of the deformable layer 216 may lead to a disturbance in the spatial relationship leading to a change in the distance 218 to a reduced distance 302 between the display device 206 and the user 204. Accordingly, the correction data may include transforming of the at least one display data through object level processing and restoring the at least one display data to the distance 218 from the user 204. Further, the object level processing may include projecting one or more objects in the display data at the distance 218 instead of the distance 302 to oppose the disturbance in the spatial relationship. Further, the disturbance in the spatial relationship may include a change in the angle between the display device 206 and the user 204. Further, the angle between the display device 206 and the user 204 in the spatial relationship may be related to an original viewing angle related to the display data. Further, the original viewing angle related to the display data may be a viewing angle at which the user 204 may view the display data through the display device 206. Further, the disturbance in the spatial relationship may lead to a change in the original viewing angle related to the display data. Accordingly, the at least one display data may be transformed through pixel level processing to restore the original viewing angle related to the display data. Further, the pixel level processing may include translation of the display data to compensate for the change in the angle in the spatial relationship. Further, the display data may be translated along a horizontal axis of the display data, a vertical axis of the display data, a diagonal axis of the display data, and so on, to negate the angular displacement of the display data to compensate for the change in the angle in the spatial relationship, and to restore the original viewing angle related to the display data.

Further, in some embodiments, the actuator may be configured for modifying the spatial relationship based on the correction data. Further, the correction data may include at least one operational instruction corresponding to the actuator to oppose the disturbance in the spatial relationship, such as, but not limited to, modification of the distance, such as increasing of the distance 302 to the distance 218. Further, the correction data may include at least one operational instruction corresponding to the actuator to oppose the disturbance in the spatial relationship such as, but not limited to, the orientation opposing the disturbance in the spatial relationship.

Figure 4:
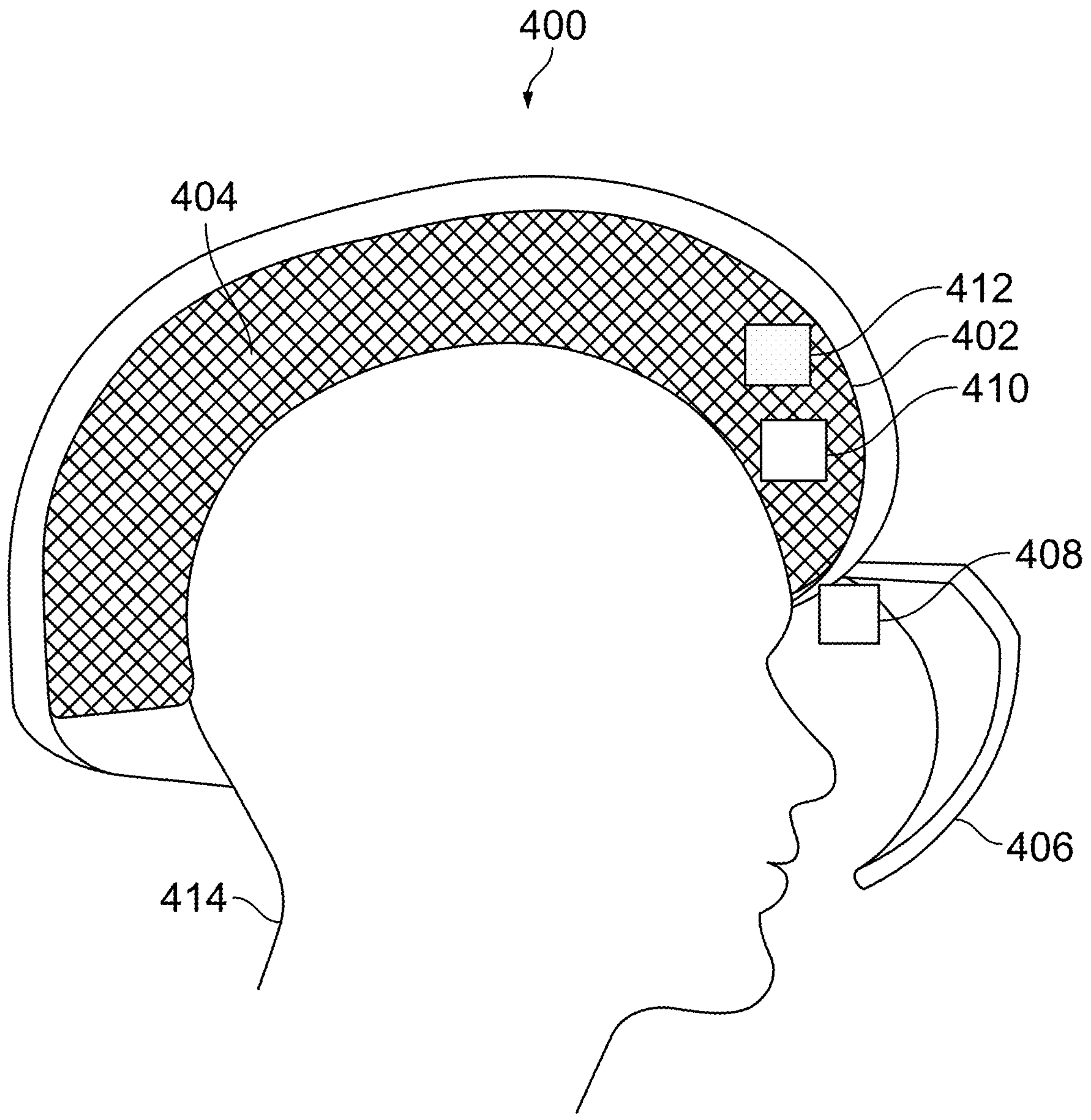
FIG. 4 shows a wearable display device including an actuator for facilitating provisioning of a virtual experience, in accordance with some embodiments.

FIG. 4 shows a wearable display device 400 for facilitating provisioning of a virtual experience, in accordance with some embodiments. In some embodiments, the wearable display device 400 may be utilized in conjunction with and/or to effectuate and/or facilitate operation of any element described elsewhere herein or illustrated in any figure herein. Further, the wearable display device 400 may include a support member 402 configured to be mounted on a user 414. Further, the support member 402 may include a deformable member 404.

Further, the wearable display device 400 may include a display device 406 attached to the support member 402. Further, the display device 406 may be configured for displaying at least one display data.

Further, the wearable display device 400 may include at least one disturbance sensor 408 configured for sensing a disturbance in a spatial relationship between the display device 406 and the support member 402.

Further, the spatial relationship between the display device 400 and the user 414 may include at least one of a distance and an orientation. For instance, the spatial relationship may include an exact distance, and an orientation, such as a precise angle between the display device 406 and the eyes of the user 414. Further, the disturbance in the spatial relationship may include a change in the at least of the distance and the orientation between the display device 406 and the user 414. Further, the disturbance in the spatial relationship may lead to an alteration in how the user 414 may view the at least one display data. For instance, if the disturbance in the spatial relationship leads to a reduction in the distance between the display device 406 and the user 414, the user 414 may perceive one or more objects in the at least one display data to be closer. For instance, if the spatial relationship between the display device 406 and the user 414 specifies a distance of "x" centimeters, and the disturbance in the spatial relationship leads to a reduction in the distance between the display device 406 and the user 414 to "y" centimeters, the user 414 may perceive the at least one display data to be closer by "x-y" centimeters.

Further, the wearable display device 400 may include at least one actuator 410 coupled to the display device 406 and the support member 402. Further, the at least one actuator 410 may be configured for modifying the spatial relationship between the display device 406 and the user 414. Further, in an embodiment, the at least one actuator 410 may be configured for modifying the spatial relationship to oppose the disturbance in the spatial relationship. Further, in an embodiment, the at least one actuator 410 may be configured for modifying the spatial relationship based on the correction data. For instance, the at least one actuator 410 may be configured for actuating a connected motor, such as an AC motor or a DC motor controlling an extendable rail mechanism connecting the display device 406 and the support member 402. For instance, if the disturbance in the spatial relationship leads to a reduction in the distance between the display device 406 and the user 414, the user 414 may perceive one or more objects in the at least one display data to be closer. For instance, if the spatial relationship between the display device 406 and the user 414 specifies a distance of "x" centimeters, and the disturbance in the spatial relationship leads to a reduction in the distance between the display device 406 and the user 414 to "y" centimeters, the user 414 may perceive the at least one display data to be closer by "x-y" centimeters. Accordingly, the at least one actuator 410 may transmit an actuating signal to the connected motor to increase the distance between the display device 406 and the user 414 by "x-y" centimeters to the distance of "x" centimeters.

Further, in an embodiment, the at least one actuator 410 may be connected to a servo motor configured to control the angle in the spatial relationship through a 6-axis rotary mechanism. Accordingly, if the disturbance in the spatial relationship leads to a change in the angle between the display device 406 and the user 414, the user 414 may perceive the at least one display data to be skewed. For instance, if the spatial relationship between the display device 406 and the user 414 specifies the display device 406 to be significantly parallel to the user 414, and the disturbance in the spatial relationship leads the display device 406 to be skewed by an angle of 30 degrees towards the user 414, the at least one actuator 410 may transmit an actuating signal to the connected servo motor, which may alter the angle in the spatial relationship by 30 degrees oppositely to the disturbance in the spatial relationship through the 6-axis rotary mechanism.

Further, the wearable display device 400 may include a processing device 412 communicatively coupled with the display device 406. Further, the processing device 412 may be configured for receiving the at least one display data. Further, the processing device 412 may be configured for analyzing the disturbance in the spatial relationship. Further, the processing device 412 may be configured for generating the actuation data based on the analyzing.

Figure 5:
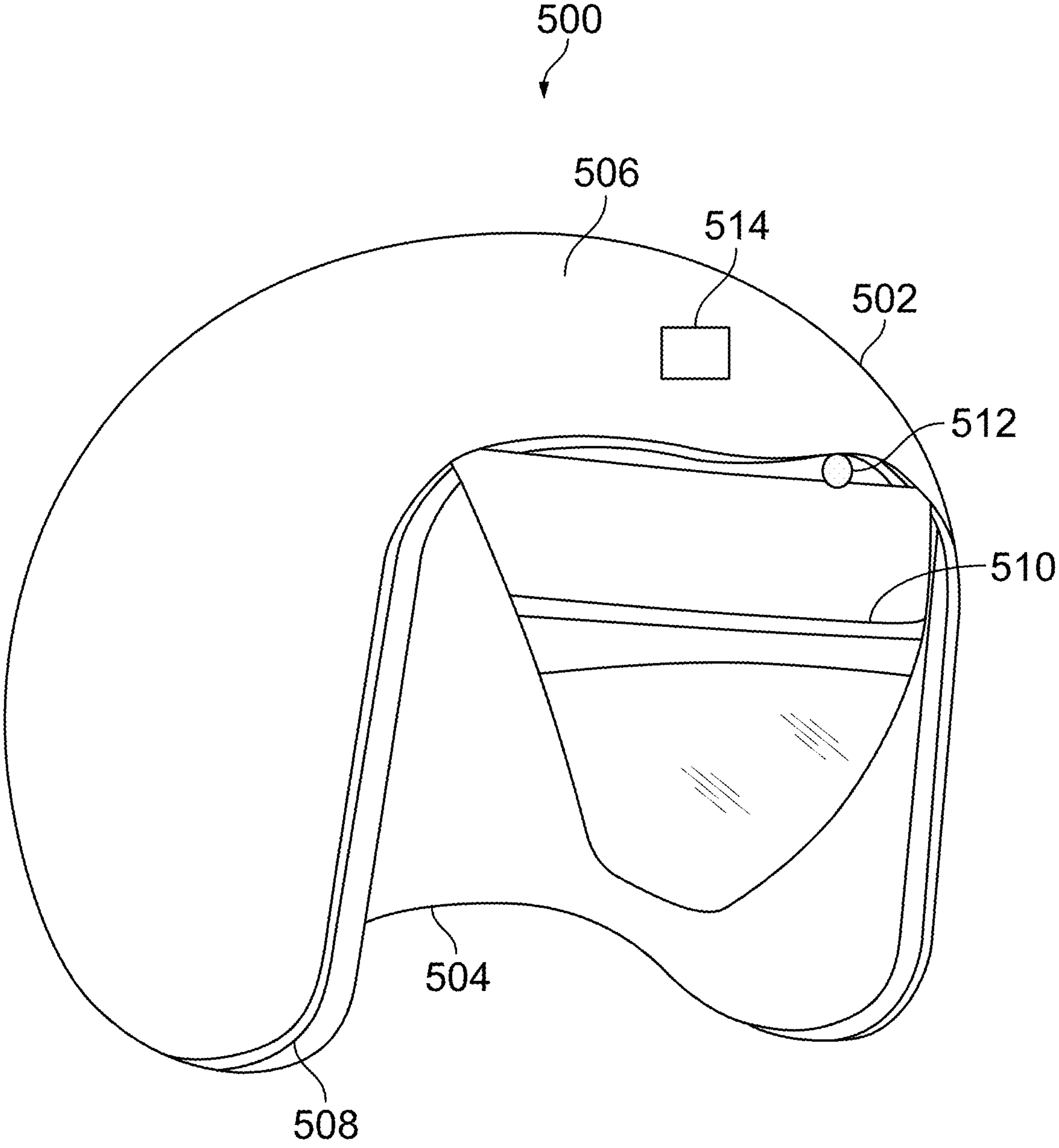
FIG. 5 shows a wearable head gear for facilitating provisioning of a virtual experience, in accordance with some embodiments.

FIG. 5 shows a wearable display device 500 for facilitating provisioning of a virtual experience, in accordance with some embodiments. In some embodiments, the wearable display device 500 may be utilized in conjunction with and/or to effectuate and/or facilitate operation of any element described elsewhere herein or illustrated in any figure herein. Further, the wearable display device 500 may include a head gear 502 including a shell configured to accommodate at least a part of a head of the user. Further, a shape of the shell may define a concavity to facilitate accommodation of at least the part of the head. Further, the shell may include an interior layer 504, an exterior layer 506 and a deformable layer 508 disposed in between the interior layer 504 and the exterior layer 506. Further, the deformable layer 508 may be configured to provide cushioning.

Further, the wearable display device 500 may include a display device 510 attached to at least one of the interior layer 504 and the exterior layer 506. Further, the display device 510 may be configured for displaying at least one display data.

Further, the wearable display device 510 may include at least one disturbance sensor 512 configured for sensing a disturbance in a spatial relationship between the display device 510 and the at least one of the interior layer 504 and the exterior layer 506.

Further, the wearable display device 500 may include a processing device 514 communicatively coupled with the display device 510. Further, the processing device 514 may be configured for receiving the at least one display data.

Further, the processing device 514 may be configured for analyzing a disturbance in the spatial relationship. Further, the processing device 514 may be configured for generating a correction data based on the analyzing. Further, the processing device 514 may be configured for generating a corrected display data based on the at least one display data and the correction data. Further, the display device 510 may be configured to display the corrected display data.

Figure 6:
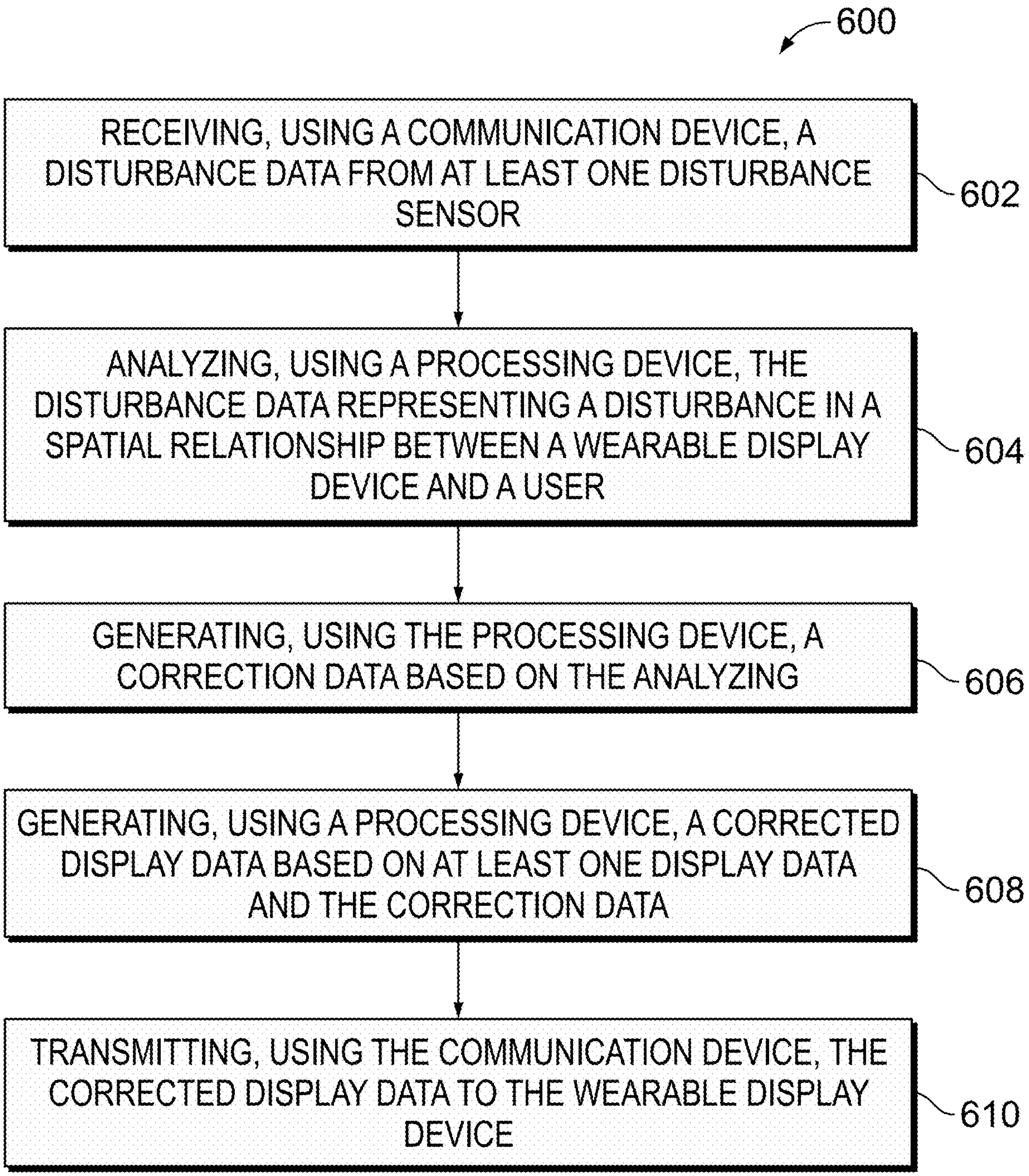
FIG. 6 shows a method for facilitating provisioning of a virtual experience through a wearable display device, in accordance with some embodiments.

FIG. 6 shows a method 600 for facilitating provisioning of a virtual experience through a wearable display device, such as the wearable display device 200, in accordance with some embodiments.

At 602, the method 600 may include receiving, using a communication device, a disturbance data from at least one disturbance sensor. Further, the at least one disturbance sensor may be configured for sensing a disturbance in a spatial relationship between a display device and a user. At 604, the method 600 may include analyzing, using a processing device, the disturbance in the spatial relationship. At 606, the method 600 may include generating, using the processing device, a correction data based on the analyzing. At 608, the method 600 may include generating, using the processing device, a corrected display data based on at least one display data and the correction data. At 610, the method 600 may include transmitting, using the communication device, the corrected display data to the wearable display device. Further, the wearable display device may be configured to be worn by the user. Further, the wearable display device may include a display device. Further, the display device may be configured for displaying the corrected display data.

Figure 7:
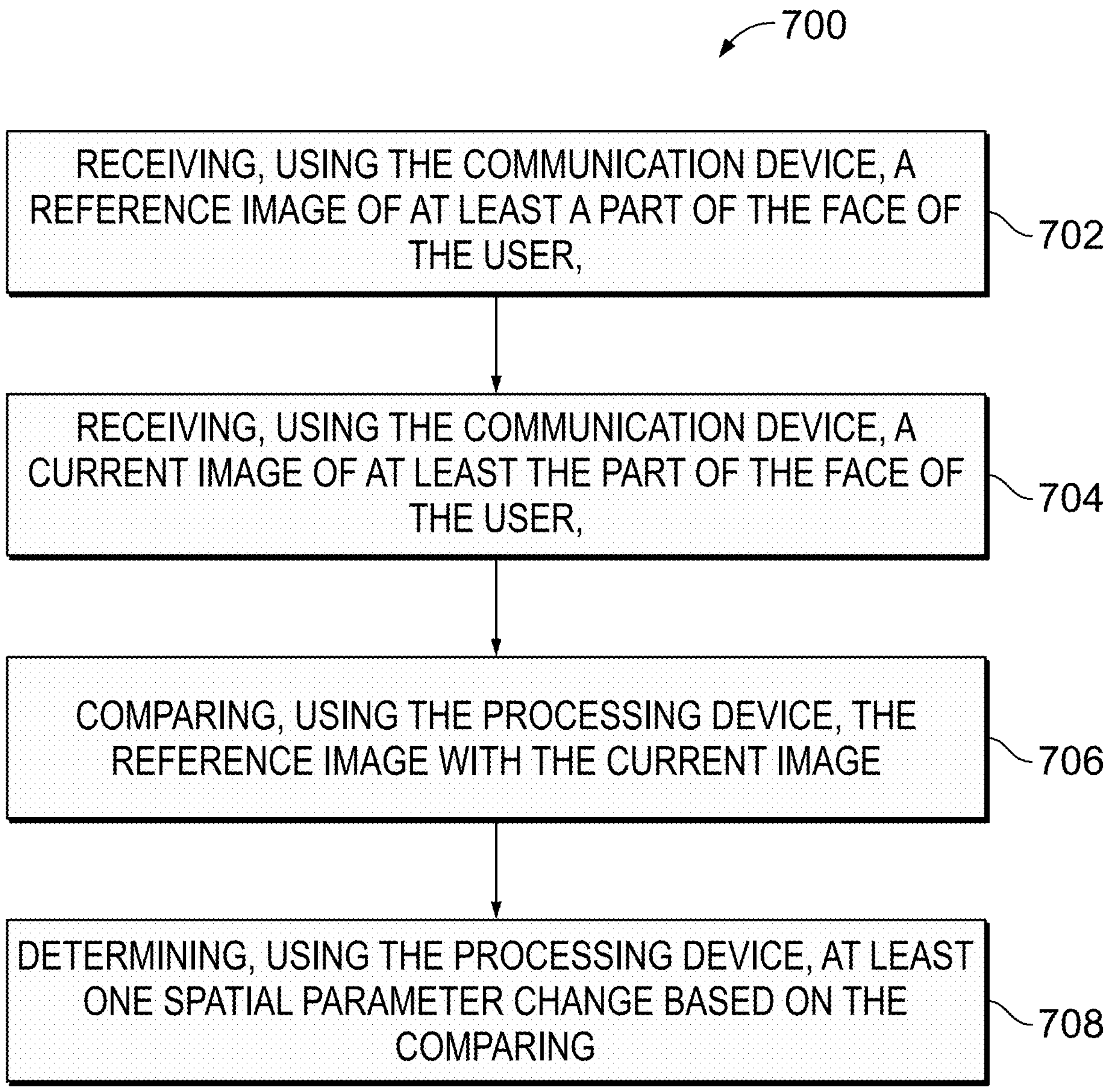
FIG. 7 shows a method for determining a spatial parameter change associated with a wearable display device in relation to a user, in accordance with some embodiments.

FIG. 7 shows a method 700 for determining a spatial parameter change, in accordance with some embodiments. At 702, the method 700 may include receiving, using the communication device, a reference image of at least a part of the face of the user. Further, the at least one disturbance sensor may include a camera disposed on the display device. Further, the camera may be configured to capture an image of at least the part of a face of the user. Further, the wearable display device may include a calibration input device configured to receive a calibration input. Further, the camera may be configured to capture the reference image of at least the part of the face of the user based on receiving the calibration input. Further, the calibration input may be received in an absence of the disturbance.

At 704, the method 700 may include receiving, using the communication device, a current image of at least the part of the face of the user. Further, the current image may be captured by the camera in a presence of the disturbance. At 706, the method 700 may include comparing, using the processing device, the reference image with the current image. At 708, the method 700 may include determining using the processing device, at least one spatial parameter change based on the comparing. Further, the at least one spatial parameter change may correspond to at least one of a displacement of at least the part of the face relative to the camera and a rotation, about at least one axis, of at least the part of the face relative to the camera. Further, the generating of the corrected display data may include applying at least one image transform on the at least one display data based on the at least one spatial parameter change. Further, the part of the face may include the eyes of the user. Further, the reference image may include at least one reference spatial parameter corresponding to the eyes. Further, the current image may include at least one current spatial parameter corresponding to the eyes. Further, the at least one spatial parameter change may be independent of a gaze of the eyes.

Figure 8:
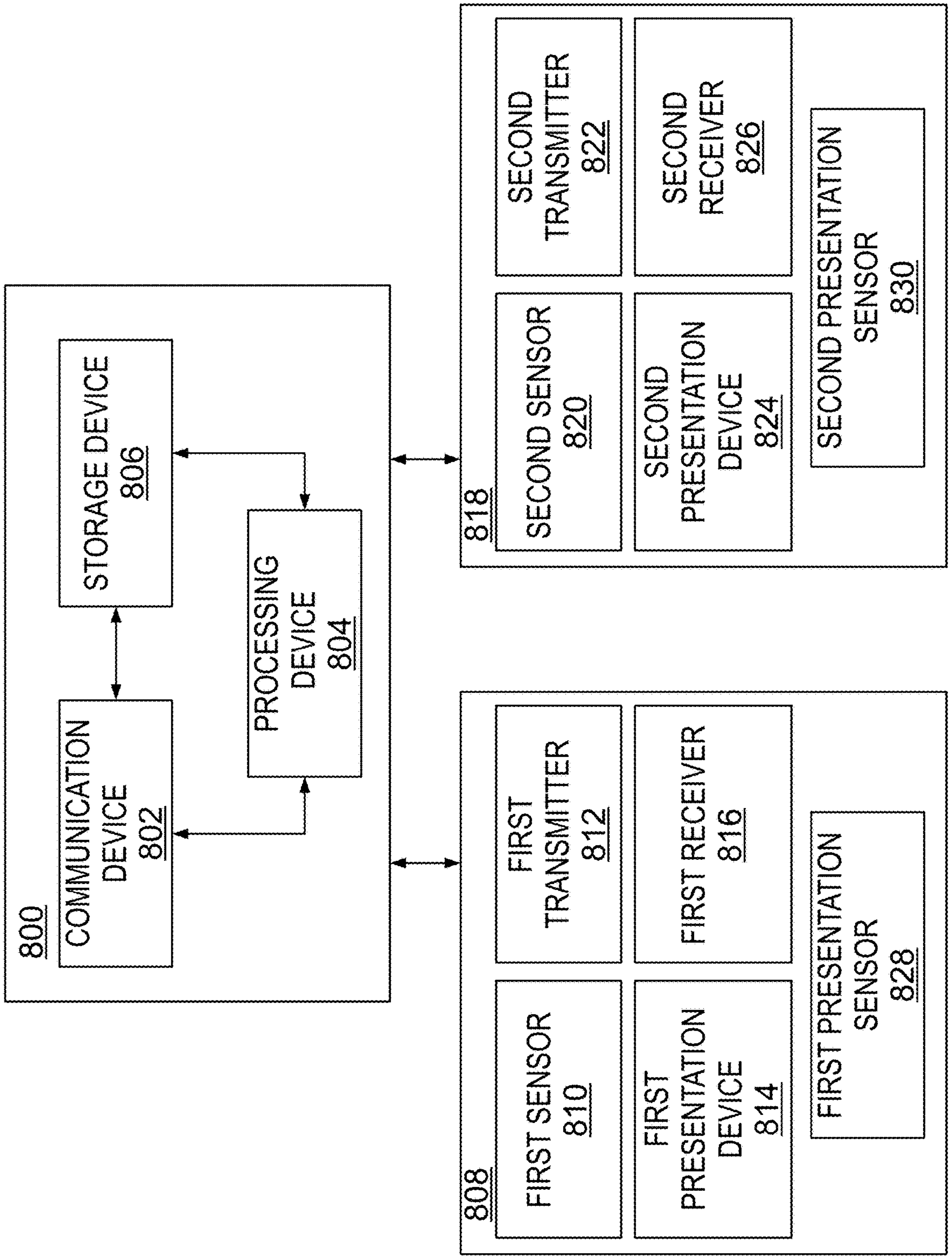
FIG. 8 is a block diagram of a system for facilitating provisioning of a virtual experience in accordance with some embodiments.

FIG. 8 is a block diagram of a system 800 for facilitating provisioning of a virtual experience in accordance with some embodiments. The system 800 may include a communication device 802, a processing device 804 and a storage device 806.

The communication device 802 may be configured for receiving at least one first sensor data corresponding to at least one first sensor 810 associated with a first vehicle 808. Further, the at least one first sensor 810 may be communicatively coupled to a first transmitter 812 configured for transmitting the at least one first sensor data over a first communication channel. In some embodiments, the first vehicle 808 may be a first aircraft. Further, the first user may be a first pilot.

Further, the communication device 802 may be configured for receiving at least one second sensor data corresponding to at least one second sensor 820 associated with a second vehicle 818. Further, the at least one second sensor 820 may be communicatively coupled to a second transmitter 822 configured for transmitting the at least one second sensor data over a second communication channel. In some embodiments, the second vehicle 818 may be a second aircraft. Further, the second user may be a second pilot.

In some embodiments, the at least one first sensor data may be received from a first On-Board-Diagnostics (OBD) system of the first vehicle 808, the at least one second sensor data may be received from a second On-Board-Diagnostics (OBD) system of the second vehicle 818.

Further, the communication device 802 may be configured for receiving at least one first presentation sensor data from at least one first presentation sensor 828 associated with the first vehicle 808. Further, the at least one first presentation sensor 828 may be communicatively coupled to the first transmitter configured for transmitting the at least one first presentation sensor data over the first communication channel. Further, in an embodiment, the at least one first presentation sensor 828 may include a disturbance sensor, such as the disturbance sensor 208 configured for sensing a disturbance in a first spatial relationship between at least one first presentation device 814 associated with the first vehicle 808, and the first user. Further, the spatial relationship between the at least one first presentation device 814 and the first user may include at least one of a distance and an orientation. For instance, the first spatial relationship may include an exact distance, and an orientation, such as a precise angle between the at least one first presentation device 814 and the eyes of the first user. Further, the disturbance in the first spatial relationship may include a change in the at least of the distance and the orientation between the at least one first presentation device 814 and the first user.

Further, the communication device 802 may be configured for receiving at least one second presentation sensor data from at least one second presentation sensor 830 associated with the second vehicle 818.

Further, in an embodiment, the at least one second presentation sensor 830 may include a disturbance sensor configured for sensing a disturbance in a second spatial relationship between at least one second presentation device 824 associated with the second vehicle 818, and the second user.

Further, the at least one second presentation sensor 830 may be communicatively coupled to the first transmitter configured for transmitting the at least one second presentation sensor data over the second communication channel.

Further, the communication device 802 may be configured for transmitting at least one first optimized presentation data to at least one first presentation device 814 associated with the first vehicle 808. Further, in an embodiment, at least one first presentation device 814 may include a wearable display device facilitating provisioning of a virtual experience, such as the wearable display device 200. Further, in an embodiment, the at least one first optimized presentation data may include a first corrected display data generated based on a first correction data.

Further, the at least one first presentation device 814 may include a first receiver 816 configured for receiving the at least one first optimized presentation data over the first communication channel. Further, the at least one first presentation device 814 may be configured for presenting the at least one first optimized presentation data.

Further, the communication device 802 may be configured for transmitting at least one second optimized presentation data to at least one first presentation device 814 associated with the first vehicle 808. Further, the first receiver 816 may be configured for receiving the at least one second optimized presentation data over the first communication channel. Further, the at least one first presentation device 814 may be configured for presenting the at least one second optimized presentation data.

Further, in an embodiment, the at least one second optimized presentation data may include a second corrected display data generated based on a second correction data.

Further, the communication device 802 may be configured for transmitting at least one second optimized presentation data to at least one second presentation device 824 associated with the second vehicle 818. Further, the at least one second presentation device 824 may include a second receiver 826 configured for receiving the at least one second optimized presentation data over the second communication channel. Further, the at least one first presentation device 824 may be configured for presenting the at least one second optimized presentation data.

Further, the processing device 804 may be configured for analyzing the at least one first presentation sensor data associated with the first vehicle 808.

Further, the processing device 804 may be configured for analyzing the at least one second presentation sensor data associated with the second vehicle 818.

Further, the processing device 804 may be configured for generating the first correction data based on the analyzing the at least one first presentation sensor data associated with the first vehicle 808. Further, the first correction data may include an instruction to shift a perspective view of the at least one first optimized presentation data to compensate for the disturbance in the first spatial relationship between the first presentation device 814 and the first user. Accordingly, the first correction data may be generated contrary to the disturbance in the first spatial relationship. For instance, the disturbance may include an angular disturbance, wherein the first presentation device 814 may undergo an angular displacement as a result of the angular disturbance. Accordingly, the first correction data may include an instruction of translation to generate the first corrected display data included in the first optimized presentation data to compensate for the angular disturbance.

Further, the processing device 804 may be configured for generating the second correction data based on the analyzing the at least one second presentation sensor data associated with the second vehicle 818. Further, the second correction data may include an instruction to shift a perspective view of the at least one second optimized presentation data to compensate for the disturbance in the second spatial relationship between the second presentation device 824 and the second user. Accordingly, the second correction data may be generated contrary to the disturbance in the second spatial relationship. For instance, the disturbance may include an angular disturbance, wherein the second presentation device 824 may undergo an angular displacement as a result of the angular disturbance. Accordingly, the second correction data may include an instruction of translation to generate the second corrected display data included in the second optimized presentation data to compensate for the angular disturbance.

Further, the processing device 804 may be configured for generating the at least one first optimized presentation data based on the at least one second sensor data.

Further, the processing device 804 may be configured for generating the at least one first optimized presentation data based on the at least one first presentation sensor data.

Further, the processing device 804 may be configured for generating the at least one second optimized presentation data based on the at least one first sensor data.

Further, the processing device 804 may be configured for generating the at least one second optimized presentation data based on the at least one second presentation sensor data.

Further, the storage device 806 may be configured for storing each of the at least one first optimized presentation data and the at least one second optimized presentation data.

In some embodiments, the at least one first sensor 810 may include one or more of a first orientation sensor, a first motion sensor, a first accelerometer, a first location sensor, a first speed sensor, a first vibration sensor, a first temperature sensor, a first light sensor and a first sound sensor. Further, the at least one second sensor 820 may include one or more of a second orientation sensor, a second motion sensor, a second accelerometer, a second location sensor, a second speed sensor, a second vibration sensor, a second temperature sensor, a second light sensor and a second sound sensor.

In some embodiments, the at least one first sensor 810 may be configured for sensing at least one first physical variable associated with the first vehicle 808. Further, the at least one second sensor 820 may be configured for sensing at least one second physical variable associated with the second vehicle 818. In further embodiments, the at least one first physical variable may include one or more of a first orientation, a first motion, a first acceleration, a first location, a first speed, a first vibration, a first temperature, a first light intensity and a first sound. Further, the at least one second physical variable may include one or more of a second orientation, a second motion, a second acceleration, a second location, a second speed, a second vibration, a second temperature, a second light intensity and a second sound.

In some embodiments, the at least one first sensor 810 may include a first environmental sensor configured for sensing a first environmental variable associated with the first vehicle 808. Further, the at least one second sensor 820 may include a second environmental sensor configured for sensing a second environmental variable associated with the second vehicle 818.

In some embodiments, the at least one first sensor 810 may include a first user sensor configured for sensing a first user variable associated with a first user of the first vehicle 808. Further, the at least one second sensor 820 may include a second user sensor configured for sensing a second user variable associated with a second user of the second vehicle 818.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the at least one first sensor 810 configured for sensing the first user location and a first user orientation sensor of the at least one first sensor 810 configured for sensing the first user orientation. The first head mount display is explained in further detail in conjunction with FIG. 9 below. Further, the second head mount display may include a second user location sensor of the at least one second sensor 820 configured for sensing the second user location, a second user orientation sensor of the at least one second sensor 820 configured for sensing the second user orientation.

In further embodiments, the first vehicle 808 may include a first user location sensor of the at least one first sensor 810 configured for sensing the first user location and a first user orientation sensor of the at least one first sensor 810 configured for sensing the first user orientation. Further, the second vehicle 818 may include a second user location sensor of the at least one second sensor 820 configured for sensing the second user location, a second user orientation sensor of the at least one second sensor 820 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the at least one first presentation device 814. Further, the second user location sensor may include a second proximity sensor configured for sensing the second user location in relation to the at least one second presentation device 824.

Further, in some embodiments, the at least one first presentation sensor 828 may include at least one sensor configured for sensing at least one first physical variable associated with the first presentation device 814 associated with the first vehicle 808, such as due to a G-Force, a frictional force, and an uneven movement of the first vehicle 808. For instance, the at least one first presentation sensor 828 may include at least one camera configured to monitor a movement of the first presentation device 814 associated with the first vehicle 808. Further, the at least one first presentation sensor 828 may include at least one accelerometer sensor configured to monitor an uneven movement of the first presentation device 814 associated with the first vehicle 808, such as due to a G-Force, a frictional force, and an uneven movement of the first vehicle 808. Further, the at least one first presentation sensor 828 may include at least one gyroscope sensor configured to monitor an uneven orientation of the first presentation device 814 associated with the first vehicle 808, such as due to a G-Force, a frictional force, and an uneven movement of the first vehicle 808.

Further, the at least one second presentation sensor 830 may include at least one sensor configured for sensing at least one first physical variable associated with the second presentation device 824 associated with the second vehicle 818, such as due to a G-Force, a frictional force, and an uneven movement of the second vehicle 818. For instance, the at least one second presentation sensor 830 may include at least one camera configured to monitor a movement of the second presentation device 824 associated with the second vehicle 818. Further, the at least one second presentation sensor 830 may include at least one accelerometer sensor configured to monitor an uneven movement of the second presentation device 824 associated with the second vehicle 818, such as due to a G-Force, a frictional force, and an uneven movement of the second vehicle 818. Further, the at least one second presentation sensor 830 may include at least one gyroscope sensor configured to monitor an uneven orientation of the second presentation device 824 associated with the second vehicle 818, such as due to a G-Force, a frictional force, and an uneven movement of the second vehicle 818.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the at least one first sensor 810 may include a first camera configured for capturing a first image of the first optical marker. Further, the at least one first sensor 810 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the at least one second sensor 820 may include a second camera configured for capturing a second image of the second optical marker. Further, the at least one second sensor 820 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 808. Further, the second presentation device may include a second see-through display device disposed in a second windshield of the second vehicle 818.

In some embodiments, the first vehicle 808 may include a first watercraft, a first land vehicle, a first aircraft and a first amphibious vehicle. Further, the second vehicle 818 may include a second watercraft, a second land vehicle, a second aircraft and a second amphibious vehicle.

In some embodiments, the at least one may include one or more of a first visual data, a first audio data and a first haptic data. Further, the at least one second optimized presentation data may include one or more of a second visual data, a second audio data and a second haptic data.

In some embodiments, the at least one first presentation device 814 may include at least one environmental variable actuator configured for controlling at least one first environmental variable associated with the first vehicle 808 based on the first optimized presentation data. Further, the at least one second presentation device 824 may include at least one environmental variable actuator configured for controlling at least one second environmental variable associated with the second vehicle 818 based on the second optimized presentation data. In further embodiments, the at least one first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the at least one second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 808 may include each of the at least one first sensor 810 and the at least one first presentation device 814. Further, the second vehicle 818 may include each of the at least one second sensor 820 and the at least one second presentation device 824.

In some embodiments, the storage device 806 may be further configured for storing a first three-dimensional model corresponding to the first vehicle 808 and a second three-dimensional model corresponding to the second vehicle 818. Further, the generating of the first optimized presentation data may be based further on the second three-dimensional model. Further, the generating of the second optimized presentation data may be based further on the first three-dimensional model.

Further, the generating of the first optimized presentation data may be based on the determining of the unwanted movement of the associated with the first presentation device 814 associated with the first vehicle 808, such as due to a G-Force, a frictional force, and an uneven movement of the first vehicle 808. For instance, the at least one first presentation sensor 828 may include at least one camera configured to monitor a movement of the first presentation device 814 associated with the first vehicle 808. Further, the at least one first presentation sensor 828 may include at least one accelerometer sensor configured to monitor an uneven movement of the first presentation device 814 associated with the first vehicle 808, such as due to a G-Force, a frictional force, and an uneven movement of the first vehicle 808. Further, the at least one first presentation sensor 828 may include at least one gyroscope sensor configured to monitor an uneven orientation of the first presentation device 814 associated with the first vehicle 808, such as due to a G-Force, a frictional force, and an uneven movement of the first vehicle 808.

Further, the generating of the second optimized presentation data may be based on the determining of the unwanted movement of the second presentation device 824 associated with the second vehicle 818, such as due to a G-Force, a frictional force, and an uneven movement of the second vehicle 818. For instance, the at least one second presentation sensor 830 may include at least one camera configured to monitor a movement of the second presentation device 824 associated with the second vehicle 818. Further, the at least one second presentation sensor 830 may include at least one accelerometer sensor configured to monitor an uneven movement of the second presentation device 824 associated with the second vehicle 818, such as due to a G-Force, a frictional force, and an uneven movement of the second vehicle 818. Further, the at least one second presentation sensor 830 may include at least one gyroscope sensor configured to monitor an uneven orientation of the second presentation device 824 associated with the second vehicle 818, such as due to a G-Force, a frictional force, and an uneven movement of the second vehicle 818.

In some embodiments, the communication device 802 may be further configured for receiving an administrator command from an administrator device. Further, the generating of one or more of the first optimized presentation data and the second optimized presentation data may be based further on the administrator command. In further embodiments, the at least one first presentation model may include at least one first virtual object model corresponding to at least one first virtual object. Further, the at least one second presentation model may include at least one second virtual object model corresponding to at least one second virtual object. Further, the generating of the at least one first virtual object model may be independent of the at least one second sensor model. Further, the generating of the at least one second virtual object model may be independent of the at least one first sensor model. Further, the generating of one or more of the at least one first virtual object model and the at least one second virtual object model may be based on the administrator command. Further, the storage device 806 may be configured for storing the at least one first virtual object model and the at least one second virtual object model.

In further embodiments, the administrator command may include a virtual distance parameter. Further, the generating of each of the at least one first optimized presentation data and the at least one second optimized presentation data may be based on the virtual distance parameter.

In further embodiments, the at least one first sensor data may include at least one first proximity data corresponding to at least one first external real object in a vicinity of the first vehicle 808. Further, the at least one second sensor data may include at least one second proximity data corresponding to at least one second external real object in a vicinity of the second vehicle 818. Further, the generating of the at least one first optimized presentation data may be based further on the at least one second proximity data. Further, the generating of the at least one second optimized presentation data may be based further on the at least one first proximity data. In further embodiments, the at least one first external real object may include a first cloud, a first landscape feature, a first man-made structure and a first natural object. Further, the at least one second external real object may include a second cloud, a second landscape feature, a second man-made structure and a second natural object.

In some embodiments, the at least one first sensor data may include at least one first image data corresponding to at least one first external real object in a vicinity of the first vehicle 808. Further, the at least one second sensor data may include at least one second image data corresponding to at least one second external real object in a vicinity of the second vehicle 818. Further, the generating of the at least one first optimized presentation data may be based further on the at least one second image data. Further, the generating of the at least one second optimized presentation data may be based further on the at least one first image data.

In some embodiments, the communication device 802 may be further configured for transmitting a server authentication data to the first receiver 816. Further, the first receiver 816 may be communicatively coupled to first processor associated with the first presentation device. Further, the first processor may be communicatively coupled to a first memory device configured to store a first authentication data. Further, the first processor may be configured for performing a first server authentication based on the first authentication data and the server authentication data. Further, the first processor may be configured for controlling presentation of the at least one first optimized presentation data on the at least one first presentation device 814 based on the first server authentication. Further, the communication device 802 may be configured for transmitting a server authentication data to the second receiver 826. Further, the second receiver 826 may be communicatively coupled to second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the at least one second optimized presentation data on the at least one second presentation device 824 based on the second server authentication. Further, the communication device 802 may be configured for receiving a first client authentication data from the first transmitter 812. Further, the storage device 806 may be configured for storing the first authentication data. Further, the communication device 802 may be configured for and receiving a second client authentication data from the second transmitter 822. Further, the storage device 806 may be configured for storing the second authentication data. Further, the processing device 804 may be further configured for performing a first client authentication based on the first client authentication data and the first authentication data. Further, the generating of the at least one second optimized presentation data may be further based on the first client authentication. Further, the processing device 804 may be configured for performing a second client authentication based on the second client authentication data and the second authentication data. Further, the generating of the at least one first optimized presentation data may be further based on the second client authentication.

Figure 9:
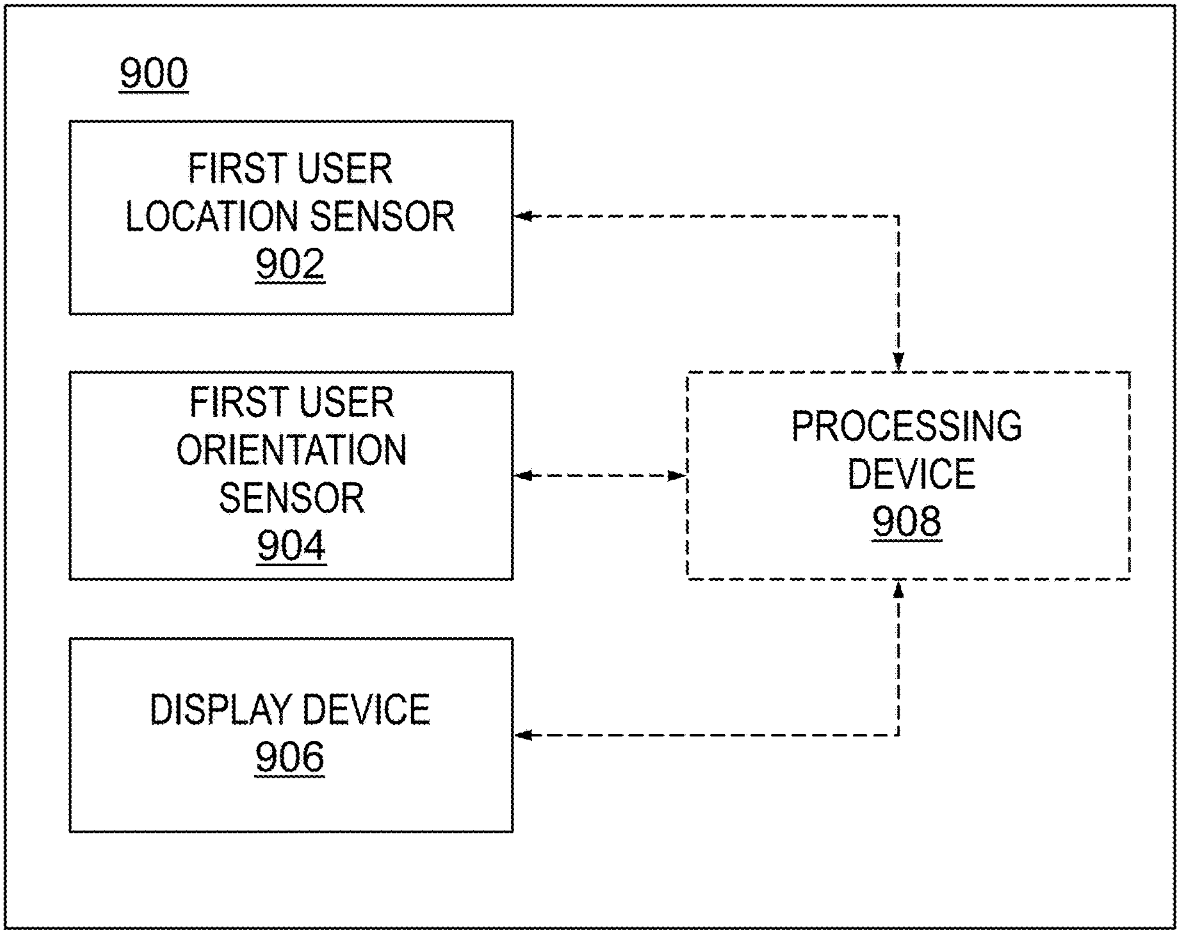
FIG. 9 is a block diagram of a first head mount display for facilitating provisioning of a virtual experience in accordance with some embodiments.

FIG. 9 is a block diagram of a first head mount display 900 for facilitating provisioning of a virtual experience in accordance with some embodiments. The first head mount display 900 may include a first user location sensor 902 of the at least one first sensor configured for sensing the first user location and a first user orientation sensor 904 of the at least one first sensor configured for sensing the first user orientation.

Further, the first head mount display 900 may include a display device 906 to present visuals. Further, in an embodiment, the display device 906 may be configured for displaying the first optimized display data, as generated by the processing device 804.

Further, the first head mount display 900 may include a processing device 908 configured to obtain sensor data from the first user location sensor 902 and the first user orientation sensor 904. Further, the processing device 908 may be configured to send visuals to the display device 906.

Figure 10:
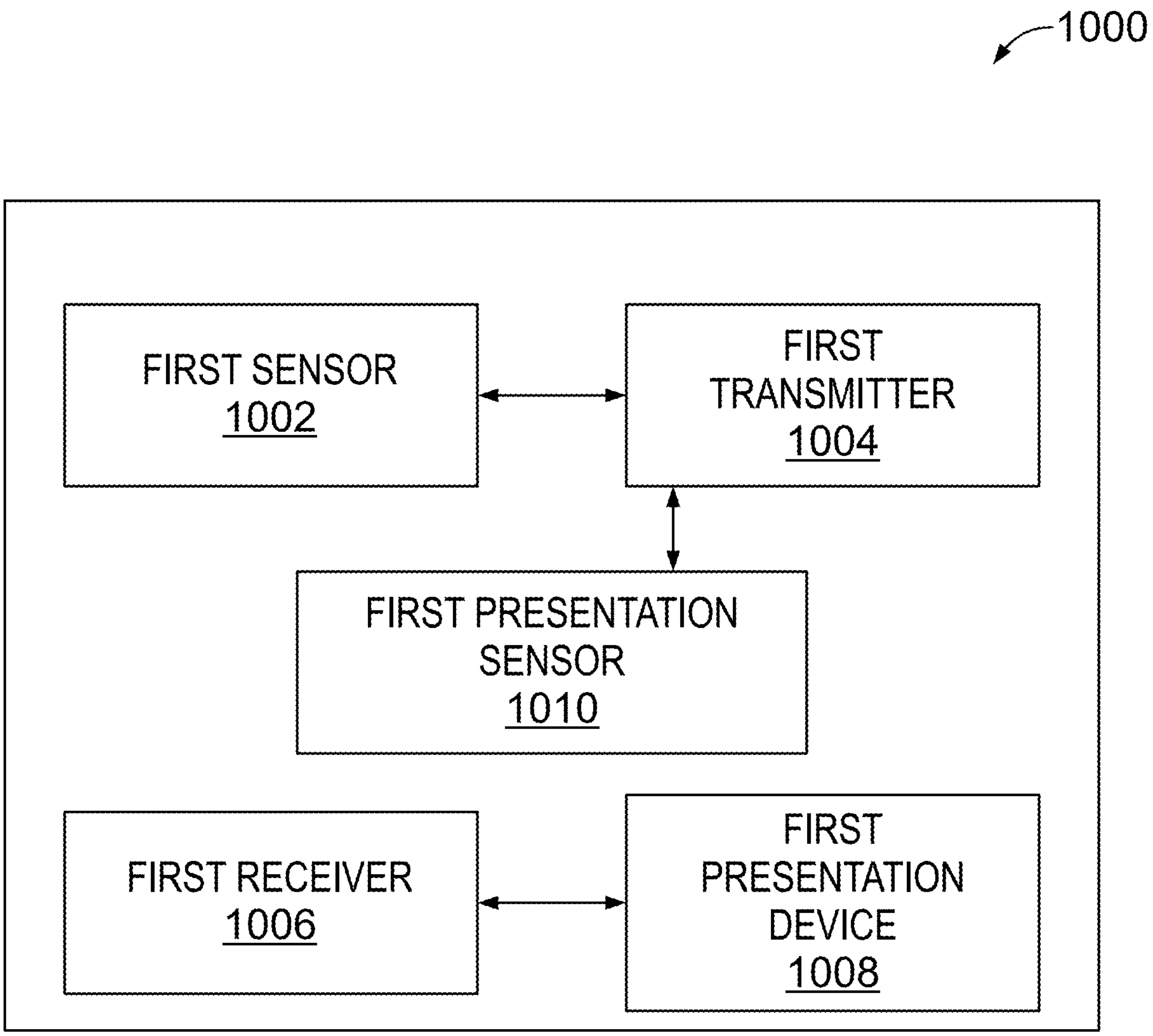
FIG. 10 is a block diagram of an apparatus for facilitating provisioning of a virtual experience in accordance with some embodiments.

FIG. 10 is a block diagram of an apparatus 1000 for facilitating provisioning of a virtual experience in accordance with some embodiments. The apparatus 1000 may include at least one first sensor 1002 (such as the at least one first sensor 810) configured for sensing at least one first sensor data associated with a first vehicle (such as the first vehicle 808).

Further, the apparatus 1000 may include at least one first presentation sensor 1010 (such as the at least one first presentation sensor 828) configured for sensing at least one first presentation sensor data associated with a first vehicle (such as the first vehicle 808). Further, in an embodiment, the at least one first presentation sensor 1010 may include a disturbance sensor, such as the disturbance sensor 208 configured for sensing a disturbance in a first spatial relationship between at least one first presentation device 1008 associated with the first vehicle, and a first user. Further, the spatial relationship between the at least one first presentation device 1008 and the first user may include at least one of a distance and an orientation. For instance, the first spatial relationship may include an exact distance, and an orientation, such as a precise angle between the at least one first presentation device 1008 and the eyes of the first user. Further, the disturbance in the first spatial relationship may include a change in the at least of the distance and the orientation between the at least one first presentation device 814 and the first user.

Further, the apparatus 1000 may include a first transmitter 1004 (such as the first transmitter 812) configured to be communicatively coupled to the at least first sensor 1002, and the at least one first presentation sensor 1010. Further, the first transmitter 1004 may be configured for transmitting the at least one first sensor data and the at least one first presentation sensor data to a communication device (such as the communication device 802) of a system over a first communication channel.

Further, the apparatus 1000 may include a first receiver 1006 (such as the first receiver 816) configured for receiving the at least one first optimized presentation data from the communication device over the first communication channel.

Further, the apparatus 1000 may include the at least one first presentation device 1008 (such as the at least one first presentation device 814) configured to be communicatively coupled to the first receiver 1006. The at least one first presentation device 1008 may be configured for presenting the at last one first optimized presentation data.

Further, the communication device may be configured for receiving at least one second sensor data corresponding to at least one second sensor (such as the at least one second sensor 820) associated with a second vehicle (such as the second vehicle 818). Further, the at least one second sensor may be communicatively coupled to a second transmitter (such as the second transmitter 822) configured for transmitting the at least one second sensor data over a second communication channel. Further, the system may include a processing device (such as the processing device 804) communicatively coupled to the communication device. Further, the processing device may be configured for generating the at least one first optimized presentation data based on the at least one second sensor data.

Figure 11:
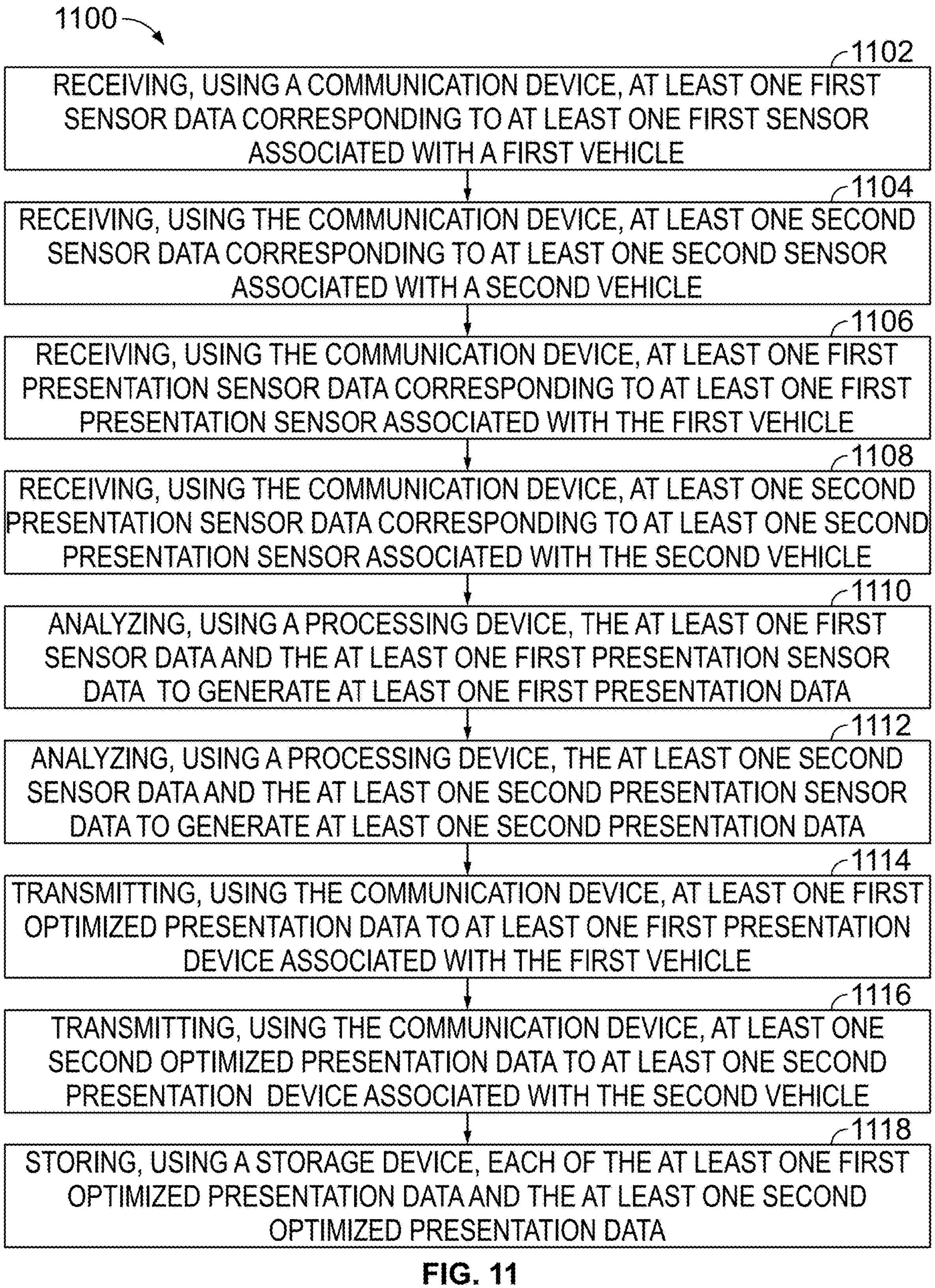
FIG. 11 is a flowchart of a method of facilitating provisioning of a virtual experience in accordance with some embodiments.

FIG. 11 is a flowchart of a method 1100 of facilitating provisioning of a virtual experience in accordance with some embodiments. At 1102, the method 1100 may include receiving, using a communication device (such as the communication device 802), at least one first sensor data corresponding to at least one first sensor (such as the at least one first sensor 810) associated with a first vehicle (such as the first vehicle 808). Further, the at least one first sensor may be communicatively coupled to a first transmitter (such as the first transmitter 812) configured for transmitting the at least one first sensor data over a first communication channel.

At 1104, the method 1100 may include receiving, using the communication device, at least one second sensor data corresponding to at least one second sensor (such as the at least one second sensor 820) associated with a second vehicle (such as the second vehicle 818). Further, the at least one second sensor may be communicatively coupled to a second transmitter (such as the second transmitter 822) configured for transmitting the at least one second sensor data over a second communication channel.

At 1106, the method 1100 may include receiving, using the communication device, a first presentation sensor data corresponding to at least one first presentation sensor 828 associated with the first vehicle. Further, the at least one first presentation sensor may be communicatively coupled to the first transmitter configured for transmitting the at least one first presentation sensor data over the first communication channel. Further, the first presentation sensor may include at least one sensor configured to monitor a movement of at least one first presentation device associated with the first vehicle, such as due to a G-Force, a frictional force, and an uneven movement of the first vehicle. For instance, the at least one first presentation sensor may include at least one camera configured to monitor a movement of the at least one first presentation device associated with the first vehicle. Further, the at least one first presentation sensor may include at least one accelerometer sensor configured to monitor an uneven movement of the at least one first presentation device associated with the first vehicle, such as due to a G-Force, a frictional force, and an uneven movement of the first vehicle. Further, the at least one first presentation sensor may include at least one gyroscope sensor configured to monitor an uneven orientation of the at least one first presentation device associated with the first vehicle, such as due to a G-Force, a frictional force, and an uneven movement of the first vehicle.

At 1108, the method 1100 may include receiving, using the communication device, a second presentation sensor data corresponding to at least one second presentation sensor 830 associated with the second vehicle. Further, the at least one second presentation sensor may be communicatively coupled to the second transmitter configured for transmitting the at least one second presentation sensor data over the second communication channel. Further, the second presentation sensor may include at least one sensor configured to monitor a movement of at least one second presentation device associated with the second vehicle, such as due to a G-Force, a frictional force, and an uneven movement of the second vehicle. For instance, the at least one second presentation sensor may include at least one camera configured to monitor a movement of the at least one second presentation device associated with the second vehicle. Further, the at least one second presentation sensor may include at least one accelerometer sensor configured to monitor an uneven movement of the at least one second presentation device associated with the second vehicle, such as due to a G-Force, a frictional force, and an uneven movement of the second vehicle. Further, the at least one second presentation sensor may include at least one gyroscope sensor configured to monitor an uneven orientation of the at least one second presentation device associated with the second vehicle, such as due to a G-Force, a frictional force, and an uneven movement of the second vehicle.

At 1110, the method 1100 may include analyzing, using a processing device, the at least one first sensor data and the at least one first presentation sensor data to generate at least one first modified presentation data. The analyzing may include determining an unwanted movement of the at least one first presentation device associated with the first vehicle, such as due to a G-Force, a frictional force, and an uneven movement of the first vehicle. Further, the unwanted movement of the at least one first presentation device associated with the first vehicle may include an upward movement, a downward movement, a leftward movement, and a rightward movement. Further, the generating of the at least one first optimized presentation data may be based on the unwanted movement of the at least one first presentation device associated with the first vehicle, such as due to a G-Force, a frictional force, and an uneven movement of the first vehicle. For instance, the generating of the at least one first optimized presentation data may be based on negating an effect of the unwanted movement of the at least one first presentation device associated with the first vehicle. For instance, if the unwanted movement of the at least one first presentation device associated with the first vehicle includes an upward movement, a downward movement, a leftward movement, and a rightward movement, the generating of the at least one first optimized presentation data may include moving one or more components of the at least one first modified presentation data in an oppositely downward direction, an upward direction, a rightward direction, and a leftward direction respectively.

At 1112, the method 1100 may include analyzing, using a processing device, the at least one second sensor data and the at least one second presentation sensor data to generate at least one second presentation data. The analyzing may include determining an unwanted movement of the at least one second presentation device associated with the second vehicle, such as due to a G-Force, a frictional force, and an uneven movement of the second vehicle. Further, the unwanted movement of the at least one second presentation device associated with the second vehicle may include an upward movement, a downward movement, a leftward movement, and a rightward movement. Further, the generating of the at least one second optimized presentation data may be based on the unwanted movement of the at least one second presentation device associated with the second vehicle, such as due to a G-Force, a frictional force, and an uneven movement of the second vehicle. For instance, the generating of the at least one second optimized presentation data may be based on negating an effect of the unwanted movement of the at least one second presentation device associated with the second vehicle. For instance, if the unwanted movement of the at least one second presentation device associated with the second vehicle includes an upward movement, a downward movement, a leftward movement, and a rightward movement, the generating of the at least one second optimized presentation data may include moving one or more components of the at least one second presentation data in an oppositely downward direction, an upward direction, a rightward direction, and a leftward direction respectively.

At 1114, the method 1100 may include transmitting, using the communication device, at least one first optimized presentation data to at least one first presentation device associated with the first vehicle. Further, the at least one first presentation device may include a first receiver (such as the first receiver 816) configured for receiving the at least one first modified presentation data over the first communication channel. Further, the at least one presentation device may be configured for presenting the at least one first optimized presentation data.

At 1116, the method 1100 may include transmitting, using the communication device, at least one second optimized presentation data to at least one second presentation device (such as the at least one second presentation device 824) associated with the second vehicle. Further, the at least one second presentation device may include a second receiver (such as the second receiver 826) configured for receiving the at least one second presentation data over the second communication channel. Further, the at least one presentation device may be configured for presenting the at least one second optimized presentation data.

At 1118, the method 1100 may include storing, using a storage device (such as the storage device 806), each of the at least one first optimized presentation data and the at least one second optimized presentation data.

Figure 12:
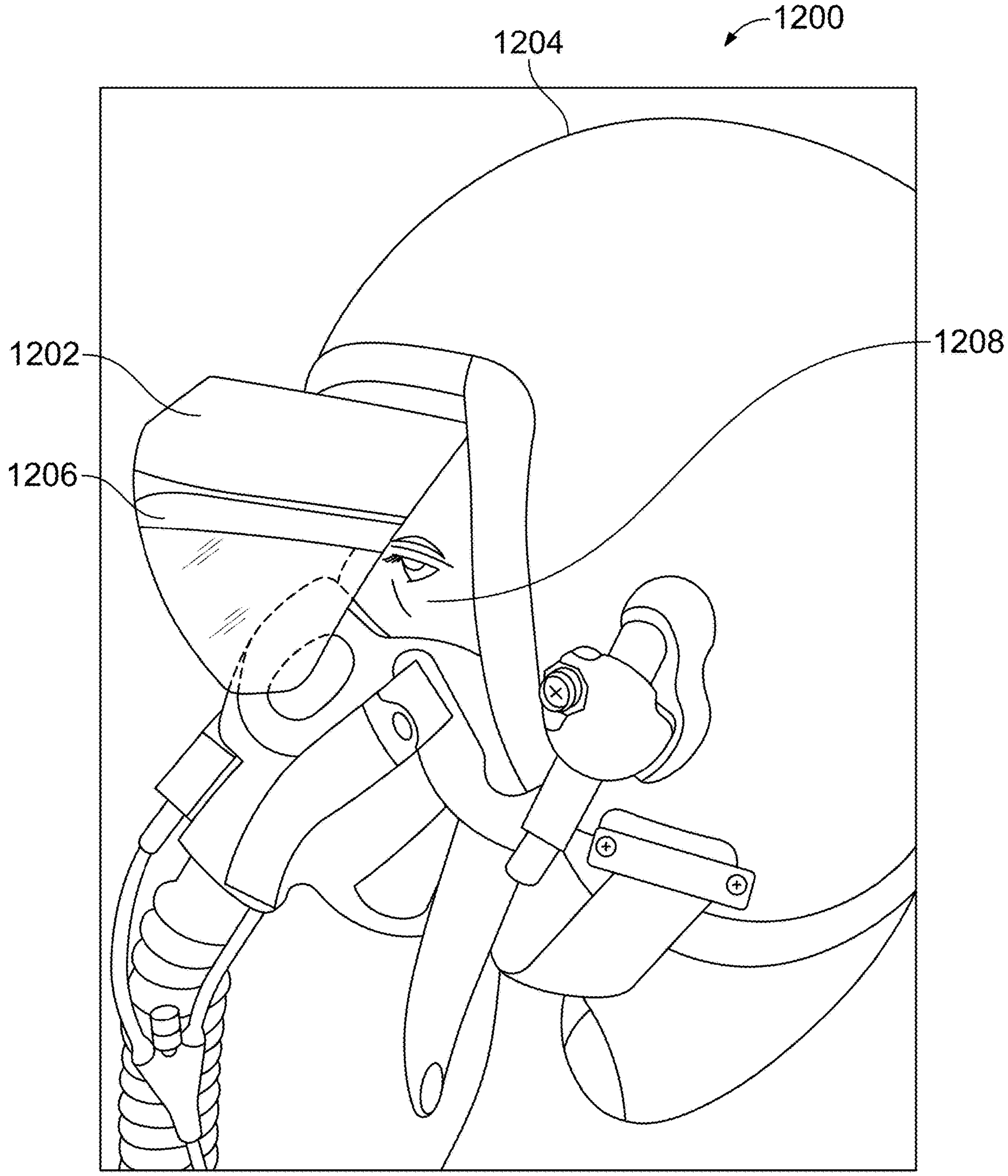
FIG. 12 shows an exemplary head mount display associated with a vehicle for facilitating provisioning of a virtual experience in accordance with some embodiments.

FIG. 12 shows an exemplary head mount display 1200 associated with a vehicle (such as the first vehicle 808) for facilitating provisioning of a virtual experience in accordance with some embodiments. Further, the vehicle may include a watercraft, a land vehicle, an aircraft and an amphibious vehicle. The head mount display 1200 associated with the vehicle may be worn by a user, such as a driver or operator of the vehicle while driving or operating the vehicle for facilitating provisioning of a virtual experience.

The head mount display 1200 may include a display device 1202 (such as the display device 906) to present visuals. The display device 1202 may include a first see-through display device.

Further, under motion, such as under extreme aerobatic maneuvers, such as G loading (gravity loading) the head mount display 1200 may experience one or more forces. Accordingly, a structure 1204 of the head mount display 1200 may exhibit slight movement, leading to the display device 1202 shifting from a desired position. For instance, the structure 1204 of the head mount display 1200 may be compressed onto the head of a user 1208 leading to a movement of the display device 1202, such as by 3-4 mm.

Further, the head mount display 1200 may include a presentation sensor 1206 (such as the first presentation sensor 828) configured for sensing at least one first physical variable (such as the movement) associated with the head mount display 1200, such as due to a G-Force, a frictional force, and an uneven movement of the vehicle. For instance, the presentation sensor 1206 may include at least one camera configured to monitor a movement, or compression of the head mount display 1200 associated with the vehicle. Further, the presentation sensor 1206 may include at least one accelerometer sensor configured to monitor an uneven movement of the head mount display 1200 associated with the vehicle, such as due to a G-Force, a frictional force, and an uneven movement of the vehicle. Further, the presentation sensor 1206 may include at least one gyroscope sensor configured to monitor an uneven orientation of the head mount display 1200 associated with the vehicle, such as due to a G-Force, a frictional force, and an uneven movement of the vehicle.

Further, the head mount display 1200 may include a transmitter (not shown—such as the first transmitter 812) configured to be communicatively coupled to the presentation sensor 1206. Further, the transmitter may be configured for transmitting the presentation sensor data to a communication device (such as the communication device 802) of a system over a communication channel.

Further, the head mount display 1200 may include a first receiver (not shown—such as the first receiver 816) configured to be communicatively coupled to the display device 1202. Further, the first receiver may be configured for receiving the at least one modified presentation data from the communication device over the communication channel. Further, the modified presentation data may negate the slight movement of the head mount display 1200, leading to the display device 1202 shifting from the desired position.

Further, the communication device may be configured for receiving at least one second sensor data corresponding to at least one second sensor (such as the at least one second sensor 820) associated with a second vehicle (such as the second vehicle 818). Further, the at least one second sensor may be communicatively coupled to a second transmitter (such as the second transmitter 822) configured for transmitting the at least one second sensor data over a second communication channel. Further, the system may include a processing device (such as the processing device 804) communicatively coupled to the communication device. Further, the processing device may be configured for generating the presentation data based on the at least one second sensor data.

Figure 13:
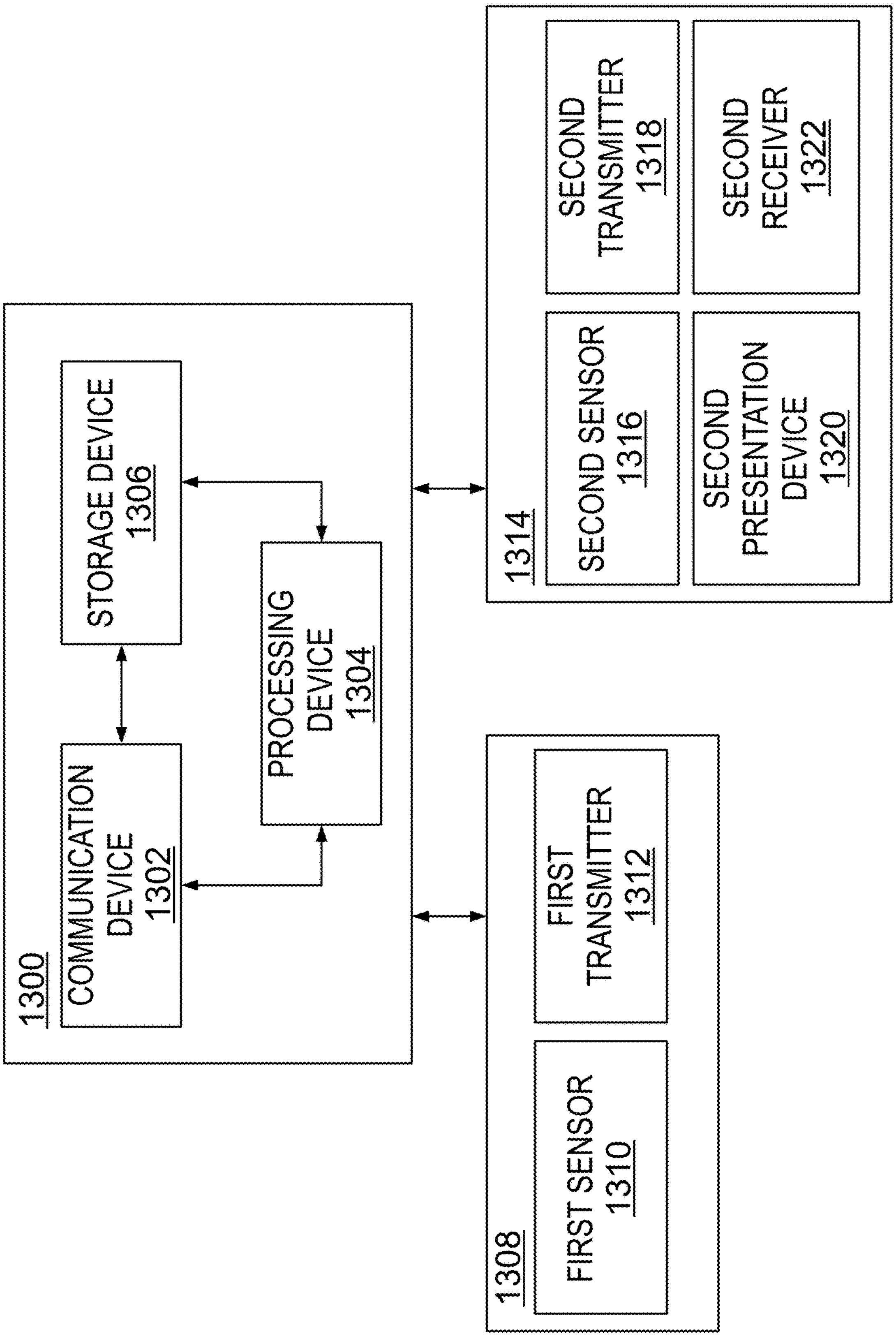
FIG. 13 shows a system for facilitating provisioning of a virtual experience, in accordance with some embodiments.

FIG. 13 shows a system 1300 for facilitating provisioning of a virtual experience, in accordance with some embodiments. The system 1300 may include a communication device 1302 configured for receiving at least one first sensor data corresponding to at least one first sensor 1310 associated with a first vehicle 1308. Further, the at least one first sensor 1310 may be communicatively coupled to a first transmitter 1312 configured for transmitting the at least one first sensor data over a first communication channel.

Further, the communication device 1302 may be configured for receiving at least one second sensor data corresponding to at least one second sensor 1316 associated with a second vehicle 1314. Further, the at least one second sensor 1316 may include a second location sensor configured to detect a second location associated with the second vehicle 1314. Further, the at least one second sensor 1316 may be communicatively coupled to a second transmitter 1318 configured for transmitting the at least one second sensor data over a second communication channel. Further, in some embodiments, the at least one second sensor 1316 may include a second user sensor configured for sensing a second user variable associated with a second user of the second vehicle 1314. Further, the second user variable may include a second user location and a second user orientation.

Further, in some embodiments, the at least one second sensor 1316 may include a disturbance sensor, such as the disturbance sensor 208 configured for sensing a disturbance in a spatial relationship between a second presentation device 1320 associated with the second vehicle 1314 and the second user of the second vehicle 1314. Further, the spatial relationship between the second presentation device 1320 and the second user may include at least one of a distance and an orientation. For instance, the spatial relationship may include an exact distance, and an orientation, such as a precise angle between the second presentation device 1320 and the eyes of the second user.

Further, the disturbance in the spatial relationship may include a change in the at least of the distance and the orientation between the second presentation device 1320 and the second user. Further, the disturbance in the spatial relationship may lead to an alteration in how the second user may view at least one second presentation data. For instance, if the disturbance in the spatial relationship leads to a reduction in the distance between the second presentation device 1320 and the second user, the second user may perceive one or more objects in the at least one second presentation data to be closer. For instance, if the spatial relationship between the second presentation device 1320 and the second user specifies a distance of “x” centimeters, and the disturbance in the spatial relationship leads to a reduction in the distance between the second presentation device 1320 and the second user to “y” centimeters, the second user may perceive the at least one second presentation data to be closer by “x-y” centimeters.

Further, the communication device 1302 may be configured for transmitting the at least one second presentation data to the at least one second presentation device 1320 associated with the second vehicle 1314. Further, the at least one second presentation data may include at least one second virtual object model corresponding to at least one second virtual object. Further, in some embodiments, the at least one second virtual object may include one or more of a navigational marker and an air-corridor.

Further, in an embodiment, the at least one second presentation data may include a second corrected display data generated based on a second correction data. Further, the at least one second presentation device 1320 may include a second receiver 1322 configured for receiving the at least one second presentation data over the second communication channel. Further, the at least one second presentation device 1320 may be configured for presenting the at least one second presentation data. Further, in some embodiments, the at least one second presentation device 1320 may include a second head mount display. Further, the second head mount display may include a second user location sensor of the at least one second sensor 1316 configured for sensing the second user location and a second user orientation sensor of the at least one second sensor 1316 configured for sensing the second user orientation. Further, the second head mount display may include a second see-through display device.

Figure 14:
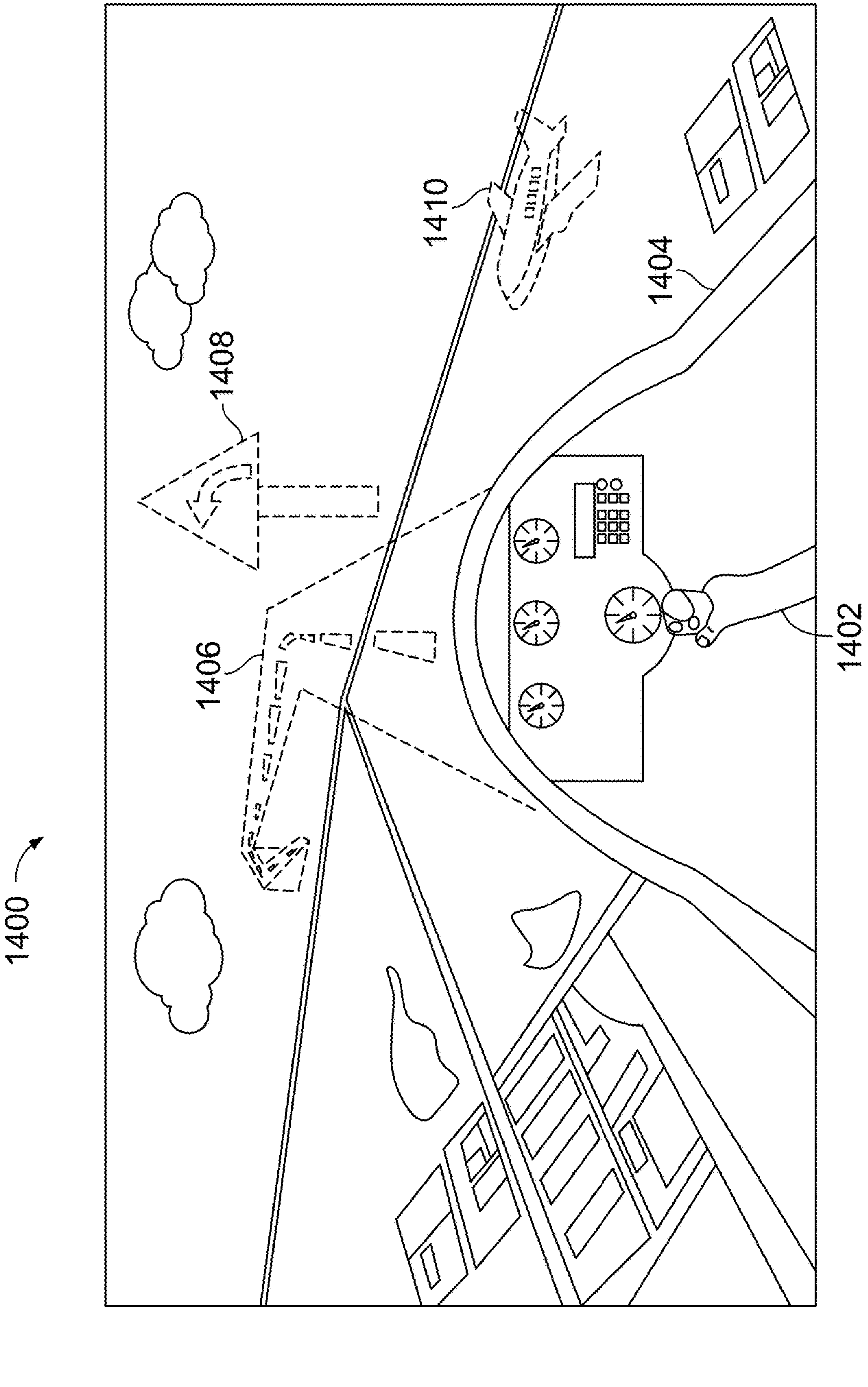
FIG. 14 shows a corrected augmented reality view, in accordance with some embodiments.

Further, in some embodiments, the at least one second virtual object model may include a corrected augmented reality view, such as the corrected augmented reality view 1400. Further, the augmented reality view 1400 may include one or more second virtual objects such as a navigational marker 1408, and a skyway 1406 as shown in FIG. 14).

Further, the system 1300 may include a processing device 1304 configured for generating the at least one second presentation data based on the at least one first sensor data and the at least one second sensor data. Further, the generating of the at least one second virtual object model may be independent of the at least one first sensor data. Further, in some embodiments, the processing device 1304 may be configured for determining a second airspace class (with reference to FIG. 15) associated with the second vehicle 1314 based on the second location including a second altitude associated with the second vehicle 1314. Further, the generating of the at least one second virtual object model may be based on the second airspace class.

Further, the processing device 1304 may be configured for generating the second correction data based on the analyzing the at least one second sensor data associated with the second vehicle 1314. Further, the second correction data may include an instruction to shift a perspective view of the at least one second presentation data to compensate for the disturbance in the spatial relationship between the second presentation device 1320 and the second user. Accordingly, the second correction data may be generated contrary to the disturbance in the spatial relationship. For instance, the disturbance may include an angular disturbance, wherein the second presentation device 1320 may undergo an angular displacement as a result of the angular disturbance. Accordingly, the second correction data may include an instruction of translation to generate the second corrected display data included in the second presentation data to compensate for the angular disturbance.

For instance, if the at least one second presentation data includes the at least one second virtual object model may include a corrected augmented reality view, such as the corrected augmented reality view 1400, the second correction data may include an instruction to shift a perspective view of the at least one second presentation data to compensate for the disturbance in the spatial relationship between the second presentation device 1320 and the second user (such as a pilot 1402). For instance, if the disturbance in the spatial relationship includes a reduction in the distance between the second presentation device 1320, the second correction data may include an instruction to shift a perspective view of the at least one second presentation data to compensate for the disturbance in the spatial relationship between the second presentation device 1320 and the second user, such as by projection of the one or more second virtual objects, such as the navigational marker 1408, and the skyway 1406 at a distance to compensate the disturbance and to generate the corrected augmented reality view 1400

Further, the system 1300 may include a storage device 1306 configured for storing the at least one second presentation data. Further, in some embodiments, the storage device 1306 may be configured for retrieving the at least one second virtual object model based on the second location associated with the second vehicle 1314. Further, in some embodiments, the storage device 1306 may be configured for storing a first three-dimensional model corresponding to the first vehicle 1308. Further, the generating of the second presentation data may be based on the first three-dimensional model.

Further, in some embodiments, the communication device 1302 may be configured for receiving an administrator command from an administrator device. Further, the generating of the at least one second virtual object model may be based on the administrator command.

Further, in some embodiments, the communication device 1302 may be configured for transmitting at least one first presentation data to at least one first presentation device (not shown) associated with the first vehicle 1308. Further, the at least one first presentation device may include a first receiver configured for receiving the at least one first presentation data over the first communication channel. Further, the at least one first presentation device may be configured for presenting the at least one first presentation data. Further, in some embodiments, the processing device 1304 may be configured for generating the at least one first presentation data based on the at least one second sensor data. Further, in some embodiments, the storage device 1306 may be configured for storing the at least one first presentation data. Further, in some embodiments, the storage device 1306 may be configured for storing a second three-dimensional model corresponding to the second vehicle 1314. Further, the generating of the first presentation data may be based on the second three-dimensional model.

Further, in some embodiments, the at least one first presentation data may include at least one first virtual object model corresponding to at least one first virtual object. Further, the generating of the at least one first virtual object model may be independent of the at least one second sensor data. Further, the storage device 1306 may be configured for storing the at least one first virtual object model.

Figure 16:
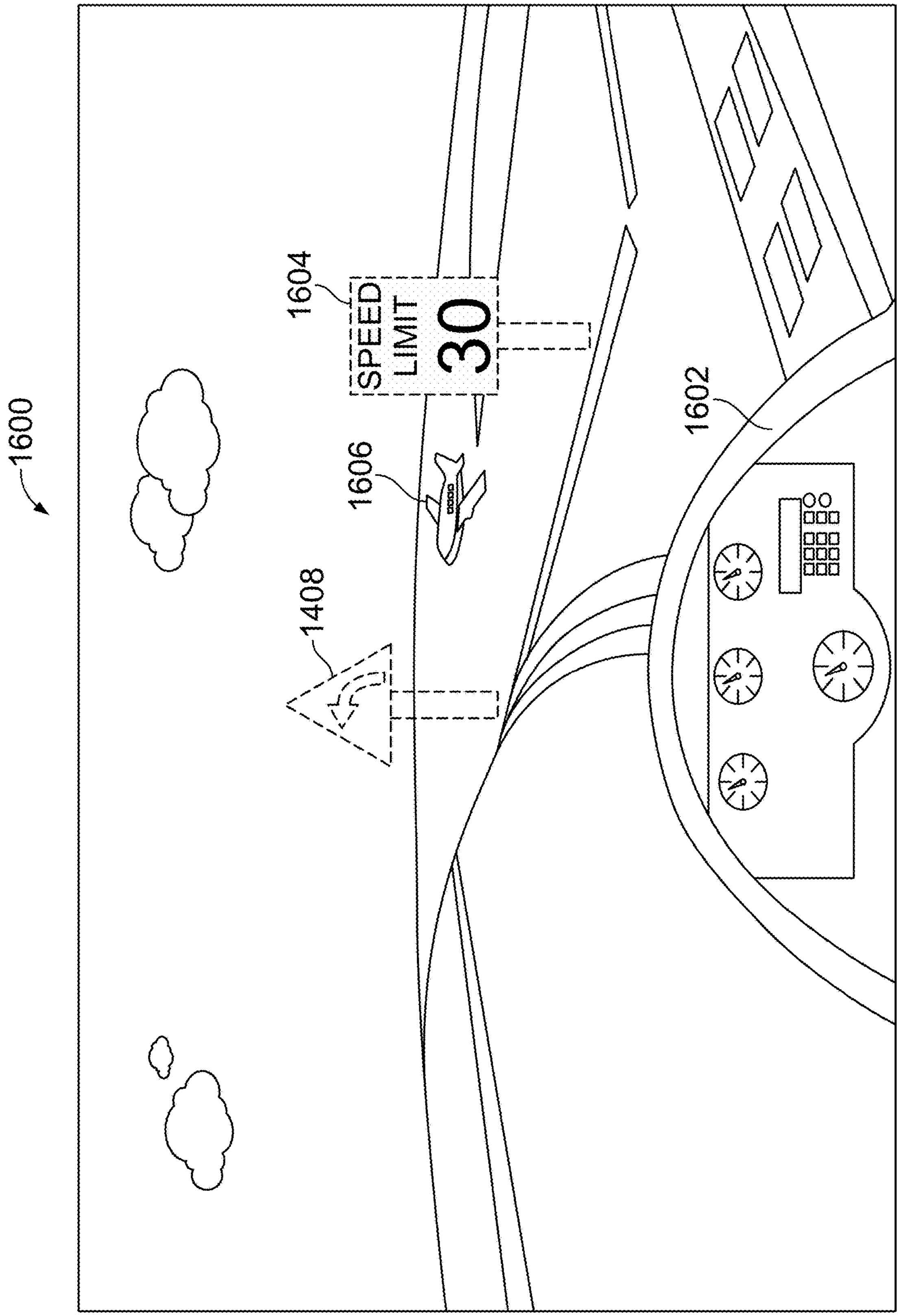
FIG. 16 shows an augmented reality view shown to a real pilot while a civilian aircraft is taxiing at an airport, in accordance with an exemplary embodiment.

Further, in some exemplary embodiment, the communication device 1302 may be configured for receiving at least one second sensor data corresponding to at least one second sensor 1316 associated with a second vehicle 1314. Further, the at least one second sensor 1316 may be communicatively coupled to a second transmitter 1318 configured for transmitting the at least one second sensor data over a second communication channel. Further, the communication device 1302 may be configured for receiving at least one first sensor data corresponding to at least one first sensor 1310 associated with a first vehicle 1308. Further, the at least one first sensor 1310 may include a first location sensor configured to detect a first location associated with the first vehicle 1308. Further, the at least one first sensor 1310 may be communicatively coupled to a first transmitter 1312 configured for transmitting the at least one first sensor data over a first communication channel. Further, in some embodiments, the at least one first sensor 1310 may include a first user sensor configured for sensing a first user variable associated with a first user of the first vehicle 1308. Further, the first user variable may include a first user location and a first user orientation. Further, the communication device 1302 configured for transmitting at least one first presentation data to at least one first presentation device (not shown) associated with the first vehicle 1308. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1604 as shown in FIG. 16) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor 1310 configured for sensing the first user location and a first user orientation sensor of the at least one first sensor 1310 configured for sensing the first user orientation. Further, the first head mount display may include a first see-through display device. Further, the processing device 1304 may be configured for generating the at least one first presentation data based on the at least one second sensor data and the at least one first sensor data. Further, the generating of the at least one first virtual object model may be independent of the at least one second sensor data. Further, in some embodiments, the processing device 1304 may be configured for determining a first airspace class (with reference to FIG. 15) associated with the first vehicle 1308 based on the first location including a first altitude associated with the first vehicle 1308. Further, the generating of the at least one first virtual object model may be based on the first airspace class. Further, in some embodiments, the storage device 1306 may be configured for storing the at least one first presentation data. Further, in some embodiments, the storage device 1306 may be configured for retrieving the at least one first virtual object model based on the first location associated with the first vehicle 1308. Further, in some embodiments, the storage device 1306 may be configured for storing a second three-dimensional model corresponding to the second vehicle 1314. Further, the generating of the first presentation data may be based on the second three-dimensional model. Further, in some embodiments, the communication device 1302 may be configured for receiving an administrator command from an administrator device. Further, the generating of the at least one first virtual object model may be based on the administrator command. Further, in some embodiments, the communication device 1302 may be configured for transmitting at least one second presentation data to at least one second presentation device (such as the second presentation device 1320) associated with the second vehicle 1314. Further, the at least one second presentation device may include a second receiver (such as the second receiver 1322) configured for receiving the at least one second presentation data over the second communication channel. Further, the at least one second presentation device may be configured for presenting the at least one second presentation data. Further, in some embodiments, the processing device 1304 may be configured for generating the at least one second presentation data based on the at least one first sensor data. Further, in some embodiments, the storage device 1306 may be configured for storing the at least one second presentation data. Further, in some embodiments, the storage device 1306 may be configured for storing a first three-dimensional model corresponding to the first vehicle 1308. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the storage device 1306 may be configured for storing the at least one second virtual object model.

FIG. 14 shows the corrected augmented reality view 1400. Further, the augmented reality view 1400 may include a road drawn in the sky (such as the skyway 1406) indicating a path that a civilian aircraft 1404 may take in order to land at an airport. Further, the augmented reality view 1400 may include the navigation marker 1408 indicating to a pilot 1402 that the civilian aircraft 1404 should take a left turn. The navigation marker 1408 may assist the pilot 1402 in navigating towards a landing strip to land the civilian aircraft 1404.

Therefore, the corrected augmented reality view 1400 may provide pilots with a similar view as seen by public transport drivers (e.g. taxi or bus) on the ground. The pilots (such as the pilot 1402) may see roads (such as the skyway 1406) that the pilot 1402 need to drive on. Further, the pilot 1402, in an instance, may see signs just like a taxi driver who may just look out of a window and see road signs.

Further, the corrected augmented reality view 1400 may include (but not limited to) one or more of skyways (such the skyway 1406), navigation markers (such as the navigation marker 1408), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 1404) should take. The skyways may appear similar to roads on the ground. The navigation markers may be similar to regulatory road signs used on the roads on the ground. Further, the navigation markers may instruct pilots (such as the pilot 1402) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 1402 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the corrected augmented reality view 1400 may include speed information. The speed information may include one or more of a current speed, a ground speed, and a recommended speed. The signboards for precautions may be related to warnings shown to the pilot 1402. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the corrected augmented reality view 1400.

Further, in some embodiments, the corrected augmented reality view 1400 may include a one or more of other vehicles (such as another airplane 1410). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

Further, the corrected augmented reality view 1400 may include an airspace. FIG. 15 is a chart related to the United States airspace system's classification scheme. Specifically, FIG. 15 illustrates various parameters related to one or more classes defined in the United States airspace system's classification scheme. The classification scheme is intended to maximize pilot flexibility within acceptable levels of risk appropriate to the type of operation and traffic density within that class of airspace—in particular, to provide separation and active control in areas of dense or high-speed flight operations. The Albert Roper (1919-10-13 The Paris Convention) implementation of International Civil Aviation Organization (ICAO) airspace classes defines classes A through G (with the exception of class F which is not used in the United States).

For an instance, a computing device may analyze one or more parameters such as altitude, Visual Flight Rules (VFR), Instrument Flight Rules (IFR), VFR cloud clearance, and VFR minimum visibility etc. to determine an applicable airspace class. Further, the determined airspace class may be displayed on the virtual reality display. Further, the applicable airspace class may be determined using a location tracker such as a GPS and may be displayed as a notification on the virtual reality display.

Further, a special use airspace class may be determined. The special use airspace class may include alert areas, warning areas, restricted areas, prohibited airspace, military operation area, national security area, controlled firing areas etc. For an instance, if an aircraft (such as the civilian aircraft 1404) enters a prohibited area by mistake, then a notification may be displayed in the corrected augmented reality view 1400. Accordingly, the pilot 1402 may reroute the aircraft towards a permitted airspace.

Further, the corrected augmented reality view 1400 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the corrected augmented reality view 1400 shown to a pilot (such as the pilot 1402) in a first aircraft (such as the civilian aircraft 1404) may be modified based on sensor data received from another aircraft (such as another airplane 1410). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 16 shows an augmented reality view 1600 shown to a real pilot while a civilian aircraft 1602 is taxiing at an airport, in accordance with an exemplary embodiment. The augmented reality view 1600 may include one or more navigational markers (such as the navigation marker 1408) and signboards (such as a signboard 1604) that assist a pilot to taxi the civilian aircraft 1602 at the airport. The navigational markers may indicate the direction of movement. The signboards may indicate the speed limits.

The augmented reality view 1600 may help the pilot to taxi the civilian aircraft 1602 towards a parking location after landing. Further, augmented reality view 1600 may help the pilot to taxi the civilian aircraft 1602 towards a runway for taking-off. Therefore, a ground crew may no longer be required to instruct the pilot while taxiing the civilian aircraft 1602 at the airport.

Further, the augmented reality view 1600 may include one or more live aircraft (such as a live aircraft 1606) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 1600 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

Figure 17:
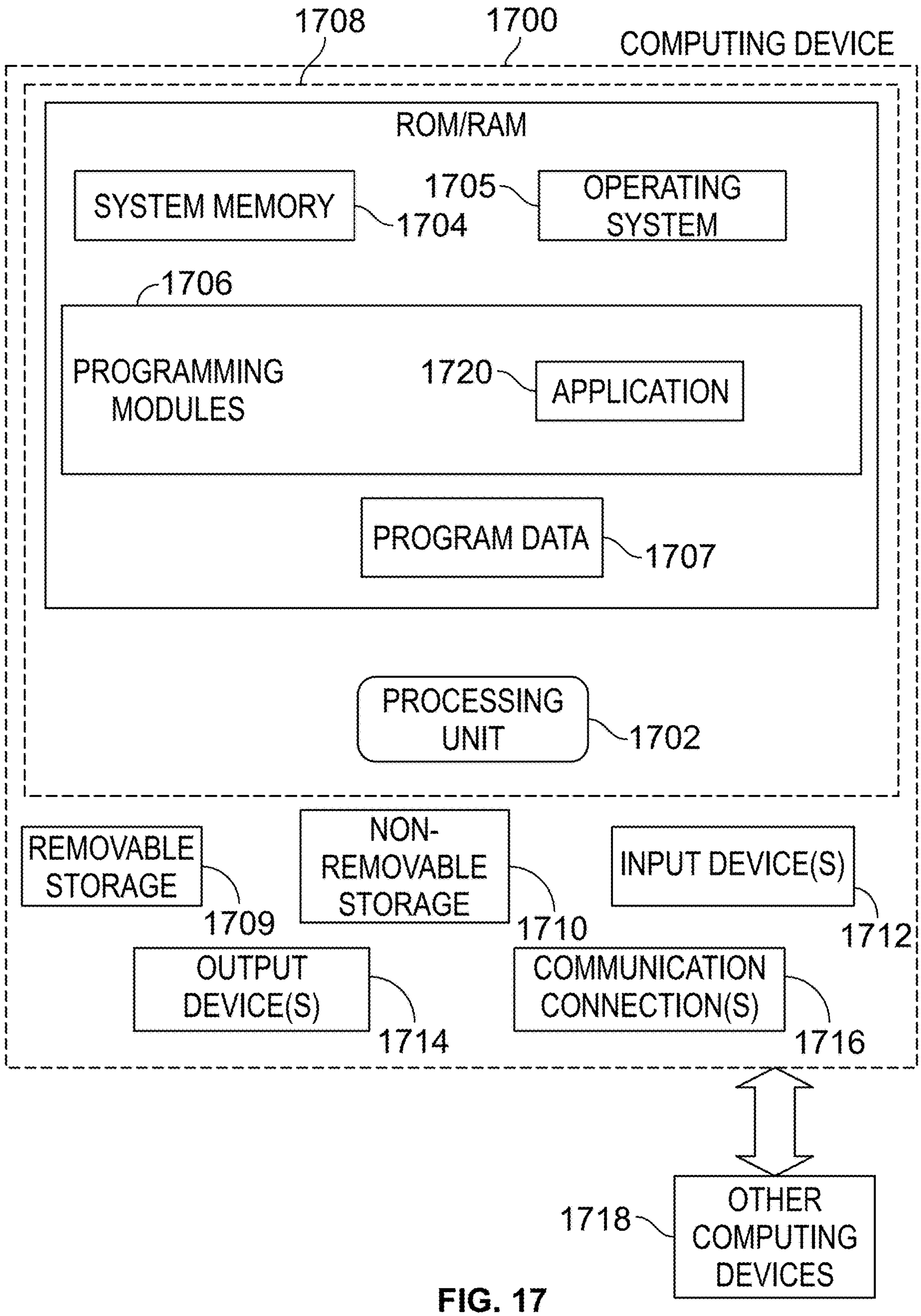
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may include, but is not limited to, volatile (e.g. random-access memory (RAM)), non-volatile (e.g. read-only memory (ROM)), flash memory, or any combination. System memory 1704 may include operating system 1705, one or more programming modules

1706, and may include a program data 1707. Operating system 1705, for example, may be suitable for controlling computing device 1700's operation. In one embodiment, programming modules 1706 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and nonvolatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include sound encoding/decoding applications, machine learning application, acoustic classifiers etc.

Asset operators, ground troops and others involved in military combat may find themselves in complex situations and they may have to make a series of decisions in quick succession to accomplish a mission. These individuals may have a plan and a leader, but each one, or groups of people, still have to make individual decisions based on their training and information that they have about the situation. Communication and adherence to validated tactics is vital in such situations and insightful guidance provides a path to success. AI systems may process vast amounts of combat field data and provide insightful guidance to individuals, groups, leaders, etc. while they are being trained and while they are in combat situations.

There are many combat situations where AI systems may provide useful suggestions to military personnel in training and combat situations. For example, in accordance with an exemplary and non-limiting embodiment, a fighter pilot may be on a mission to escort and protect a strike package on a mission. The flight may encounter enemy fighters approaching to disrupt the package's mission. The escorting fighter pilot(s) has to make a decision on how to deal with the incoming fighters. The enemy may be a simple configuration of a manageable few assets, but the enemy may be a well-organized force with an advanced Integrated Air Defense System (TADS). The fighter pilot, and his flight, must manage this complex situation to accomplish the mission and avoid losses.

The series of decisions and events leading up to and following engagement of the enemy can be thought of as a series of decisions in a timeline. The pilot may have different information to consider depending on his position relative to other assets, including his team members and the enemy, at each point along the timeline.

The following is an example of how such engagement decisions may be made and upon what type of information the pilot can use. First, the pilot receives information through sensors, such as radar, indicating that enemy combatants are incoming. At this point in the timeline, the pilot may not be able to visually see the enemy because they are beyond visual range (BVR). The pilot therefore relies on radar and other information. The radar and other information may be derived through sensors on the aircraft or remote systems (e.g. airborne early warning and control (AWACS), ground support, etc.). The pilot may also communicate with others that have more information on the enemy. Given this information, criteria may be met that requires the flight to commit forces to intercept the enemy in order to protect the strike package.

The pilot may decide to fire an air-to-air missile targeting the enemy while still BVR. Again, while BVR, prior to the launch of the missile, the pilot relies on sensor data. The pilot may then monitor sensors or look for an explosion in the air to indicate success. If the missile misses, the pilot has to make another decision. Does he shoot another? Does he continue on the path to close intercept? Does he wait for more help? etc.

Generally speaking, the pilot is looking to remove the enemy danger without close engagement. Close engagement (e.g. within visual range (WVR)) becomes even more complicated. And it comes with more information for the pilot to consider including all of the visual information. However, the pilot may enter close combat and make more fast decisions based on all of the information at hand.

Once the enemy engagement is removed, the pilot may need to find his way back to escort the strike package or move to intercept a new threat. He may find himself many miles from either. He then absorbs the information he has and makes the next series of decisions.

Described herein are systems and methods for training pilots in real aircraft in combat situations. The combat situations may be very complicated, as indicated in the example above, or they may be more straightforward, such as learning to refuel in the air. The training simulations may involve many friendly and enemy assets on the ground, in the air, in space, etc. As described herein, an augmented reality system provides a synthetic environment for training WVR as well BVR. The augmented reality system may provide the pilot with a see-through head-mounted display, as described herein elsewhere, such that the pilot can see through the display but also be presented with virtual content. The virtual content may be assets (e.g. other aircraft) within the simulation. With the pilot experiencing a synthetic environment that includes simulated activities WVR and BVR, the pilot may train for these complex situations.

Artificial intelligence, machine learning, deep learning, etc. ("AI") may be used to help a pilot, or other operator, make decisions while in simulations or while in real combat situations. A training and combat information platform that provides a pilot with an environment, which is a combination of live assets (e.g., a real asset), virtual assets (e.g., computer generated and controlled) and constructive assets (e.g., computer generated and human controlled), that spans distances from well beyond his vision to being up close and personal. This environment may not only be used for training a pilot, but it can be used to train AI systems for improved training and combat information and guidance.

An AI system according to the principles of the present inventions may control training simulations. The training simulation may be presented to a pilot while the pilot is in a real aircraft flying in an airspace. The simulations may involve the presentation of data, communications, etc. to represent assets BVR of the pilot and WVR of the pilot. The pilot may then run through many simulations where he maneuvers his plane to perform a mission while managing enemy and friendly assets. While the pilot is engaged in the simulations he may be monitored and recorded through sensor feedback, his plane's maneuvers may be tracked and recorded, and the maneuvers of the other assets in the simulation may be tracked and recorded. The recorded data from many simulations may be used to train the AI systems that control the virtual assets. The AI systems may learn from the pilot's experiences, head position, eye position, bio-indicators from the pilot, the pilot's maneuvers, enemy maneuvers, friendly maneuvers, etc. to better predict what movements might be made and how to guide a pilot in similar situations. The trained AI systems can then be used to further train pilots and provide pilots with real time suggestions in a combat situation or to help the pilot perform a mission.

The AI guidance and cues presented to the Pilot during training or actual missions may be audio, visual (e.g., AR), haptic, or other. The pilot may receive audio guidance, information, cues, alerts, etc. based on the AI systems understanding of a complex situation. The audio may provide the pilot information directly from the AI system, which is computer generated content. The audio may be coming from a human on the ground or elsewhere where the human is processing recommendations from the AI system and/or consenting to AI suggested actions. The pilot may also or instead receive visual information that is presented on a heads-up display, head worn AR display, on an instrument panel, etc. The visual information may come directly from the AI system. It may include visual cues indicating navigation guidance, maneuver guidance, restricted zones (e.g. country restricted no-fly zones, an occupied airspace (e.g. occupied by another plane)), mission targets, incoming threats, etc.

An AI system according to the principles of the present invention may include multiple separate and coordinated systems using multiple AI systems depending on the situation. As discussed herein elsewhere, assets WVR produce at least one very significant extra information stream as compared with BVR; namely, visual information. The environment also significantly changes for the pilot once he is within visual range of an enemy, it becomes less predictable and the situation can change very quickly. The AI system WVR is gaining an understanding of the situation based on the additional information that the pilot sees, feels, hears, etc. The WVR AI system uses this additional perspective and information to give what may be different from what might be provided in a BVR situation. So, there may be a WVR AI system and method and there may be a BVR AI system and method. The two AI systems and methods may need to coordinate because what is happening in one environment may effect what is happening in the other.

In addition to coordinating an AI system WVR and AI system BVR, a different AI system may be invoked at a transition point between BVR and WVR. The transition AI may have different rules and processes than either the BVR or WVR due to the nature of the environment. With BVR the pilot generally relies on instrument feedback and guidance. With WVR an AI system in accordance with the present disclosures may use rules and processes inclusive of the nature of close combat. As an enemy asset approaches WVR the pilot must get ready for the WVR experience. Preparation may include identifying where, within the pilot's visual field, the enemy is going to approach from, how quickly the enemy is going to be approaching or passing, the attitude and direction of the enemy asset, what maneuver the enemy may make in transition or once WVR, etc. The pilot's senses may also be heightened in the transition period because he is preparing for a close engagement. The transition AI may take into account all of the preparation information and the pilot's heightened senses when providing guidance to the pilot or plane.

Similarly, the AI control system of virtual assets (e.g., computer generated and controlled) may also have different rules and processes for the various distance-based scenarios. Such AI control may be based on different conditions and anticipated conditions in BVR, WVR, and in the transition range.

A pilot may be operating in a live aircraft and performing training simulations. Virtual and constructive assets may be presented to the pilot during the training exercises. The virtual assets may be controlled by an AI system with coordinated AI for BVR, WVR and the transition between BVR and WVR. The virtual asset AI control may behave differently in each distance-based scenario. For example, as an enemy virtual asset approaches the live asset, within the virtual environment, or another virtual or constructive asset, the enemy asset may operate under AI processes that take into consideration that, if the enemy asset had an actual enemy pilot controlling the asset, the pilot would have to make certain preparations and his senses would be heightened. Consideration may also be given to the anticipated increased cognitive load on the pilot. This could provide a virtual asset control that more closely mimics a live asset with a real pilot during simulations.

The transitional AI controlling a virtual asset in a simulation may understand that the virtual asset is a type that is to be considered autonomous. In this situation, the transitional AI may control the virtual asset based on preparing to go into WVR mode, but it may not consider the pilot's cognitive load or heightened senses.

A simulated or real combat situation may involve many assets WVR and/or BVR of a pilot. There also may be more than one pilot being assisted by an AI system. Each pilot has its own WVR range and the respective WVR ranges may overlap. The fact that one pilot may be WVR of an asset, causing that one pilot to process the additional visual information, may need to be considered by the AI system when providing information to another pilot that may not have anyone, or a different asset, WVR.

Figure 18:
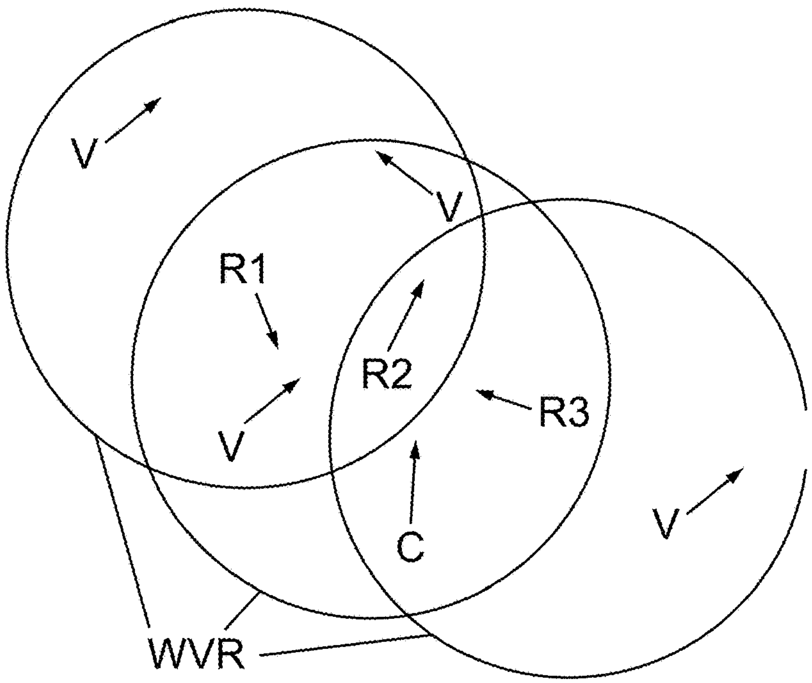
FIG. 18 is an illustration of an exemplary and non-limiting embodiment of a situation with assets in various positions.

With reference to FIG. 18, there is illustrated an exemplary and non-limiting embodiment of a situation with assets in various positions. As illustrated, three real, or live, aircraft are depicted as "R". Virtual assets are represented as "V". Constructive aircraft are depicted as "C". As can be seen, the three real aircraft may have different assets their WVR, each asset has restricted maneuverability, and each asset outside of anyone R's WVR may need to be considered by its BVR AI controlling system. As a result, the WVR AI system may be deployed for one asset and not another or two or more assets may be advised by a WVR AI model and others may be advised by a BVR model. Each model may affect the other as well.

In accordance with exemplary and non-limiting embodiments, the process of acquiring sensor information from one or more vehicles, maintaining a repository of data describing various real and virtual platforms and environments, and generating presentation data may be distributed among various platforms and among a plurality of processors.

Figure 19:
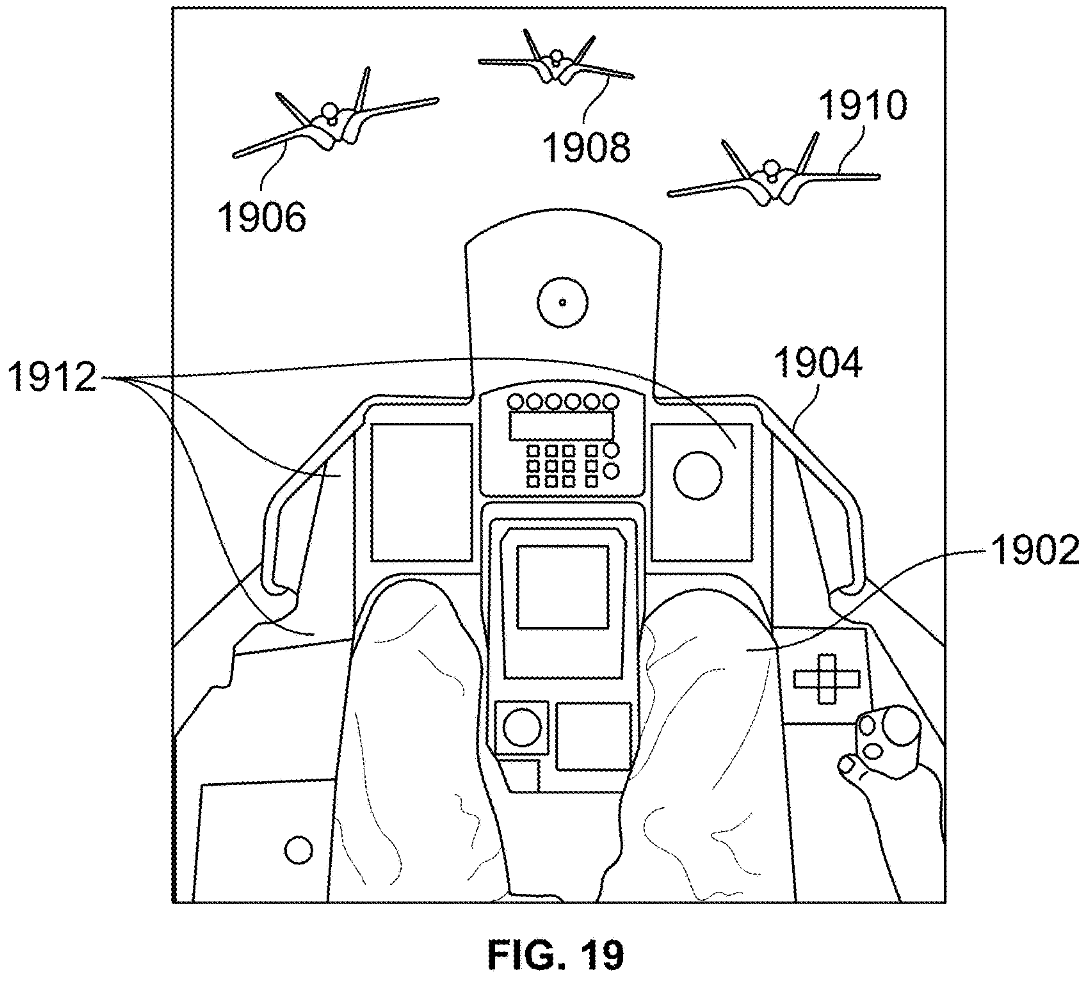
FIG. 19 is an illustration of an exemplary and non-limiting embodiment of a jet cockpit.

FIG. 19 is an exemplary and non-limiting embodiment of a fighter jet cockpit with computer generated jets 1906, 1908 and 1910 presented to a pilot of the fighter jet through augmented reality. The pilot of the fighter jet is flying a real aircraft and is seeing computer generated assets through a see-though computer display such that the pilot can see the outside environment as well as the computer generated content, which appears to the pilot to be in the outside environment. A Lidar system may be used to track certain features 1912 within the cockpit and make time-of-flight measurements between the helmet, or other portion of the pilot or pilot's gear, and the features as a method for tracking the position of the pilot's head within the cockpit. In embodiments, the Lidar may be mounted in the cockpit or on the helmet or otherwise head mounted.

In embodiments, the Lidar may be mounted on the helmet or other head mounted system. The Lidar may then make its time-of-flight measurements between the helmet and points detected within the cockpit. The cockpit may be pre-mapped, so the Lidar does not need to re-map the area, but, rather, identifies known points within the pre-mapped cockpit to which to measure. The Lidar may have a set of points within the pre-map that it generally selects from to increase the speed of the Lidar process. For example, rather than the Lidar making time-of-flight measurements to different parts of the cockpit it may have a preferred set of points within the cockpit that it looks for. In the event those pre-identified points are not detectable (e.g., because of interference) the Lidar may make measurements to other parts of the cockpit. The arrangement of the preferred points in the cockpit may be based on separation distance between the points themselves and/or the points and the helmet mounted Lidar to increase the accuracy of the Lidar data as used for triangulation or other calculation.

In embodiments, the Lidar may be mounted in the cockpit and positioned to track the helmet. The helmet, or other head mounted system, may have identifiable features that the Lidar can identify and track with its time-of-flight measurements.

Figure 20:
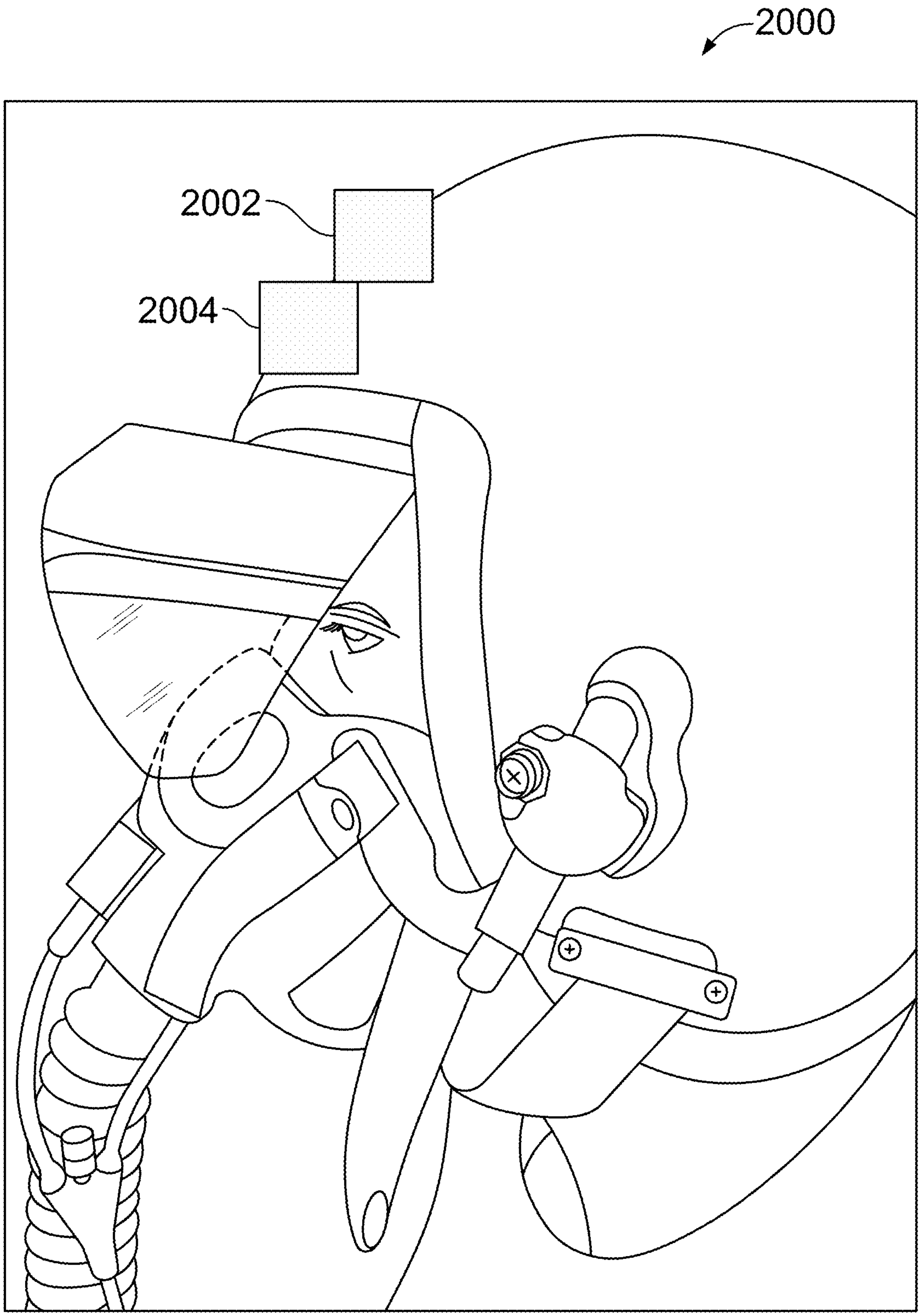
FIG. 20 is an illustration of an exemplary and non-limiting embodiment of a pilot's helmet.

FIG. 20 illustrates a pilot's helmet 2000 with a time-of-flight measurement system (e.g., Lidar) 2002 and an inertial measurement unit (e.g., IMU) 2004. The Lidar 2002 may make periodic measurements within the pilot's environment to locate the helmet's position and identify in what direction the pilot is apparently looking as indicated by the position of the helmet. The Lidar time of flight measurements are relatively slow but they are highly accurate. The IMU 2004 may make measurements to track movements of the helmet, which can be mapped to identify the helmet's location and position. The IMU measurements are relatively fast and accurate, but they accumulate error by 'drifting'.

The two data feeds, time-of-flight and inertial measurements, may be merged for analysis or separately analyzed with reference between the two such that the IMU location and position calculation is compared to the time-of-flight location and position calculation at a coincidental or near coincidental time(s) of data acquisition. The comparison may be used to re-calibrate the IMU location and position calculation. The re-calibration may be done each time the Lidar and the IMU have data acquisitions at coincidental or near coincidental times.

The vehicle (e.g., fighter jet, bus, car, truck) may include an IMU to monitor the vehicle's movements. In embodiments, the IMU data from the head tracking system may be compared to the IMU data from the vehicle's movement such that movements of the helmet, or other head mounted system, can be separately derived from the vehicle's movement. In effect, the movement of the vehicle as measured by a vehicle IMU may be subtracted from the movement of the IMU of the head tracking device to derive movement of the head device IMU relative to the vehicle and not to some external frame of reference beyond the vehicle. An augmented reality system as described herein may need the separate IMU data compared such that the location, attitude and force vectors of the plane can be used separately from the estimates of the head location, attitude and force vectors. For example, the plane's IMU may be used to understand where the plane is within a mapped virtual environment and the helmet's IMU may be used to understand where from within the plane the pilot is looking.

In some embodiments, a pre-map data set (e.g., point cloud data set) may be referenced in the process of head tracking with Lidar. A pre-map removes the necessity of the Lidar to actively map the environment, which speeds up its distance measurement refresh rate. A head-worn system with Lidar may be matched or keyed to a type of vehicle or particular vehicle. The systems may confirm the key (e.g., through Bluetooth) and then the Lidar system may operate based on the understanding that it has the correct map for the environment. The key, may involve a menu, where a user may select the vehicle to which it is paired. The menu may have a listing of all accessible pre-mapped environments. In the event that a user is getting into an unknown vehicle, the user may be prompted to select a vehicle from a menu as the user gets near or into the vehicle. For example, a public transportation bus, train, etc. or a commercial airliner, car, etc. may be connectable to the head mountable system. Once connected, a map to the otherwise unknown vehicle may be made available to the Lidar system (e.g., downloaded to the HMD, connectable via a wireless connection).

As noted, the cockpit may be pre-mapped, so the Lidar does not need to re-map the area, but, rather, identifies known points within the pre-mapped cockpit to which to measure. In some embodiments, the pre-mapping may be derived from or take the form of a CAD description of the cockpit.

In some instances, the viewing device, such as a helmet or wearable display device may include markings or targets distributed about the device. One challenge with such a system is the necessity to capture video of an environment in which there is a viewing device. This need arises from the need to capture a series of images in rapid succession in an environment wherein the viewing device is moving. There is often an inverse correlation between the pixel resolution of video signals and the resolution of individual frames.

In instances where there is accessible a CAD description of the interior of a cockpit, a mounted camera (e.g., single or multiple cameras), such as an event camera, may serve to identify the position in space of aspects of a helmet. When the geometry of the interior of a cockpit is known, it may be possible to identify the position of one or more features of a helmet with respect to the position of other CAD mapped features in the cockpit on a two-dimensional image captured by the camera. Using this information, it may be possible to determine the position in three dimensional space of the helmet. As described above, when data including, but not limited to, Lidar, IMU measurements and camera imagery is fused, the resulting helmet position data may be more accurate and mire timely than position data derived from any sunset of such data sources.

In embodiments an event camera may be mounted on the interior of a vehicle (e.g., cockpit of an airplane), on a user (e.g., on a person's body), on a user's head (e.g., a head mounted device, head mounted display, helmet) or otherwise located to image surroundings in an effort to identify movements and/or viewing direction of a user in an XR environment.

Figure 21:
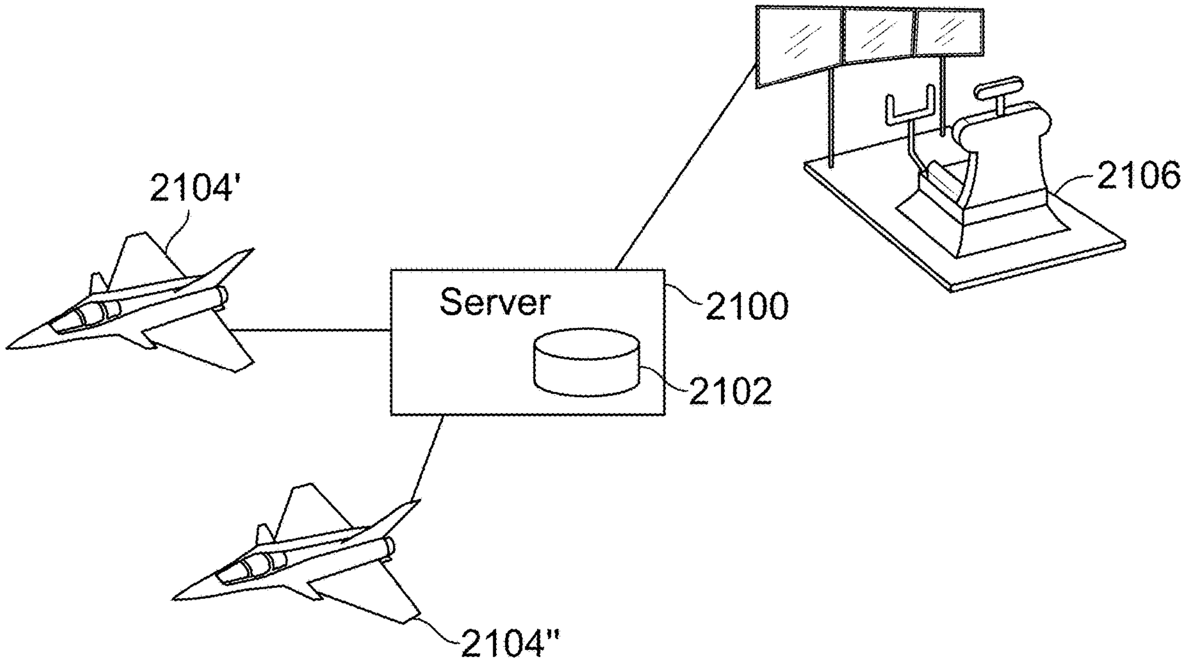
FIG. 21 is an illustration of an exemplary and non-limiting embodiment of a data distribution model.

In one embodiment, with reference to FIG. 21, a centralized server 2100 may serve as a repository for sensor information in a spoke-hub data distribution model. As described elsewhere herein, a server 2100 may receive and store data from various vehicles 2104', 2104" indicative of the state of the vehicle. Examples of such data include, but are not limited to, velocity, altitude, orientation, etc. The server may also receive and store data from virtual vehicles 2106. In some instances, these virtual vehicles 2106 may operate with some human intervention. For example, an individual may operate a ground based flight simulator wherein the simulated experience may be mapped to a virtual airspace forming a database on the server. While the orientation, velocity, location, and the like are generated as attributes of a virtual entity, such data may be included in the sensor information repository and integrated with the data describing physical vehicles and entities.

As described elsewhere, the server 2100 may likewise store information describing one or more virtual objects. As with other objects/entities, these virtual objects may encompass a variety of attributes including, but not limited to, location, velocity, orientation, and various rules describing the behavior and appearance of the virtual objects.

In some embodiments, each physical object, such as a plane, may be described in the repository in both real terms and relative terms. In some instances, relative terms may take the form of an offset value in three dimensional space. For example, a first plane may be heading directly north over California at an altitude of 15,000 feet and a speed of 500 mph. At the same time, a second plane may be heading directly south over Germany at an altitude of 17,000 feet at a speed of 500 mph. In this example, it is desired that the two planes be enabled to engage in an air training exercise in which the two pilots fly in formation in a virtual airspace with the second plane approximately 50 feet off of the right wingtip of the first plane with both planes flying side by side at an altitude of 16,000 feet and headed due east over Japan.

In some embodiments, in accordance with this example, the server 2100 may receive updated position and orientation data from each of the planes indicative of the absolute position of each plane. For example, GPS coordinates of the first plane will be indicative of a location over California while GPS coordinates of the second plane will be indicative of a location over Germany. The server may likewise maintain a database of a virtual airspace over Japan wherein each of the planes' actual locations are translated into the coordinates of the virtual airspace. As a result, for example, the received latitude and longitude coordinates of the first plane as it proceeds due north may be translated into virtual coordinates over Japan whereby the first plane's actual movement to the north is translated into movement due east. Likewise, movement by the first plane to gain altitude or lose altitude from its present actual altitude of 15,000 feet will be translated into deviations about a virtual altitude of 16,000 feet. In a similar manner, the actual data received by the second plane may be stored as well as translated into the virtual environment.

As a result, while each plane is thousands of miles from the other plane, the server 2100 may send presentation information to each plane enabling the rendering of the other plane, such as via a pilot's augmented reality display, as existing in a shared virtual environment. In addition to rendering various objects, terrain may be projected as AR content to one or more pilots such that one or more pilots operating in a shared virtual environment will experience the same virtual environment as existing above and about the same terrain. As described more fully below, the geographic extent of a virtual airspace will often times be of an extent that is less than the clear airspace surrounding each participating plane. For example, consider a disk-shaped virtual airspace that extends latitudinally and longitudinally in all directions from a virtual center point for 50 miles at an altitude of 16,000 feet and extending to higher and lower elevations plus-or-minus 15,000 feet. When actual plane positions are translated into the virtual space, it is preferable that the extent of the boundaries of the virtual space with relation to each plane correspond to clear airspace around the physical planes in actual space. For example, as described, a first plane with an actual altitude of 15,000 feet may have a translated altitude in a virtual airspace of 16,000 feet. If the first plane is over the ocean off the coast of California, any descent beyond 15,000 feet will place the plane below sea level and may result in a potentially catastrophic system failure. However, even after descending 15,000 actual feet, the first plane exists in the virtual airspace at an altitude of 1,000 feet.

It is therefore preferable to map each actual vehicle to the virtual space in such a way that the physical vehicle may move freely about the virtual airspace without encountering any real world obstacles. Note that in such instances, while each pilot in either the first or second plane in this example may see a rendering of the other plane as a virtual image in, for example, an augmented reality display, the virtual airspace may appear quite different to each pilot. For example, the first pilot may see the second pilot off of his wingtip with the Sierra mountain range beyond while the second pilot sees the first plane off of his left wingtip the lowlands of Bavaria in the distance.

In some embodiments, the virtual space may be defined to be smaller than the actual unobstructed, or "safe," airspace of any of the vehicles sending sensor data to the server. Doing so may serve to avoid the predicament of a pilot flying outside of the virtual airspace and being immediately confronted with a real world obstacle. In some instances, the amount by which a vehicle's safe airspace exceeds the dimensions of the virtual airspace may depend, at least in part, on a characteristic of the vehicle. For example, a vehicle capable of supersonic flight may have a greater excess and appended safe space as compared to a slower vehicle. In other instances, considerations such as the presence of national borders and/or restricted airspace may be taken into account when establishing a suitable real airspace corresponding to a virtual airspace.

As described, data is being collected by sensors on vehicles 2104', 2104" and transmitted to a central server 2100. This data is used to define the state of all vehicles and objects, whether real or virtual, and to transmit presentation data to each vehicle to enable the presentation of objects in a virtual manner. In some embodiments, the presentation data may be provided to, for example, a gunner either in the aircraft or in a ground vehicle via, for example, AR head gear. In some exemplary embodiments, the processing of the data is distributed among the processing platforms. Generating imagery for presentation to a pilot may require the retrieval from memory of a wireframe model of an object and surface textures to be draped upon the model. Depending on the detail of the wireframe model and textures, it may be necessary to transmit several megabytes of data to a graphics card to create each frame. In some instances, vehicles supporting processors with requisite graphics capabilities may create the imagery for display to a pilot based, at least on part, on data transmitted from the server to the vehicle.

For example, with reference to the preceding example, the server may map the location of a second vehicle to a place in the virtual airspace which is 50 feet off of the right wing of the first plane. The server may transmit data in the form of a data structure to a processor on the first plane. Such data may include, at least, the position and orientation of the second plane. The data may represent the location of the second plane in relation to the first plane in absolute geographic coordinates, as coordinates within a virtual airspace wherein each plane has information necessary to translate virtual airspace coordinates into absolute or relative positions in real space, or some mixture of the two. Retrieving onboard information detailing the position and orientation of the first vehicle as well as the view vector of the pilot's gaze, a processor on the first plane may inform the graphics processing unit to create imagery for display to the pilot showing the second plane in a position and orientation received from the server. Likewise, the second plane may receive information transmitted from the server detailing the position and orientation of the first plane and may proceed to produce imagery for display to a second pilot showing the first plane in its proper relationship to the second plane.

As illustrated, the server 2100 functions as a central repository for data defining the virtual airspace. If a virtual object or additional vehicle is added to the database on the server 2100 representing the virtual airspace, that object is effectively pushed out to all vehicles for display. In some embodiments, renderings for display created by a processor running on a vehicle may make use of graphic data stored locally, stored on the server or some combination of the two. For example, the first plane may have stored locally a generic model and surface textures for a generic F-22 fighter. At some point during an exercise, the server may push out portions of surface textures unique to a particular plane, such as a texture showing the name of the pilot as is commonly presented beneath the cockpit. Further, a wire frame model of the actual pilot may be uploaded as well as stored locally by participating vehicles. As a result, in addition to transmitting location and orientation information for each vehicle to be displayed, the server may additionally send unique identifying information for a plane to be displayed. In response, when creating an image of the unique plane for display, each plane's processor may combine static model data with data unique to each displayed vehicle to produce a more lifelike representation.

In a similar manner, the server may continually push out updated display information. For example, if a first plane manages to inflict a number of virtual bullet holes in the fuselage of a dogfighting plane, the server may push out to participating vehicles an updated portion of the surface texture of the fuselage showing the bullet holes. In this manner, data latency is reduced by reducing the amount of data that the server 2100 needs to send to each vehicle 2104, 2106. By distributing the processing, the server 2100 functions to coordinate the receipt and transmission of data indicative of the state of the virtual airspace to each interested entity and/or vehicle while the graphics functions requiring the movement of large volumes of data are performed efficiently by a plane's processor.

Because planes may be flying with respect to one another at speeds exceeding the speed of sound, vehicles, and objects, whether virtual or real, may travel a perceivable distance between frames. For example, two planes closing on each other each traveling 500 mph (806 kph) results in a closing speed of 448 m/sec. If one is computing 50 frames per second, each plane will appear to have moved almost 9 meters with every new frame. As is evident, if the position and orientation data received by each plane is delayed for even the briefest of time periods, the displayed position of a vehicle or object may be incorrectly plotted or may appear to jump around rather than appear to be moving smoothly through space.

In some embodiments, historic and real-time data may be utilized as inputs to a performance model which may output extrapolated location data for objects.

Figure 22:
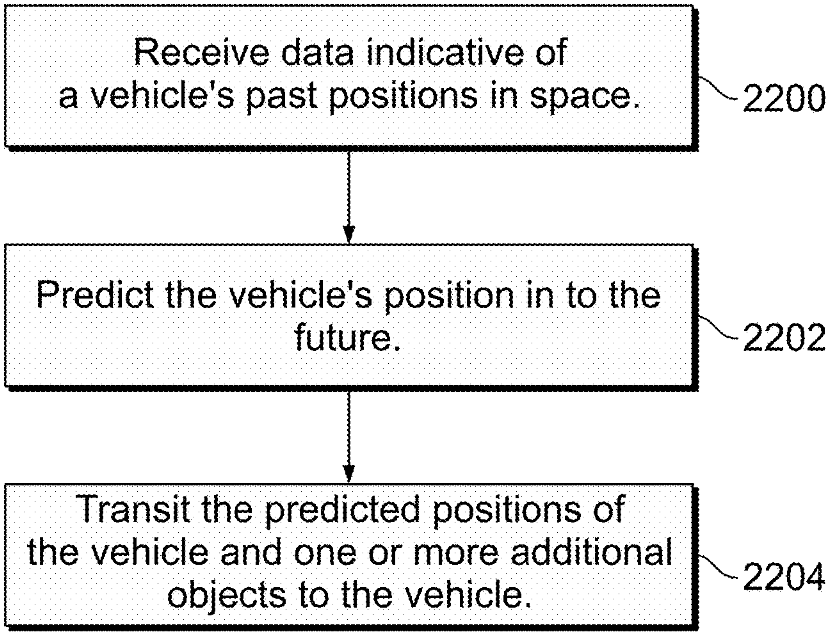
FIG. 22 is an illustration of an exemplary and non-limiting embodiment of a flowchart of a method.

FIG. 22 shows a method for utilizing historic and real-time data may as inputs to a performance model which may output extrapolated location data for objects, in accordance with some embodiments.

At 2200, the server may receive data indicative of a vehicle's past position in space. At 2202, the server may predict the vehicle's position into the future. For example, the server may fit a curve through a vehicle's discreet positions in space extending back in time, for example, for a number of seconds. Based on received sensor outputs from the vehicle and the historical data, the server may apply a model to predict the position and orientation of the vehicle forward in time at discrete points, for example, several seconds into the future. In some embodiments, along with transmitting data indicative of the position and orientation of various objects to each vehicle for display, the server may also send a plurality of future times and associated predicted positions and orientations for various objects as shown at 2204.

For example, a first plane may receive time stamped position and orientation information at which to display a second plane. If the latency between the current time and the time stamp is low, for example, 1/1000 of a second, the first plane may create and display imagery for display to the pilot of the first plane. The first plane may at the same time receive a steady or intermittent stream comprised of a plurality of extrapolated positions and orientations of the second plane. If, for some reason, the most recently received actual position data for the second plane exhibits high latency (e.g., on the order of a second), or if an incoming data stream is compromised or broken, the first plane may utilize previously extrapolated position data until data acquisition is restored. In such an instance, it is possible that utilizing newly acquired position data received while utilizing extrapolated data may result in the apparent position of a displayed object "jumping" from the last extrapolated position to the newly identified actual position. In such instances, the system may operate where practicable to interpolate between the last utilized extrapolated position of an object and the most recent actual position of the object to provide for the appearance of smooth movement of the object without any jumping.

In some embodiments, there may be provided a user activated kill switch to turn off the display of virtual objects. In environments where multiple photo realistic objects are displayed to a pilot, it may be preferable to provide a method whereby the pilot only sees objects which are physically occupying the same airspace. In some embodiments, the pilot or operator of a vehicle may enable an enhanced mode wherein objects which are virtual and do not occupy the same airspace as the pilot may be visually tagged as virtual. For example, there may be three planes flying in formation in a virtual airspace. Two of the planes may be in actual proximity to one another while the third may be flying hundreds of miles away. Both of the proximate planes may see the third plane generated and displayed as a photo realistic object flying in formation in the virtual airspace. Likewise, the third plane may see both of the two proximate planes generated and displayed as a photo realistic objects flying in formation in the virtual airspace. By activating an enhanced mode, both pilots of the two proximate planes may see the third plane rendered with a visual indicia indicating that it is virtual. For example, the third plane may glow red, may be outlined in green, etc.

Operating in enhanced mode may allow each pilot individually to declutter the observable airspace in order to focus on real world objects and obstacles.

Figure 23:
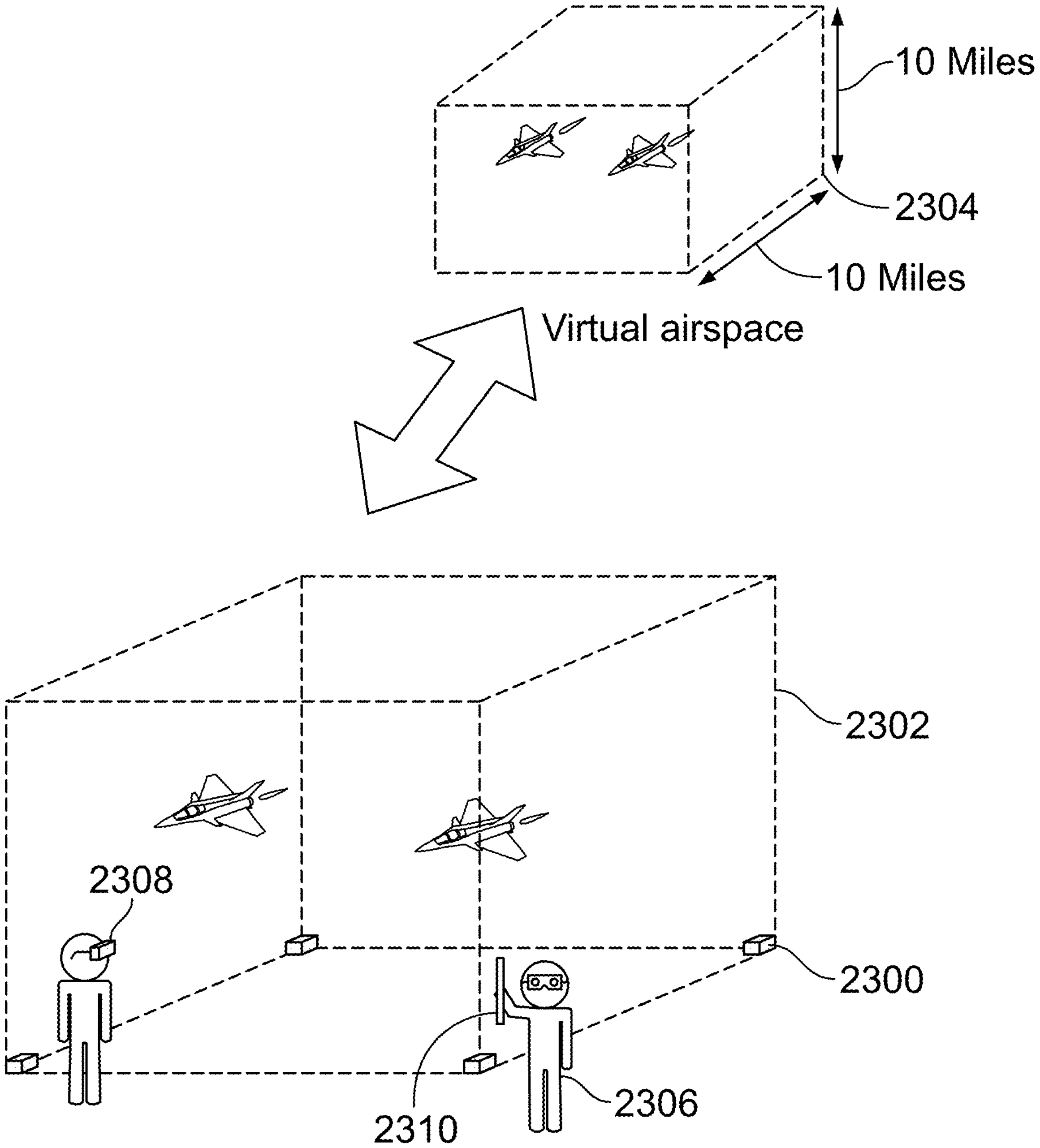
FIG. 23 is an illustration of an exemplary and non-limiting embodiment of a system for interacting with mapped data.

In accordance with other exemplary and non-limiting embodiments, the database maintaining the state of the virtual airspace may be accessed in real time and mapped to a physical location, such as an office space, for observation and interaction by one or more observers as illustrated with reference to an exemplary and non-limiting embodiment at FIG. 23. In one embodiment, visual indicia 2300 comprising markings may be applied to a volume of space, such as a conference room or office, at known locations enabling augmented reality display systems to integrate the display of virtual objects into the three dimensional volume of space.

For example, a virtual airspace 2304 comprising a cube ten miles on each side may be mapped to second virtual display space 2302 comprising a cube ten feet on each side wherein the virtual cube is further mapped to a physical volume of space in an office. As a result, planes flying in the virtual airspace may be projected and displayed as occupying a scaled down version of the airspace within a ten foot by ten foot by ten foot volume of the office. All objects stored as forming parts of the virtual airspace may be represented in the virtual display space. Observers 2306 with augmented reality display systems 2308 may be able to walk around the virtual display space 2302 and view the virtual display space 2302 from different angles.

In some embodiments, observers may be enabled to interact with displayed virtual objects and request more data. For example, an observer may reach out and touch a displayed virtual plane causing a menu to be displayed in space allowing the observer to see information on the pilot of the displayed virtual plane. In other embodiments, a user may rewind to a previous moment in the display of the virtual airspace in order to view again a sequence of events.

In some embodiments, walking around the virtual display may occur during a static moment of visualization such as, for example, during a freeze frame multi-domain exercise. In such instances, viewers may walk around the displayed data in order to shift a point of view. In other embodiments, viewers may employ a perspective shifting device, such as a virtual stick 2310. For example, a viewer may utilize virtual stick controls to manipulate a camera angle, a focal length and a position allowing the viewer to fly anywhere and zoom in and out. In some embodiments, the viewer may shortcut these moves to "snap" into a POV of any aircraft pilot. The viewer may shift time by using virtual stick controls such as rewind/fast forward, start/stop, repeat loops, reverse, slow motion and the like. In some embodiments, the viewer may "grab" objects in the scenario and "move" them temporarily to change positions/orientations of aircraft while the scenario is playing back.

In other embodiments, the system may enable playback of recorded data from a repository of timestamped data describing various real and virtual platforms and environments as they interacted in various scenarios over a time period. For example, observers may project or otherwise view data from an aerial exercise comprising both real and virtual entities as seen from the perspective of a pilot taking part in the exercise. In some instances, the view point of the observer may be set to a point within the cockpit allowing for the observation of the motions of the pilot. As a result, it may be possible to observe, for example, head and eye motions of the pilot. In exemplary scenarios where the recorded data include head, eye and plane attitude data tracked in real-time, this allows for viewing the pilot's reactions during a training exercise.

In addition to passively receiving virtual airspace data from the server, observers may be enabled to interact with the system in order to alter the virtual airspace. For example, an observer may touch or otherwise indicate a portion of the virtual display airspace and indicate to the system the addition of three additional enemy fighter aircraft. These aircraft, once entered into the virtual airspace database, will be pushed out to participating vehicles and entities as described above.

Advanced Tactical Airborne Reconnaissance Systems (ATARS) may be utilized to provide real-time visualization of datasets to pilots traveling at high speeds.

In some embodiments, the playback of recorded data may incorporate the display of terrain. Such terrain may be displayed to provide context for the positioning, motion and actions of a vehicle in a virtual or real airspace. In instances where the participating vehicles exist in the same physical airspace, there may be displayed the actual terrain of the airspace. In instances where the participating vehicles exist in the same physical airspace and the system operates to provide a virtual terrain via augmented reality, the virtual terrain may be presented to observers of the playback.

As described above, two airplanes may be flying remote one from the other. For example, one airplane may be flying over the Pacific Ocean and one airplane may be flying over the Atlantic Ocean. Augmented reality content comprising a virtual terrain of the mountains of Afghanistan may be displayed to each pilot along with a virtual rendering of each alternate pilot to give the illusion that each pilot is flying in formation with the other pilot over Afghanistan. When observing a playback of such an exercise, an observer may select the projection of the virtual Afghanistan terrain common to both pilots as the perceived terrain or may select a representation of either actual terrain over which one or both of the pilots flew.

In some instances, the displayed terrain may be enhanced for the observer. In the above example, the system may have operated to display a realistic rendering of the terrain of Afghanistan to each pilot. During playback, the projected terrain may be augmented with additional geospatial data to aid the observer. For example, the projected Afghanistan terrain may by annotated with the position of anti-aircraft guns, troops and the like.

As described above, the head tracking system may identify the position of a person's or persons' heads within a known environment. Prior art use of conventional head tracking solutions is generally too slow, not accurate enough, and/or error prone to mention a few. Working to locate a pilot's head within a cockpit of an airplane, the inventors discovered that electromagnetic noise in the cockpit is difficult to manage and may cause significant errors when using electromagnetic location technologies. The inventors further discovered that using infrared light triangulation is also prone to errors due to the highly reflective nature of the environment.

Figure 24:
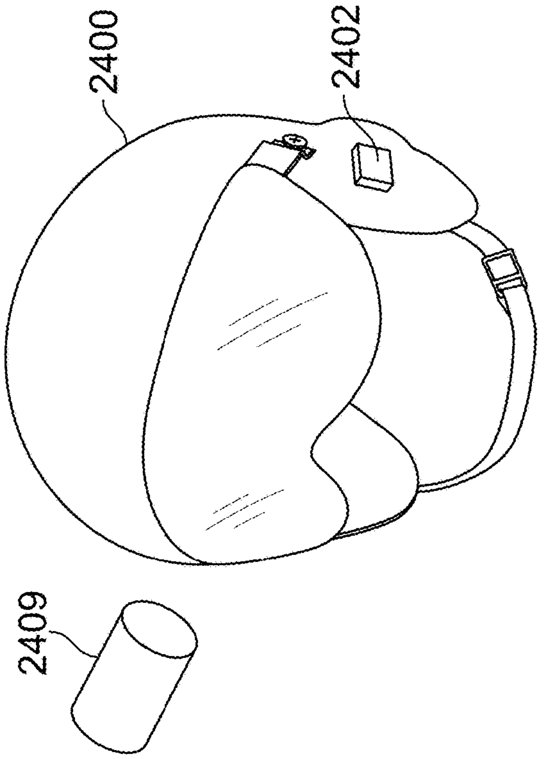
FIG. 24 is an illustration of an exemplary and non-limiting embodiment of a data fusion computer apparatus.

As a result, exemplary and non-limiting embodiments relate to a data fusion computer process using Lidar and inertial measurement unit (IMU) data feeds for the estimation of a head position within a known environment as illustrated at FIG. 24. An IMU 2402 may be mounted on the helmet 2400 of a user (e.g., pilot) and the IMU may track the movements of the head such that the location of the head may be predicted. Simultaneously, Lidar 2404 may track the user's head. The two data feeds may be fused to accurately track the head position and movement. The process involves tracking the head movements using the IMU and then correcting IMU drift by comparing the IMU predicted position with a Lidar determined position. The periodic calibration of the IMU prediction with the Lidar location is done throughout the tracking process leading to a very fast determination of the head position (e.g., less than 5 ms).

Lidar generally uses non-visible light to measure time-of-flight times to generate three dimensional maps of an area. In embodiments, the known environment has been pre-mapped, and the Lidar is used to measure, through time-of-flight measurements, the distance between the person's head and known positions within the known environment. The Lidar identifies three or more areas for inclusion in a location assessment (e.g., for triangulation). However, Lidar measurements, even in the known environment, are generally too slow to make a seamless content presentation in AR. Lidar generally refreshes its location calculations about 5 times per second.

IMU processing is very fast, but it drifts over very short periods of time, so it is not a reliable location system for AR. However, IMU based location predictions are done very fast, generally around 1000 time per second. With the IMU data fused with the Lidar data, the location measurements can be measured very close to the IMU rate itself, with a calibration with the Lidar data being completed based on the Lidar refresh rate. In this manner, very accurate Lidar processing may be used to precisely and periodically recalibrate a starting point to which IMU deviations in position may be applied. The combination of rapid IMU updates periodically corrected with Lidar data serves to continually mitigate potentially unacceptable errors caused by IMU drift.

Figure 25:
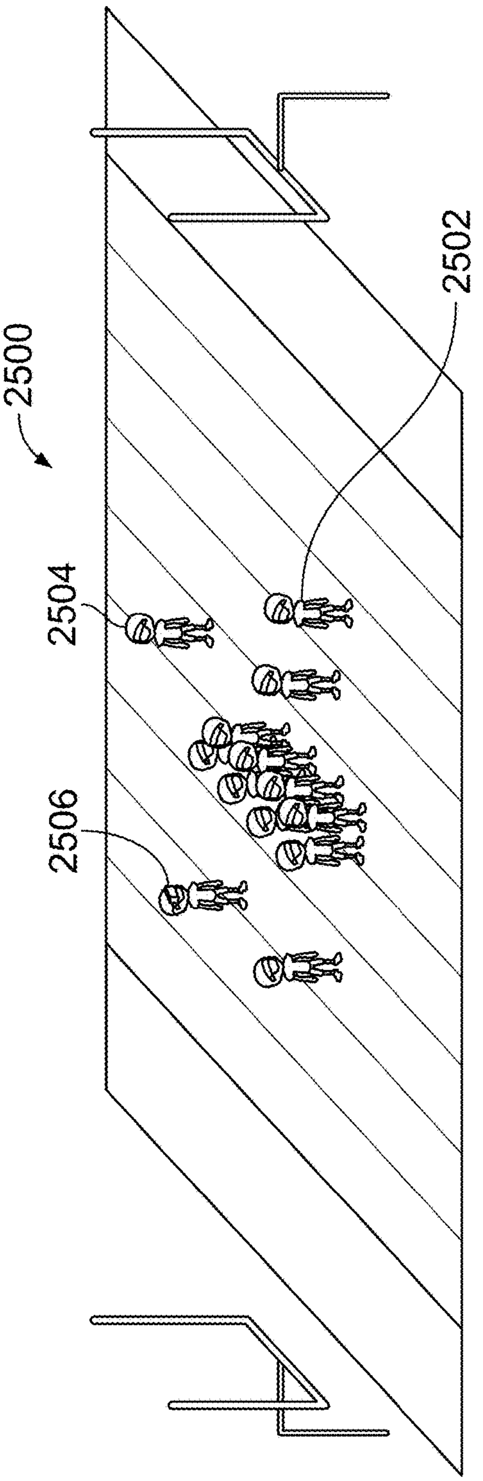
FIG. 25 is an illustration of an exemplary and non-limiting embodiment of a an application of the disclosed technology to a sports scenario.

With reference to FIG. 25, there is illustrated an exemplary and non-limiting embodiment of an application of the disclosed technology to a sports scenario. A computer system in accordance with the principles of the present invention may include an athlete wearable device 2502 for tracking the location of the athlete's general position on a field, track, court, etc. The wearable device 2502 may include GPS, local triangulation system, etc. The wearable device 2502 may be worn in the waist area of the athlete 2504 (e.g., on a belt) or otherwise near the athlete's center of gravity. The athlete's position and overall movement and momentum may be better estimated with the triangulation system mounted near the center of gravity.

The computer system may track the location of the athlete as she progresses through a practice session or drill. The locations may be used to estimate the direction, speed, and momentum of the athlete 2504 throughout the activities. An IMU, velocity sensor, speed sensor, motion sensor, etc. may be incorporated into the wearable device 2502 used to further assist in the prediction of the athlete's location and in a prediction how the athlete is moving and where the athlete is moving towards. For example, a GPS system may track her position and an IMU may track her inertial movements. A short history of these measurements may be used in a calculation of where the athlete is going to be in a short period of time (e.g., 50 ms, 100 ms, 1 sec). It may be important to predict the athletes near-future position such that augmented reality content properly aligns with her position when the content is presented. This can reduce effects of latency in the process of generating, communicating, and presenting the content to the athlete.

A second athlete, possibly using the AR system as well, may be location tracked like the athlete being trained. The second athlete may be on track to intersect with the athlete being trained and a prediction of the collision time, position and resulting movements may be made such that the AR content may be positioned properly in the AR headset(s). For example, the intersection may be a light engagement or a full tackle and the AR content position within the headset may be shifted based on the interaction or predicted interaction.

The computer system may include a head or helmet tracking system 2506 to identify the direction the helmet is facing. A helmet, for example, may have a compass system to detect the direction of the helmet. It may also have accelerometers, IMUs, motion sensors, g-force sensors, etc. that monitor the helmet's motions. IMUs, for example can be very fast but they tend to drift and often require periodic calibration. By combining a relatively slow magnetometer with an IMU or other motion sensors the fast response IMU may be calibrated to the magnetometer output. This may result in a reliable and fast response time and data output indicative of the helmet's position.

Motion or force sensors may also be worn on the neck of the athlete to measure the force of the various neck muscles as an indication of the person's head position. The neck muscle data may further be combined with a compass and IMU type data from the helmet or other head worn monitor. This may provide for another data source to calibrate the IMU, for example. It may also be used to confirm other head motion detections.

The data from the helmet and/or neck may be fused in such a way as to predict accurate head position and tracking (e.g., as described above). The historical tracking of the helmet's position may be used to predict a future position of the helmet. By understanding the direction, location, and forces being applied to the helmet, a near-future position (e.g., 50 ms, 100 ms, 1 sec) into the future may be made. The head/helmet has a known or approximated mass so when the location and forces are known, or estimated, one can predict with good accuracy where the helmet may be in the near-future.

Another technology used to estimate an athlete's head/helmet position could be the use of a local LIDAR or other time of flight measurement system. Such a tracking system may be positioned near the athlete to make the measurements. If the athlete is somewhat stationary, as with a goalie in hockey, a head tracking system may be set up on the goal or near the goal. If the athlete is moving over a larger space, like a quarterback in football, the head tracking system may be held in a position by a drone or wired control system such that it may move in concert with the athlete.

Yet another technology used to estimate an athlete's head/helmet position may be a time of flight or optical system mounted on the helmet and positioned to measure a distance to a known location(s). For example, the ground may be marked, either visibly or invisibly, with many markers and an optical system may be arranged to view the ground to track the helmet position with respect to the markers. Each marker in a given area may be coded such that the tracking system knows where it is in more absolute terms as well as relative terms.

The athlete may wear glasses, a face shield, a helmet, or other head worn device 2506 and the device may include an optical imaging system to detect the direction of the user's eyes. With eye tracking, the AR content presentation may be more targeted and/or foveated.

With the data fusion described herein one may estimate where the athlete is, where her head is looking, and where her eyes may be focused. One may also predict into the near future where the athlete's head may be. With a near-future prediction of location and head position AR content may be positioned to appear in a head mounted see-through computer screen worn by the athlete at the right time and place such that the content appears affixed in a geospatial position without having to anchor the content to a visible object or market.

An AR training system may include a gaming engine (e.g., a system that produces a virtual environment in which the athlete can be mapped) and may be remote from the athlete. The remote system may communicate presentation information to a processor in the athlete's head mounted system. The remote system may communicate with through a local network, wide area network, cell network, etc. With much of the processing occurring remotely and involving wireless communications, latency can be a challenge. For example, a 50 or 100 ms delay between generation of a model, communication of the model, and presentation of the model may be perceived by the user as jitter or misaligned content. This is one of the reasons that predicting the athletes near-future location, attitude, condition, etc. may be important in training.

Figure 26:
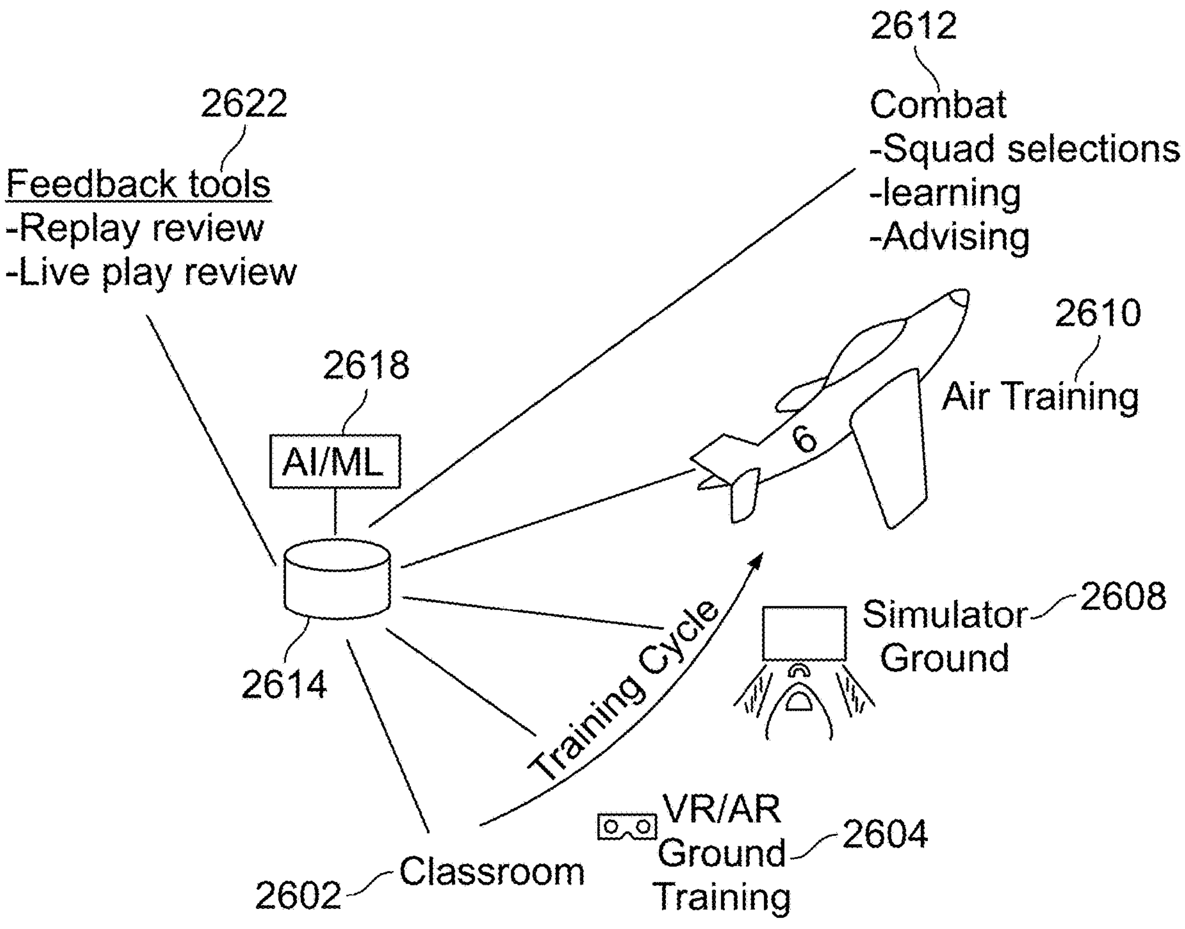
FIG. 26 is an illustration of an exemplary and non-limiting embodiment of a training ecosystem.

With reference to FIG. 26, there is disclosed an exemplary and non-limiting embodiment of a training ecosystem that involves an evolution from books to AR flight and combat.

The inventors discovered new systems and methods for training, tracking, and predicting operational tendencies in various environments for personnel in the control of vehicles. The new systems provide for more advanced training, tracking of student performance, insight into student tendencies, etc.

FIG. 26 provides a high-level illustration of an exemplary and non-limiting embodiment of a training system 2600 in accordance with the principles of the present inventions. The system 2600 may be used to provide different training tools at different skill levels while tracking student performance for expanded, refined or more targeted training. As illustrated in FIG. 26, a student may begin vehicle training by learning in a classroom 2602. The classroom curriculum and student performance may be stored in a central repository 2614. As it is determined that the student is ready for the next training environment, the student may begin to train with a ground-based AR/VR system 2604. Again, with the curriculum and student performance being stored. The next step may use additional tools, such as a ground-based simulator 2608 and then move to in-air training in a real airplane, or other vehicle on land, water, or air, using AR to simulate real in-flight situations while flying 2610.

The training, tracking, prediction may continue after qualifying a student to operate vehicles 2612. For example, data from operational flights (e.g., sorties, combat situations, re-fueling) can be tracked and stored in the central repository 2614 for in-flight guidance and post-flight analysis.

A suite of feedback tools 2622 may form part of system 2600 and may implement replay review and live play review of vehicles and objects in virtual or real airspaces as described above.

Figure 27:
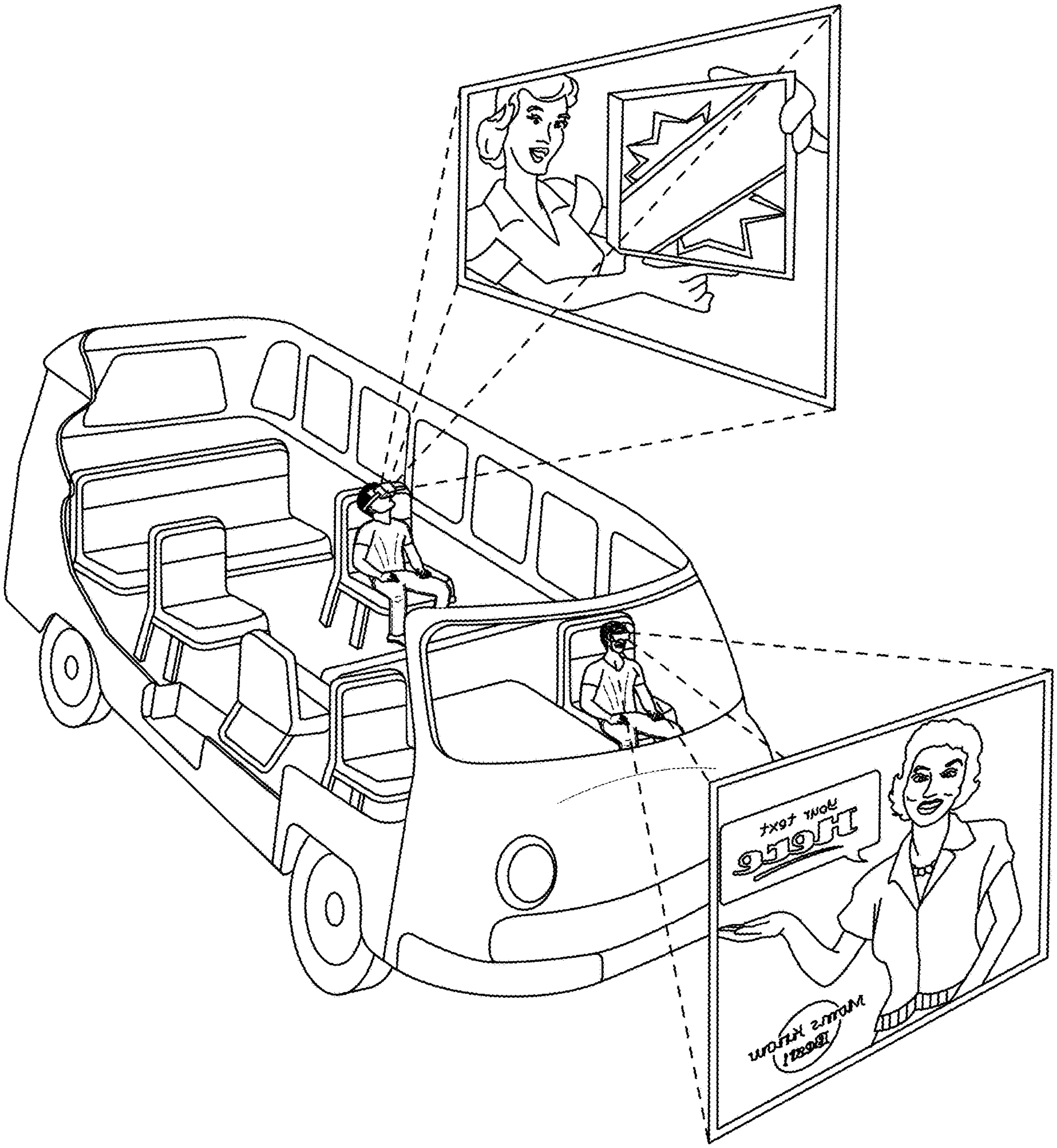
FIG. 27 is an illustration of an exemplary and non-limiting embodiment of an application of the disclosed technology to a multiple viewer scenario.

As described below, the system may operate to ascertain with a high degree of precision the location and attitude of the headsets of a plurality of occupants of a vehicle via, for example, ascertaining a point in the vehicle with a high degree of precision and computing the relative location of each passenger's headset from the ascertained point. With reference to FIG. 27, there is illustrated an exemplary embodiment of a vehicle 2700 containing multiple passengers 2702*i-ii*. As illustrated, each passenger 2702 is enabled to view displayed content 2704 wherein each displayed content item is located at a unique latitude, longitude and elevation. As described herein, the smooth display of elements in the environment is enabled, at least in part, by the ability of the system to extrapolate the position of the vehicle into the future and, hence, the position of each passenger, based, at least in part, on various sensors from which the location, direction and speed of the vehicle may be ascertained.

While some embodiments of this present disclosure relate to location and orientation estimates of a person's head and eyes within a vehicle, the disclosure is not limited for use in vehicles. For example, with the location and orientation of a user's head and/or eyes (e.g., through an AR, VR, XR headsets) known and a prediction of the user's gaze position at a near-future time, virtual content may be placed based on longitude, latitude, and elevation for an accurate viewing position.

Figure 28:
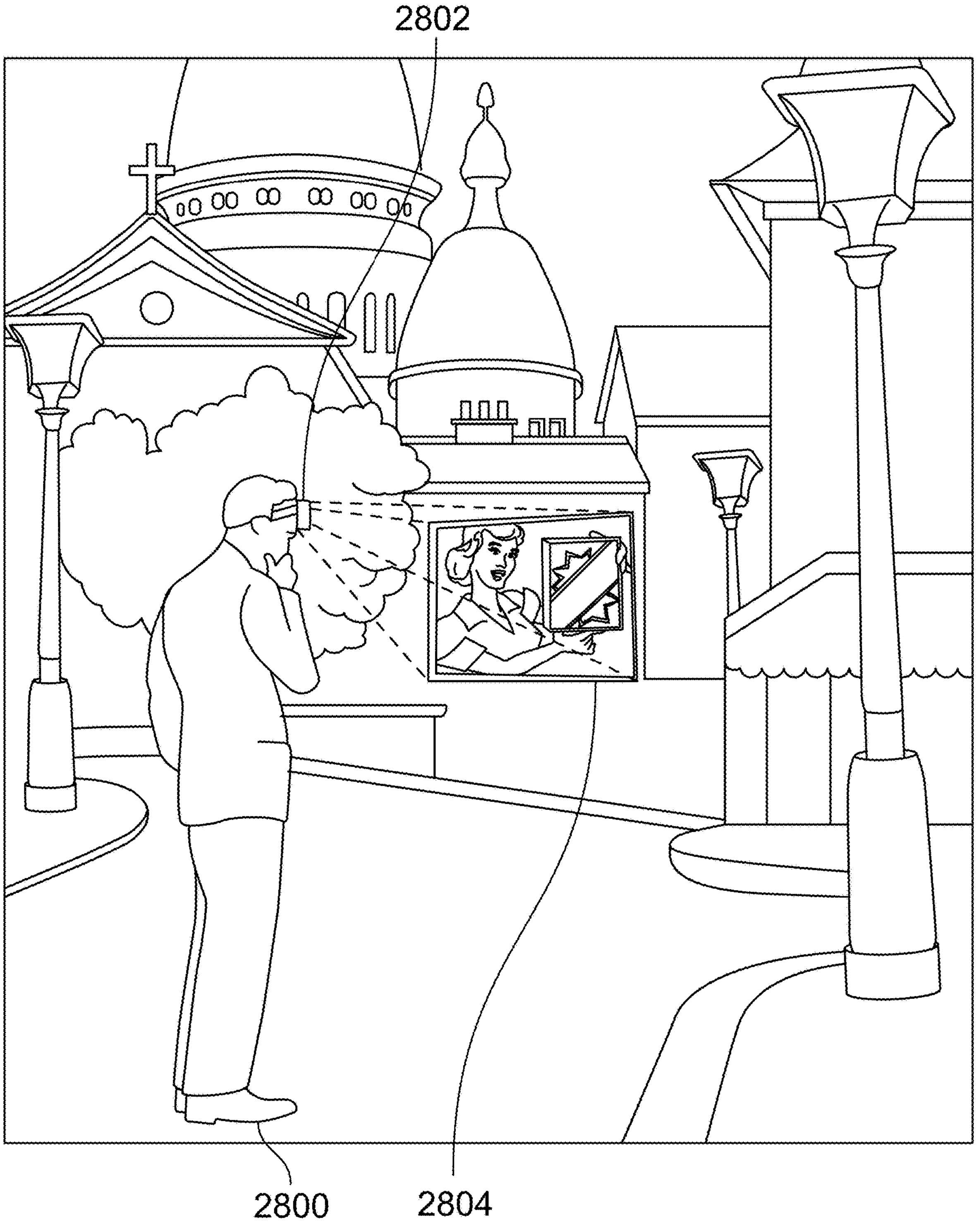
FIG. 28 is an illustration of an exemplary and non-limiting embodiment of an application of the disclosed technology to a pedestrian viewer scenario.

Thus, in similar fashion, an individual with a HMD may be functionally equivalent to a vehicle for purposes of the system tracking a current and future position of the individual. With reference to FIG. 28, there is illustrated an exemplary and non-limiting embodiment of a person 2800 wearing an HMD 2802 capable of implementing functionality described elsewhere herein with regards to a VR or AR augmented helmet. As illustrated, the individual is able to see content 2804 defined by, and effectively anchored to, a position defined by latitude, longitude and elevation.

Figure 29:
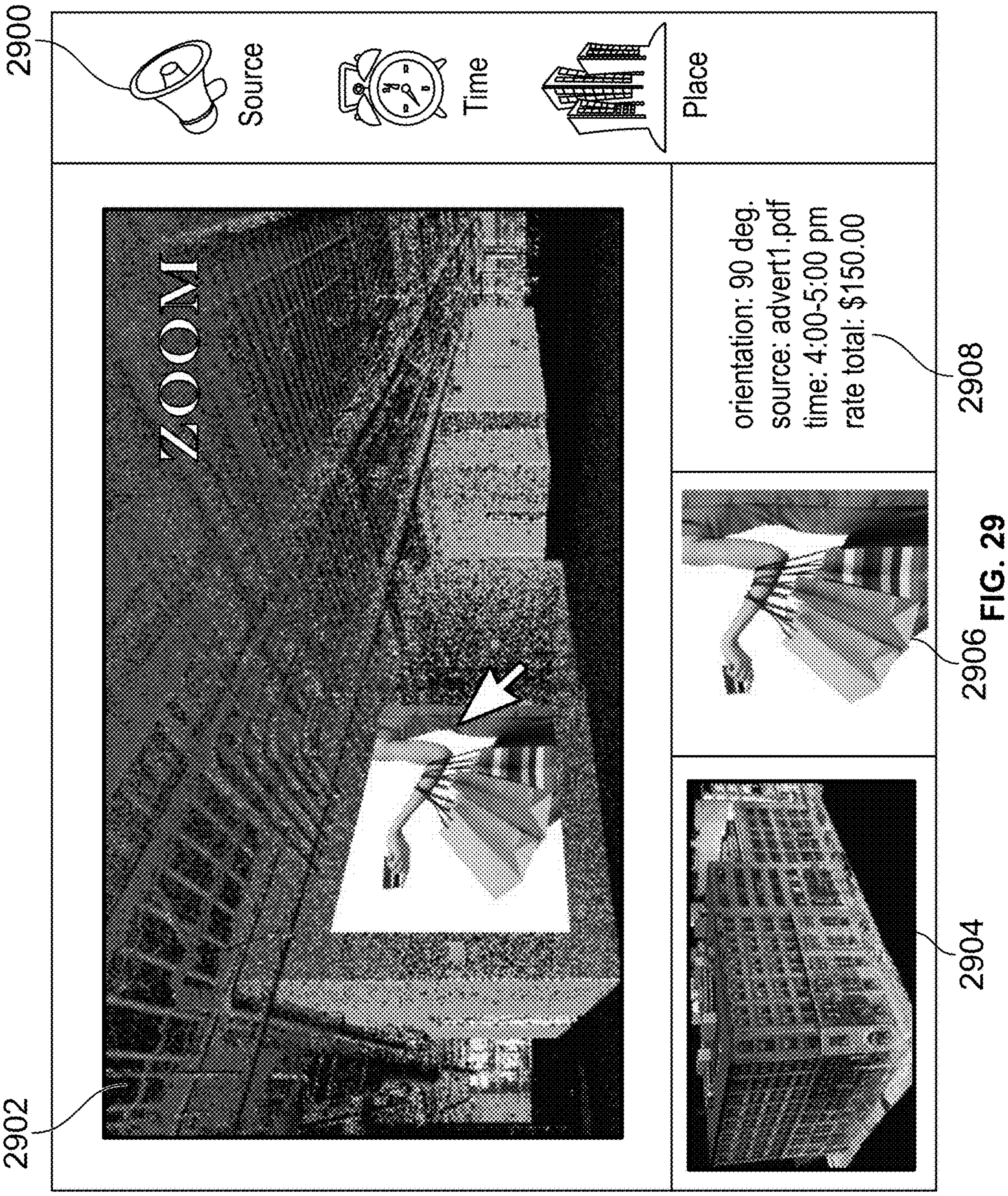
FIG. 29 is an illustration of an exemplary and non-limiting embodiment of a user interface.

With reference to FIG. 29, there is illustrated an exemplary and non-limiting embodiment of a user interface for entering content placement data. As illustrated, a series of icons 2900 allow the user to select, for example, a source of content to be displayed, a time when the content is to be displayed, a place where the content is to be displayed, etc. As illustrated, the user has selected the building shown in site selection window 2904. The user may rotate, enlarge and, generally, navigate through the model or point cloud to identify a desired location to place content. Likewise, a selected is displayed for manipulation in content window 2906. Content placement window 2902 provides tools for zooming in and placing or painting the selected content.

In some embodiments, content placement window 2902 may visually highlight the display of areas available for content placement. Were the system to rely entirely on latitude, longitude and elevation to place content, very small errors in determining the placement coordinates could result in an advertisement be displayed inches behind, and therefore occluded by, a wall. In some embodiments, once the content coordinates are determined, the system displays the content over, in front of or on top of any occluding surface or object within proximity to the content.

In some instances, the advertiser may be presented with data indicative of likely pedestrian traffic volume in the selected area as an aid to selecting the time and placement of materials. In some instances a user interface may enable a user, such as a prospective advertiser, to see a rendering of how the displayed material will look when implemented by the system.

In some embodiments, once the nature and position of the display materials has been defined, the system will render or otherwise convert the placement coordinates of the materials to precise latitude, longitude and elevation coordinates for use as described elsewhere in this disclosure.

Figure 30:
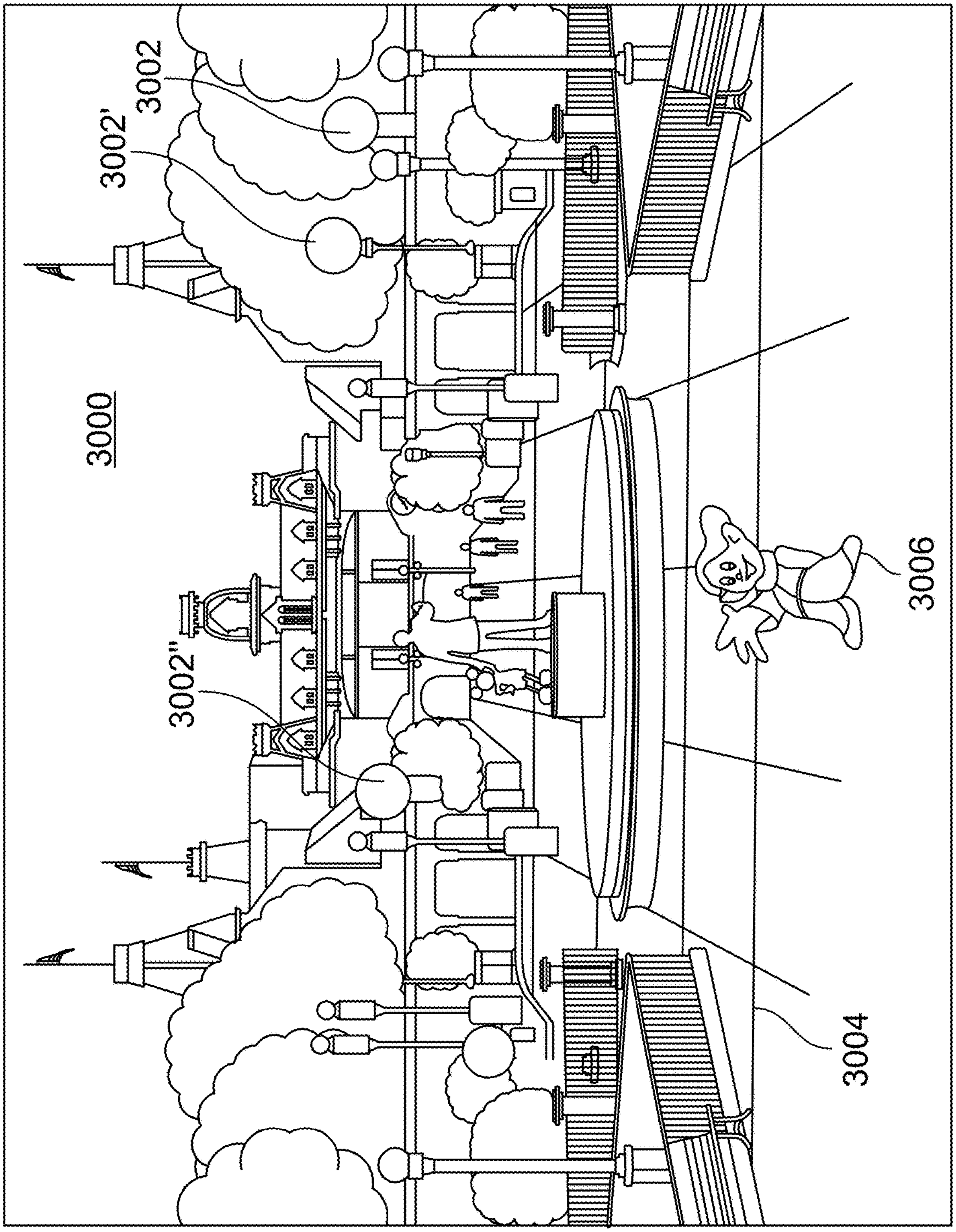
FIG. 30 is an illustration of an exemplary and non-limiting embodiment of an application of the disclosed technology to a theme park scenario.

With reference to FIG. 30, there is illustrated an exemplary and non-limiting embodiment of the online platform as described elsewhere and applied to a scenario in which a user of the platform is traversing a populated expanse, such as a park, a city scape, a theme park and the like.

As described elsewhere data may be collected providing a precise position of an individual in x,y,z space, or, alternatively, latitude, longitude and elevation. This precise position may be combined with information indicative of an orientation of a device located at the precise position in order to display visual data, such as virtual objects, of an operator of the device.

As illustrated, a theme park 3000 is comprised of various static objects, e.g., buildings, lamp posts, and the like, as well as moving objects such as, for example, park attendees, service personnel and the like. It is increasingly the case that such areas are covered by video cameras 3002. Because the position and orientation of each camera is known with great precision and certainty, cameras 3002 may be used to determine or to refine position information derived for device operators. This is particularly true for operators in areas of overlapping coverage by one or more cameras via triangulation. Using video and still imagery from the cameras, the system may operate to identify the identity of individuals using the system. In some instances, facial recognition may be employed. In other instances, a bar code, QR code or other such indicia may be affixed to an attendee to aid is visual recognition of identity.

In accordance with exemplary and non-limiting embodiments, cameras 3002 may be any device operating to enable the calculation of position information for device operators. For example, each camera 3002 position may also serve as a position of a base station operating with mmWave signals in, for example, a 5G or 6G paradigm. Use of mmWave signals allows for determinations of the position of a target using both trilateration and triangulation. Specifically mmWave emitters/receivers enable a determination of both the distance to and the angle between the mmWave transmitter and the target. The resulting position determinations may be accurate on the scale of millimeters.

5G mm Wave technology operates between 30 GHz and 300 GHz. Utilizing a 300 GHz signal, a single 5G chip may theoretically utilize triangulation from multiple signals to determine a location on the order of 1×10-2 meters, or one centimeter. In practice, lower than maximum frequency signals, signal reflection and the like typically reduce location accuracy to approximately 15-20 cm.

When presenting augmented reality content to a viewer, such as via a viewing device, it is desired to determine the precise location in space of the viewing device as well as the orientation of the viewing device. These two attributes, location and orientation, are generally sufficient to enable the display of augmented content. Once a location of the viewing apparatus is determined, it is necessary to know the precise orientation of the apparatus. For example, if a viewer is looking upwards or with a head tilted to the side, the augmented content must be adjusted accordingly or the content will fail to appear as properly merged with aspects and artifacts of the surrounding physical environment.

In many situations, owing to the distance at which augmented content is projected, slight errors in the location of the viewer are barely noticeable provided that the orientation of the display apparatus is properly ascertained. As described herein, in accordance with various exemplary and non-limiting embodiments, 5G chips employing mmWave technology may be used, either in conjunction with GPS or by itself, to accurately determine the location and orientation of a viewing device.

In some embodiments, this may be achieved by placing multiple 5G chips in a single device, such as a viewing device. The use of multiple chips provides for redundancy as 5G signals are often times unable to penetrate obstacles. For example, a user's hand on a cell phone may be sufficient to block cellular reception. Chip redundancy increases the likelihood that at least one chip will be unobstructed.

In accordance with an exemplary and non-limiting embodiment, multiple 5G chips may situated in a viewing device, such as AR glasses, a flat screen display or the like, and location information derived from each of the multiple chips. As is likely in a situation where multiple chips are subject to the same factors influencing location error, such as reflection off of surfaces, it is likely that the error in each chip's location will be biased in the same direction and magnitude. Multiple computations of a chip's location over time, assuming a random error distribution, will allow a user to pinpoint an absolute location of a chip in space. Assuming, once again, that location error experienced by multiple chips derived from identical 5G signals are biased by the same amount in the same direction, it may be possible utilize multiple location determinations of multiple chips in a device each derived from the same 5G signals to ascertain an orientation and direction of viewing of the device.

Figure 31:
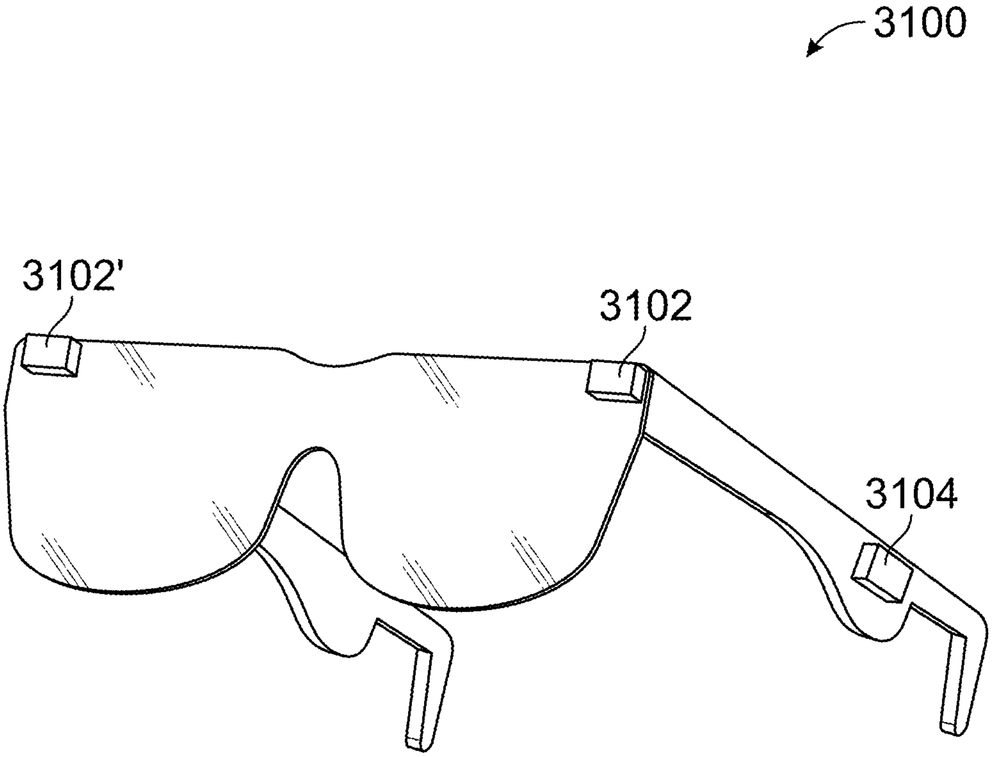
FIG. 31 is an illustration of an exemplary and non-limiting embodiment of an application of the disclosed technology in a pair of AR glasses.

For example, with reference to FIG. 31, two chips 3102, 3102' one each placed on opposite sides across the bridge of AR glasses 3100 may each determine a location of the chip. As each location is biased in random directions in three-dimensional space, a line extending between each chip will jump around. But, assuming the error experienced by each chip is in the same direction and of a similar amplitude, each subsequent determined line, while jumping around, will remain parallel one to the other. As a result, even as the absolute position of the chips experiences error, the orientation of the two chips with respect to one another remains constant and may provide for an orientation in space from which viewing angle may be deduced.

As noted above, a single unaveraged location determination may experience a theoretical limitation on the order of a centimeter. If one knows the precise physical separation and orientation of each of multiple chips in space and forming a part of the viewing device, it may be possible find a statistical best fit that increases location accuracy. Further, when one incorporates angle to transmitter information, absolute and relative location determination may be enhanced.

In some instances, the viewing device may comprise an inertial measurement unit (IMU). An IMU 3104 is capable of sensing very small linear and rotational changes to the orientation of the viewing device. In some instances, relying only on one or more mmWave based measurements to determine position and orientation, the system may fuse data derived from an IMU to augment the determination of position and orientation. For example, in instances where mmWave measurements indicate small deviations in position over time which may be the result of error in subsequent measurements, it may be advantageous to access IMU data. In the instance that the IMU shows less or more movement than ascertained form the mmWave data, one may weight the two data sources to better ascertain the actual change in orientation and position of the display device.

In some instances, the accurate position information determined via the use of mmWave data signals may in turn be used to more accurately direct the mmWave beams to provide a reliable link for high data-rate communication. Such a link may increase the data throughput to the target enabling the provision of more voluminous and detailed AR content to a target. As described above, use of mmWave beam technology may be used in conjunction with any other exemplary embodiment described herein. For example, mmWave beam technology may be used to accurately determine the position of moving targets, such as NASCAR automobiles as described herein. Likewise, mmWave position determination may be applied to scenarios involving the real-time determination of the position and orientation of athletes engaged in athletic events.

In addition to using electromagnetic mmWave technology to ascertain the position and orientation of a viewing device, other passive sources of location information may be employed. In accordance with various exemplary and non-limiting embodiments, one or more cameras distributed throughout an environment may be employed to identify and image one or more viewers as they traverse an environment. If the location and viewing direction of a plurality of cameras is known, it may be possible to capture one or a series of images of the viewing device from multiple angles and to derive a precise location and orientation of the device.

In some embodiments, the system may be configured to send information from a device's receivers back to a cell tower in response to a 'ping'. As a result, the several data points from the several towers may be processed remotely to determine location and position of the device. This serves to maintain all of the location data locally.

In response to this challenge, in some embodiments, the camera may be an event camera. Event cameras, also known as a neuromorphic camera, silicon retinal or dynamic vision sensor, is an imaging sensor that responds to local changes in brightness. Event cameras do not capture images using a shutter as conventional cameras do. Instead, each pixel inside an event camera operates independently and asynchronously, reporting changes in brightness as they occur, and staying silent otherwise. The resulting event camera output is an asynchronous stream of events triggered by changes in scene illumination. The result is a virtually unlimited equivalent frame rate with a requisitely high resolution. Specifically, while the human eye is believed to have an equivalent frame rate of approximately 200-300 fps, and event cameras equivalent frame rate is on the order of 1,000,000 fps. Another advantage of event cameras is the ability to capture a greater dynamic range of intensities such that data is not drowned out in images containing relatively bright portions and dim portions. This aspect of event cameras is of special import in scenarios discussed below.

In some embodiments, one or more event cameras may capture one or more markings on a display device within line if sight of the cameras. When three or more markings, such as forming a triangle, are visible to only one camera the relative location of each marking to the other as captured by the camera is sufficient to ascertain an orientation of the display device upon which the markings are arranged. When more than one camera captures the same one of the plurality of markings, it is possible to further ascertain the precise position of the marker. Combining this information, it is possible to precisely determine the position and orientation of a display device.

The ability to precisely determine the position and orientation of a display device, such as a helmet mounted AR device, in the cockpit of a plane or the cabin of a vehicle is often times necessary in order to deliver augmented content to the pilot/driver in a realistic manner in an environment that is traveling through space.

In the instance of a cockpit situated system, there exist various modalities for ascertaining the position and orientation of a helmet mounted AR system. In some embodiments, cockpit mounted cameras in known and calibrated positions continuously image markings on the helmet in order to determine the position and orientation of the helmet. In other embodiments, lidar may be employed to precisely determine the position and orientation of the helmet. While cameras work well in well-lit scenarios, the contrast between light and shadow as produced by sunlight inside a cockpit flying at high elevation is substantial. The inability of frame based cameras to adequately adjust to such stark contrasts often times limits the ability of cameras to properly image the markings.

As described above, event cameras exhibit a high equivalent frame rate, adequate resolution and a superior ability to gather images across an extended range of light intensities. As a result, the implementation of event cameras in a cockpit scenario allows for the ability to image location indicia, such as helmet markings, in a dynamic cockpit environment in which light and shadow are abruptly and constantly changing.

In embodiments, a pilot's helmet may have markers that are tracked using the event camera as an indication of helmet movement and determination of the helmet's position. The markers may be active (e.g., light emitting diodes, OLEDs) or inactive (e.g., paint, stickers, reflectors, IR reflectors, UV reflectors). Tracking markers with the event camera can reduce the overall bandwidth of the data even further while maintaining a very high accuracy and speed.

In some embodiments, data from more than one platform may be fused to increase accuracy. In some embodiments, mmWave information may be fused with GPS data to reduce error in determining the position of display systems. Likewise, in a cockpit/cabin implementation data from event cameras may be fused with lidar data to reduce error in determining the position of display systems.

In some instances, the accurate position information determined via the use of mmWave data signals may in turn be used to more accurately direct the mmWave beams to provide a reliable link for high data-rate communication. Such a link may increase the data throughput to the target enabling the provision of more voluminous and detailed AR content to a target. As described above, use of mmWave beam technology may be used in conjunction with any other exemplary embodiment described herein. For example, mmWave beam technology may be used to accurately determine the position of moving targets, such as NASCAR automobiles as described herein. Likewise, mmWave position determination may be applied to scenarios involving the real-time determination of the position and orientation of athletes engaged in athletic events.

In another exemplary embodiment, a grid 3004 with known properties may be adhered to a surface of the park or projected onto it. In some embodiments, the grid is painted onto the surface with a material that reflects IR light exhibiting certain and known characteristics. As a result, when sunlight reflects off of the grid, the system can see the grid clearly by limiting viewing, such as via filters, to the narrow range of exhibited wavelengths. In embodiments, the IR altering grid material may be otherwise invisible in the visible wavelengths and therefore not viewable by park attendees.

In addition to determining the position and location of people within the park 3000, the system may likewise observe, map and determine clear spaces within the park 3000 devoid of people or other objects. This dynamic designation of clear areas may be centrally stored and accessible by AR and VR display systems of park attendees. This data may be used to position virtual objects in real time in the AR displays of attendees. For example, a patron may have a virtual assistant 3006 in the form of a theme park character that guides or otherwise accompanies the attendee through the park. The illusion of reality is shattered if a real person traversing an open space can walk through the space virtually occupied by the virtual assistant 3006. The system may operate to only project a virtual object, such as a virtual assistant, in a space that is free of the presence of dynamically determined traffic. In other embodiments, a virtual assistant may react to the determined pedestrian traffic adding a level of reality.

In some embodiments, all forms of position determination disclosed herein including, but not limited to, GPS, visual triangulation, accelerometers and the like may be combined to refine position information. Because the area of a park is finite and includes many observable landmarks, static information describing the precise location of various objects may be combined with the aforementioned forms of position determination. For example, a multitude of images may be taken, encoded with the positions of objects in the images and stored for retrieval. When, for example, it is determined that a person using an AR device, whether head-mounted or carried like a smart phone, is in an approximately known position, images may be sent to the display device that reference the area surrounding the person. The display device may then capture an image of the surrounding environment and compare it to received and encoded images. By a process of matching what is seen in real time from the AR device with the statically stored and encoded images, the AR device may precisely determine its position with reference to encoded position information of nearby objects.

In contrast to the many aerial examples disclosed above, it is not necessary that each viewer utilizing an AR display observe virtual objects as appearing at the same place in space. For example, two different people each observing a personalized digital assistant 3006 may each see their assistant as occupying the same actual space. As neither observer sees the other's assistant, there is no overlap.

In some embodiments, a predetermined set of observers may be linked with all linked observers seeing the same virtual objects. For example, a family of five may all see the same assistant as it guides them all through the park. In some instances, a digital assistant may note when a child is far from the others in the group and may operate to encourage the "lost" child to follow the assistant to another member of the predefined group.

In accordance with other exemplary and non-limiting embodiments, AR and VR displays may be utilized on moving rides, such as roller coasters, in a manner similar to that disclosed herein with regards to ATARS implementations. Specifically, the latitude, longitude and elevation of a user's head may be precisely determined using any of the modalities discussed herein. Likewise, the precise location of a display device, such as a smartphone, may be determined. At the same time, the orientation and viewing directions of the display devices may be determined.

In contrast to determining the precise location and orientation of aircraft traveling at potentially supersonic speeds within large volumes and following trajectories and paths which are determined in real time via the control inputs of a pilot, many rides, such as roller coasters, follow a well defined path. Sensors implanted within the physical hardware of the ride may provide position data to the displays. Likewise, visual cues and markers may be distributed throughout and about a ride to provide for precise orientation and position measurements. As discussed elsewhere, the system may use current measurements of velocity and orientation to extrapolate into the future to accurately predict the future position and orientation of a user's display device.

In some embodiments, knowledge of a generalized path may be utilized to aid in determining position. For example, some relatively slow moving rides, such as boat trips, follow a generally planned route with slight deviations from side to side. These deviations, while somewhat random, occur within a constrained space that limits the magnitude of the deviations. In some instances, sensors making use of, for example, visual cues may be used to determine position and orientation data. For example, visual examination of a boat as it passes by a point of generally known location may be utilized to precisely determine the boat's position and orientation. Once known, visual cues within the boat may be used to precisely determine a position and orientation of a patron's display device in much the same way as described above with reference to a tail gunner within a plane whose cockpit location and orientation has been precisely determined.

In some embodiments, AR related data may be displayed to a patron to more efficiently move the patrons around the park. For example, the system may note that a group of individuals collectively are experiencing via their AR displays a personalized digital assistant 3006 in the form of a beloved cartoon character. It may also be noted that a show is about to begin in ten minutes in an auditorium that is five minutes away from the group. As a result, the system may operate to cause the personalized digital assistant 3006 to suggest that they attend the show and may interact to confirm acceptance. In some instances, the system may use the precise positioning aspects described herein to project a snippet of the show onto a nearby building or onto a virtual screen viewable by the group in order to generate excitement for the show. In some instances, the AR displays of the group may display virtual markers, such as arrows or a bouncing ball, to direct them to their destination.

As described above, the present system operates to precisely identify a position in space of a vehicle to enable the precise projection of virtual objects to an operator of the vehicle. In order to do so, it is sometimes necessary to not only precisely define the location of a specific point in the vehicle but also the small translations in space applied to such a point to precisely locate the position and orientation of, for example, a pilots helmet. As a result, the system utilizes the derivation of the absolute position of the vehicle in space as well as relative differences in position with respect to the absolute position exhibited by, for example, a pilot's eyes. Utilization of this relative position information enables the system to project augmented reality data to a pilot from the precise vantage point of the pilot's eyes.

In some exemplary embodiments, this method may be extended to provide projected augmented reality data to more than one occupant of the system. For example, a GPS monitor, an accelerometer and an inertial guidance system may all be employed and their outputs combined to precisely locate a point in the cockpit of an airplane. Further suppose that a tail gunner operating in the rear of the airplane is located, on every model of the aircraft, precisely thirty feet behind the cockpit point. Utilizing this knowledge, the system may operate to provide augmented reality data for presentation to a person occupying the tail gunner seat. In some embodiments, visual indicia may be placed in precisely known locations in the aircraft and may be used to precisely identify a location and orientation of an occupant's eyes or viewing device. For example, three Xs may be placed about a tail gunner's position. The location of each X relative to a known position, such as the point in the cockpit with a precisely derived absolute location value, is known. The system may observe the location of the Xs, such as by a camera located on augmented reality goggles of the tail gunner, in order to derive the location and orientation of the tail gunner's viewing device. In this way, the ability to quickly and accurately derive the absolute location and orientation of a point in an aircraft may be extended to similarly derive the relative location and orientation of various places within and about the aircraft. These derived relative locations may then be used to provide points of view from which to generate virtual content for viewing by an occupant of the vehicle.

It is known to identify visual indicia in an environment wherein the indicia have known locations and subsequently using these known locations to present data to an augmented reality vision system. For example, a camera attached to augmented reality glasses may identify the four corners of a known building face and proceed to present a visual overlay tied to the surface of the building to a viewer. In other instances, a system may identify objects and their locations in space and proceed to present floating text around the objects thus providing additional information to a viewer.

In contrast, in accordance with various embodiments described above, the present system operated to precisely define the location of a vehicle and an occupant of the vehicle without visual reference to any object exterior to the vehicle. Further, as described above, the present system allows for the determination of the precise location of a plurality of occupants of a vehicle.

As a result, the present system enables the presentation of virtual objects and information to a plurality of vehicle occupants utilizing the determined location and orientation of the vehicle without reference to any outside landmark. For example, any number of bus riders may select a theme for presentation and experience an augmented reality display tailored to the chosen theme. For example, a bus rider through New York City may select a theme devoted to how the city appeared in 1920. While enjoying an otherwise normal bus ride experience, a rider wearing augmented reality glasses may look out the bus window to view a presentation of the surrounding buildings and landmarks as they would have appeared in 1920. In some embodiments, only the viewing area directly in front of the viewer or in the direction of the viewer's gaze is augmented. As a result, wherever the viewer's gaze is directed appears to be as seen in 1920. In other examples, a viewer may choose a Jurassic theme and see the surrounding environment augmented by dinosaurs. In some embodiments, the data associated with each theme to be presented may be received form an entity owning or operated the vehicle. For example, a bus company may provide such an augmented reality service for a fee or as a service to paying customers.

In some embodiments, the interior of the vehicle may be painted or otherwise visually altered in a known manner in order to aid in the production of augmented reality content. For example, if the interior of the bus is painted a known color of green, the system may be operated to not present any augmented reality data over an area of augmented reality glasses corresponding to the shade of green.

As described herein elsewhere, the technologies of this disclosure include those that may be used to locate a vehicle, predict where the vehicle will be at a point in the future, locate a head-worn device of a person in the vehicle, identify the orientation of the helmet, detect the person's eye direction, and lock virtual content in a geospatial position without the need for a physical world located marker for alignment.

Other exemplary and non-limiting embodiments relate to the placement of travel information, advertisements, general information, location-based information, and the like. In some embodiments, a computer process is adapted to enable an operator (e.g., advertiser) to make placements of virtual content such that the virtual content is properly positioned geospatially. Once geospatially positioned a person or persons in a vehicle or walking may use the technologies to observe the virtual content. There may be a user interface that enables a content poster, such as an advertiser, to place content with respect to something physical in the environment. The process may convert the placement into longitude, latitude and altitude/elevation such that a person with a HMD will see it.

For example, an advertiser may operate, as through an interface, to enter information indicative of a mode of displaying information. For example, the advertiser may select, via a VR user interface, a portion of a building on which to project or otherwise display and advertisement. Data may be entered defining an orientation, source material, data format, preferred time of projection and the like. For example, an advertiser may choose to have a static poster in .pdf format displayed above the elevators at the Empire State Building from 9:00 am-11:00 am. Likewise, the advertiser may choose to display a 3D rotating instance of a product displayed above the information kiosk in Grand Central Station from 5:00 pm-8:00 pm.

NASCAR, F1, and IndyCar are all very fast-moving sports with huge fan bases. Thousands of fans pack road track side grandstands to get a glimpse of their favorite driver speed past. It is thrilling to see the cars fly by while they are battling with their competition. Unfortunately, fans don't get to see the cars for too long as the tracks are very large by comparison to other sports such as football or baseball. As a result, they only get to see a portion of the track. An augmented reality (which may be augmented reality, virtual reality, mixed reality, etc.) system may be used by fans in the grandstands to better 'see' the track and the cars.

As described herein, an AR system for fast moving vehicles may involve a tracking and prediction system that precisely estimates the location, attitude, and other conditions of a vehicle and a driver's head position in the same manner as described above with reference to pilots and planes. Such a tracking and prediction system may be used to deliver a fan-based AR experience. A fan may have an AR device (e.g., a phone, tablet, head mounted device with a see-through screen, head mounted device with a fully immersive screen) and may use it to 'look' at portions of the track that are otherwise obstructed or too far to see well. If the device is a hand-held device, the fan may point the camera of the device towards the section of the track that is of interest. If the device is a head-mounted device, the fan may be able to simply look in the direction of interest to see the other portions of the track. They may then "see" the other portions of the track through a digital augmentation of the environment. The digital augmentation may include digital representations of the cars on the track. So, the fan may be able to simply look out to an obstructed view of the track and see a computer-generated view of the track and the cars racing on the track.

Especially with live sports, it is important to have good alignment between digital representations of the cars and track with their real positions. Otherwise, the fan might see 'jitter' or misalignment between the digital content and the real car when the real car is visible, such as in a transition area. For example, the car may be a quarter mile away and not visible to the fan. The fan may be looking at the AR representation of the car and track. As the car reaches a transition point where it is visible to the fan, the digital image should be aligned with the actual car to make a most enjoyable experience.

Latency is an enemy of good AR alignment with fast moving objects, as discussed elsewhere herein. As a reminder, with a very good prediction of where the car is going to be in a very short period of time in the future, say 100 ms, the AR content can be rendered based on the future position and time and presented at the predicted time for alignment of the content with the fast-moving car. A central computer system may be tracking and predicting the near-future locations of each of the cars in a race such that the central system can communicate AR content to the fans in the stadium.

It may be important to maintain a good understanding of the location of the fan using the AR device and the car position and/or near future car position. The alignment between the near-future position and the fan's position and head/eye viewing direction may determine the placement location of the AR content on the computer display of the fan's AR device. The AR device may have GPS, a compass, IMU, accelerometers, etc. to help locate the device and track its position. In some instances, the IMU may employ inertial navigation using quantum sensors such as in a quantum IMU. The AR device may also have an eye tracking system to estimate the direction of the fan's eyes for more precise placement of the AR content in the device screen. The fan's AR device may use inside-out, outside-in, or other tracking system to assist in determining its location and direction. Inside-out and outside-in tracking can be relatively slow, but it is capable of providing an acceptable experience because the fan is moving relatively slowly. A fan device tracking system may use markers in the environment (e.g., on the seats, stadium structural components) such that the device can track its position in relation to the markers. Seat position itself could also be used to determine the fan's seat position. The fan may confirm that he is in the seat or an automated system (e.g., GPS, inside-out, outside-in) may estimate that the fan is likely in his seat and then the fan's ticketed seat number may be used to refine his position estimate by comparing the seat position to a map of the stadium.

The track layout itself may be pre-mapped based on actual geospatial locations. This creates absolute references to the track. The absolute track references can be used in the generation of the AR content. For example, the system may calculate a near-future position of three cars on the track. The near-future position of the car may then be associated with the track at the near-future position. This can create alignment between the near-future position of the car and the track such that the user experience aligns with reality. Without good track alignment, for example, the car may look like it is turning into a corner while the track still has a straight appearance. This may be confusing to a fan that understands the physics of the car.

The AR system may also be used to augment a fan's view of cars on a track that are in view of the fan. Information such as speed, running order, engine conditions, tire conditions, pit information, etc. may be presented with accurate content placement associated with the vehicle of interest. The augmented view may also include graphic depictions of parts of the car. Brakes may be highlighted in red. The motor, suspension, drive chain, fuel load, etc. may be graphically highlighted.

An embodiment of the present invention may include an AR/VR/XR video game where a user can race against or with a professional driver during an actual race or other event. This may be a fan experience in the grandstands, or it may be a separate experience. Since the system knows where the car is, how it is positioned and where it is going to be in the near-future, one may generate an avatar of the car and position it on a virtual track that represents the actual track at the near-future time. For example, the avatar may be a 3D model of the actual car, including performance specifications, appearance, etc. The user of the system may have computer user controls (e.g., simulated steering wheel, gas pedal, brake pedal, nitrous injection) and may be positioned to view the avatar from behind. The user could then follow behind the avatar during a real race or other event. The system may be used in a "follow" mode where the user position is automatically controlled to follow the avatar. It may also be in a "race" mode where the user may use his controls to try to maintain position behind the avatar or even overtake the avatar. The game may include the presentation of several avatars representing several actual race cars in area.

In embodiments, the user's virtual car may bump or otherwise interact with another virtual object (e.g., a curb, guardrail) or an avatar. The interaction may cause the user's virtual car to suffer a consequence (e.g., slowing, rolling, abruptly turning). For example, a user may attempt to overtake an avatar and the user may virtually hit the avatar, which may cause the user to have to take his foot off the gas, slowing the car so he can maintain control. Conversely, he may crash.

In embodiments, the user may overtake an avatar, possibly when the car represented by the avatar has a mishap, pits, or when the user is just so good he made a pass. The game may then allow the user to chase the next car in line in front of him or select another driver to race against.

In embodiments, there may be more than one user racing against one or more real cars represented by avatars. The users may interact with each other (e.g., bumping, hitting, crashing) while they chase the avatar(s). Each user may see the other users and the other avatars when they are in a virtual position with respect to one another that they would normally have a view in real life. A winning scenario may be whomever overtakes the avatar or most avatars wins the race. Another winning scenario may be the user with the closest finish to the avatar(s). Of course, other winning scenarios may be programmed and are envisioned by the inventor.

Practicing a position in a team sport tends to require the team to get together. There are times when individuals can practice on their own, but the experience is very different, and many things cannot be practice alone or with a limited number of team members. Practicing on a real field using augmented reality can be used to simulate a team, limited team or individual practice sessions.

Existing 'inside-out' and 'outside-in' technologies are limited and, in many situations, unusable for real-field simulated practice sessions.

There is disclosed above the use of AI for controlling or influencing virtual assets WVR as well as transitioning from BVR to WVR. There is further disclosed above detecting trends, tendencies, etc. from AR flight data. The trends may be group trends or an individual's trends. There is further disclosed above training the pilot based on the observed trends and tendencies. There is further disclosed above selecting individuals for specific missions based on their performance, trends, tendencies. There is further disclosed above providing guidance or cues to a pilot.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A system of tracking a position of a wearable worn by a user as an indication of a user's position in a space, said wearable comprising a plurality of spatially-oriented markers, said system comprising:

an event camera mounted in a cockpit of an aircraft, said event camera configured to operate asynchronously and transmit data only upon a change in relative movement of said plurality of spatially-oriented markers to with respect to said event camera;

a pre-mapped data set representing at least a portion of said cockpit; and a processor adapted to determine a spatial location and orientation of said wearable relative to said cockpit based, at least in part, on said data from said event camera of said spatially-oriented markers relative to said pre-mapped data.

2. The system of claim 1, wherein said space is a cockpit of an airplane and said event camera is mounted to a surface of said cockpit.

3. The system of claim 1, wherein said user is a pilot of an aircraft and said event camera is mounted on said pilot.

4. The system of claim 3, wherein said event camera is mounted on said wearable.

5. The system of claim 1, wherein spatially-oriented markers comprise active markers selected from the group consisting of light emitting diodes and OLEDs.

6. The system of claim 1, wherein spatially-oriented markers comprise inactive markers selected from the group consisting of paint, stickers, reflectors, IR reflectors and UV reflectors.

7. The system of claim 1, further comprising said wearable.

8. The system of claim 7, wherein said wearable is a helmet.

9. The system of claim 1, wherein said event camera is configured with a certain perspective relative to said plurality of spatially-oriented markers.

10. The system of claim 1, wherein said even camera is a neuromorphic camera.

11. The system of claim 10, wherein said neuromorphic camera generates a model of the position of the helmet based on one or more pixels of the neuromorphic sensor indicating a light change from each of the plurality of spatially-oriented markers on the helmet.

12. The system of claim 1, wherein spatial location and orientation of said wearable is used to determine a positioning of AR content within a FOV of the wearable to cause the user to perceive the AR content as representing the AR content at geospatial location prescribed in a virtual environment mapped to correspond with a real environment in which the cockpit is positioned.

13. The system of claim 1, wherein said pre-mapping is based on a CAD description of said cockpit.

14. The system of claim 1, wherein said spatial location and orientation of said wearable is based on a two-dimensional image captured by said event camera.

15. The system of claim 14, wherein said spatial location and orientation of said wearable is in three dimensional space.

16. The system of claim 1, wherein said event camera is configured with a certain perspective relative to said plurality of spatially-oriented markers.

17. The system of claim 1, wherein said event camera comprises an array of pixels, each pixel configured to operate independently and asynchronously to generate an event only when a change in brightness at that pixel exceeds a threshold.

18. The system of claim 17, wherein said event camera outputs an asynchronous stream of events corresponding to changes in scene illumination.

* * * * *